US012473548B2

(12) United States Patent
Rossi et al.

(10) Patent No.: US 12,473,548 B2
(45) Date of Patent: Nov. 18, 2025

(54) MODIFICATION OF SMALL RNAs FOR THERAPEUTIC USES

(71) Applicant: CITY OF HOPE, Duarte, CA (US)

(72) Inventors: John J. Rossi, Duarte, CA (US); Minsun Song, Duarte, CA (US)

(73) Assignee: CITY OF HOPE, Duarte, CA (US)

( * ) Notice: Subject to any disclaimer, the term of this patent is extended or adjusted under 35 U.S.C. 154(b) by 1029 days.

(21) Appl. No.: 17/253,299

(22) PCT Filed: Jun. 27, 2019

(86) PCT No.: PCT/US2019/039622
§ 371 (c)(1),
(2) Date: Dec. 17, 2020

(87) PCT Pub. No.: WO2020/006314
PCT Pub. Date: Jan. 2, 2020

(65) Prior Publication Data
US 2021/0269798 A1 Sep. 2, 2021

Related U.S. Application Data

(60) Provisional application No. 62/690,538, filed on Jun. 27, 2018.

(51) Int. Cl.
C12N 15/113 (2010.01)
A61P 35/00 (2006.01)
C12N 15/11 (2006.01)

(52) U.S. Cl.
CPC ............ C12N 15/113 (2013.01); A61P 35/00 (2018.01); C12N 15/111 (2013.01); C12N 2310/14 (2013.01); C12N 2310/141 (2013.01); C12N 2320/51 (2013.01)

(58) Field of Classification Search
None
See application file for complete search history.

(56) References Cited

U.S. PATENT DOCUMENTS

| | | | | |
|---|---|---|---|---|
| 6,303,308 B1 * | 10/2001 | Halle | .................. | C12N 15/1096 435/91.3 |
| 2004/0009946 A1 * | 1/2004 | Lewis | ............ | C12Y 301/03048 536/23.1 |
| 2008/0090776 A1 * | 4/2008 | Mano | .................... | C12N 9/1205 435/325 |
| 2011/0245325 A1 * | 10/2011 | Hoshi | ...................... | A61P 37/06 435/325 |
| 2013/0189742 A1 * | 7/2013 | Rohayem | ............. | C12Q 1/6853 435/91.3 |
| 2021/0388358 A1 * | 12/2021 | Brown | ............... | C12N 15/1137 |

FOREIGN PATENT DOCUMENTS

WO 2005/115481 A2 12/2005

OTHER PUBLICATIONS

Salinas-Giege et al. (Nucleic Acid Research 45, pp. 12963-12973 (Year: 2017).*
Burroughs et al. Nucleic Acid Res. 40:1424-1437 (Year: 2012).*
Zhang et al. (Curr. Opin. Mol Ther, 11(6): 641-651). (Year: 2009).*
V. Narry Kim Mol. Cells vol. 18, pp. 1-15 (Year: 2005).*
Jones et al. Nat Cell Biol. 11L1157-1163, pp. 1-18 (Year: 2009).*
Ibrahim et al. PNAS vol. 8 , pp. 1-9 (Year: 2010).*
Ibrahim et al. PNAS vol. 8: supporting information pp. 1-7 (Year: 2010).*
Schmitz et al. Silence A Journal of RNA regulation 2, pp. 1-10 (Year: 2011).*
Nucleoside triphosphate, pp. 1-8, Wikipedia retrieved on line Jun. 2024, https://en.wikipedia.org/wiki/Nucleoside_triphosphate#:~:text=A%20nucleoside%20triphosphate%20is%20a,groups%20bound%20to%20the%20sugar. (Year: 2024).*
Svobodova et al. Pflugers Archi-European Journal of Physiology, vol. 468, pp. 1089-1102 (Year: 2016).*
Rodriguez-Galan et al. iScience vol. 24, 102530, pp. 1-21 (Year: 2021).*
Chou et al. Nucleic Acid Research vol. 43, e109, pp. 1-9 (Year: 2015).*
Clemens, M. J., "PKR—A protein kinase regulated by double-stranded RNA," Int. J. Biochem. Cell Biol. 29(7):945-949 (1997).
Doyle, M., et al., "The double-stranded RNA binding domain of human Dicer functions as a nuclear localization signal," RNA 19:1238-1252 (2013).
Duchaine, T. F., et al., "Functional proteomics reveals the biochemical niche of C. elegans DCR-1 in multiple small-RNA-mediated pathways," Cell 124:343-354 (2006).
Gullerova, M., et al., "Convergent transcription induces transcriptional gene silencing in fission yeast and mammalian cells," Nat. Struct. Mol. Biol. 19(11):1193-1201 (2012).
Gutierrez-Vazquez, C., et al., "3' uridylation controls mature microRNA turnover during CD4 T-cell activation," RNA 23:882-891 (2017).
Kobs, G., et al., "Cloning blunt-end DNA fragments into the pGEM-T vector systems," Promega Notes Magazine 62:15 (1997).
Larkin, M.A., et al., "Clustal W and clustal X version 2.0," Bioinformatics 23(21):2947-2948 (2007).
Lee, R. C., et al., "Interacting endogenous and exogenous RNAi pathways in Caenorhabditis elegans," RNA 12:589-597 (2006).
Morgan, M., et al., "ShortRead: A Bioconductor package for input, quality assessment and exploration of high-throughput sequence data," Bioinformatics 25(19):2607-2608 (2009).
Munoz-Tello, P., et al., "Polyuridylation in eukaryotes: A 3'-end modification regulating RNA life," BioMed Res. Int. 2015:968127 (2015).
Pavelec, D. M., et al., "Requirement for the ERI/DICER complex in endogenous RNA interference and sperm development in Caenorhabditis elegans," Genetics 183:1283-1295 (2009).
Rybak-Wolf, A., et al., "A variety of dicer substrates in human and C. elegans," Cell 159:1153-1167 (2014).

(Continued)

Primary Examiner — Brian Whiteman
(74) Attorney, Agent, or Firm — Perkins Coie LLP; Lara Dueppen; Gregory Logan

(57) ABSTRACT

Provided are methods for improving stability of small therapeutic RNAs by adding one or more non-templated nucleotides such as cytidines and uridines to the 3' end of the small therapeutic RNAs. Also disclosed are modified small therapeutic RNAs comprising one or more non-templated nucleotides such as cytidines and uridines at the 3' end and pharmaceutical compositions comprising such modified small therapeutic RNAs.

9 Claims, 50 Drawing Sheets

Specification includes a Sequence Listing.

(56) References Cited

OTHER PUBLICATIONS

Sakurai, K., et al., "A role for human Dicer in pre-RISC loading of siRNAs," Nucl. Acids Res. 39(4):1510-1525 (2011).

Scheer, H., et al., "Uridylation earmarks mRNAs for degradation . . . and more," Trends in Genetics 32(10):607-619 (2016).

Slevin, M. K., et al., "Deep sequencing shows multiple oligouridylations are required for 3' to 5' degradation of histone mRNAs on polyribosomes," Mol. Cell 53:1020-1030 (2014).

Thomas, M. F., et al., "Eri1 regulates microRNA homeostasis and mouse lymphocyte development and antiviral function," Blood 120(1):130-142 (2012).

United States Patent and Trademark Office, International Search Report and Written Opinion dated Oct. 10, 2019 for PCT/US2019/039622, 10 pages.

Waterhouse, A. M., et al., "Jalview version 2—a multiple sequence alignment editor and analysis workbench," Bioinformatics 25(9):1189-1191 (2009).

Yang, X.C., et al., "Characterization of 3'hExo, a 3' exonuclease specifically interacting with the 3' end of histone mRNA," J. Biol. Chem. 281(41):30447-30454 (2006).

Zuber, H., et al., "Uridylation and PABP cooperate to repair mRNA deadenylated ends in *Arabidopsis*," Cell Reports 14:2707-2718 (2016).

* cited by examiner

Figure 1

Structure of the hnRNP H1 targeted small RNAs hnRNP H1 (sense strand antisense target)  5' GAACUUGAAUCAGAAGAUGAAGUCAAAUGG 3'  SEQ ID NO: 5
                                              GAACUUAGUCUUCUACUUCAGUUUAAC 3'-5'  SEQ ID NO: 58
                                              GAACUUAGUCUUCUACUUCAG  SEQ ID NO: 7
                                              AACUUAGUCUUCUACUUCAGUUUAACC  SEQ ID NO: 8
                                              AACUUAGUCUUCUACUUCAGU  SEQ ID NO: 9 hnRNP H1 (antisense strand sense target)  5' CCAAUUUGACUUCAUCUUCUGAUUCAAGUUC 3'  SEQ ID NO: 10
                                              UAAACUGAAGUAGAAGACUAAGU  SEQ ID NO: 59
SEQ ID NO: 12                                 AACUGAAGUAGAAGACUAAGU
                                              UUAAACUGAAGUAGAAGACUAAG  SEQ ID NO: 61
SEQ ID NO: 14                                 AAACUGAAGUAGAAGACUAAG

|  |  | DsiRNA I | DsiRNA II | siRNA I | siRNA II |
|---|---|---|---|---|---|
| EFFICIENCY | S | 17.5 pM | 50.8 pM  0.6pM | 4.3 pM | 77.4 pM |
|  | AS | 22.3 pM | 5.7 pM | 89.9 pM | 44.6 pM |
| STABILITY | S | 153,127 | 127,114  5X | 2,853,298 | 419,135 |
|  | AS | 309,404 | 591,709 | 45,542 | 405,642 |

|  |  | DsiRNA II | siRNA II |  |
|---|---|---|---|---|
| EFFICIENCY | AS | 5.7 pM > | 44.6 pM | ⇨ Selected strand |
| STABILITY | AS | 591,709 | 405,642 |  |

|  |  | DsiRNA I | siRNA I |  |
|---|---|---|---|---|
| EFFICIENCY | AS | 22.3 pM > | 89.9 pM | ⇨ Non-selected strand |
| STABILITY | AS | 309,404 | 45,542 |  |

DsiRNA 8_antisense

| SEQ ID NO: | Sequence | Total RNA Count | % | Ago2 IP Count | % | DICER IP Count | % |
|---|---|---|---|---|---|---|---|
| 15 | CCAATTTGACTTCATCTTCTGATTCAA | | | | | | |
| 16 | TTTGACTTCATCTTCTGATTCA | 1st 110,274 | 18 | 1st 415,702 | 41 | | |
| 17 | TTGACTTCATCTTCTGATTCA | 2nd 108,171 | 18 | 3rd 87,280 | 7 | | |
| 18 | TGACTTCATCTTCTGATTCA | 3rd 95,791 | 16 | 2nd 76,155 | 7 | | |
| 19 | TGACTTCATCTTCTGATTCAA | 4th 46,846 | 8 | | | | |
| 20 | TTGACTTCATCTTCTGATTCAA | 5th 32,259 | 5 | | | | |
| 21 | TTTGACTTCATCTTCTGATTC | 6th 18,228 | 3 | | | | |
| 22 | TTGACTTCATCTTCTGATTC | 7th 16,565 | 3 | | | | |
| 23 | TGACTTCATCTTCTGATTCACC | 8th 12,464 | 2 | | | 1st 846,127 | 55 |
| 24 | TGACTTCATCTTCTGATTCAAT | 9th 10,398 | 2 | | | 2nd 91,563 | 8 |
| 25 | TTTGACTTCATCTTCTGATTCAA | 10th 9,910 | 2 | | | | |

DsiRNA 8_sense

| SEQ ID NO: | Sequence | Total RNA Count | % | Ago2 IP Count | % | DICER IP Count | % |
|---|---|---|---|---|---|---|---|
| 26 | GAATCAGAAGATGAAGTCAAATTGGG | | | | | | |
| 27 | GAATCAGAAGATGAAGTCA | 1st 1,576 | 16 | | | | |
| 28 | GAATCAGAAGATGAAGTCAA | 2nd 1,203 | 12 | 3rd 77,915 | 15 | | |
| 29 | GAATCAGAAGATGAAGTCAAAT | 3rd 1,126 | 11 | 2nd 153,713 | 29 | | |
| 30 | GAATCAGAAGATGAAGTCAAT | 4th 1,037 | 10 | | | 1st 29,322 | 25 |
| 26 | GAATCAGAAGATGAAGTCAAATTGGG | 5th 1,019 | 10 | | | | |
| 31 | GAATCAGAAGATGAAGTCAAA | 6th 1,019 | 10 | | | | |
| 32 | AGAAGATGAAGTCAAA | 7th 808 | 8 | | | | |
| 33 | GAATCAGAAGATGAAGTCAAATT | 8th 470 | 5 | 1st 179,240 | 34 | | |
| 34 | AGAAGATGAAGTCAAATT | 9th 358 | 4 | | | | |
| 35 | AGAAGATGAAGTCAA | 10th 352 | 3 | | | | | siRNA I_antisense

| SEQ ID NO: | Sequence | Total RNA Count | % | Ago2 IP Count | % | DICER IP Count | % |
|---|---|---|---|---|---|---|---|
| 36 | GACTTCATCTTCTGATTCAAG | | | | | | |
| 36 | GACTTCATCTTCTGATTCAAG | 1st 11,413 | 25 | 1st 847,541 | 73 | 1st 23,793 | 33 |
| 37 | ACTTCATCTTCTGATTCAAG | 2nd 7,354 | 16 | 2nd 78,082 | 7 | | |
| 38 | CTTCATCTTCTGATTCAAG | 3rd 5,351 | 12 | | | | |
| 39 | CATCTTCTGATTCAAG | 4th 3,334 | 7 | | | | |
| 40 | GACTTCATCTTCTGATTCA | 5th 2,681 | 6 | | | | |
| 41 | GACTTCATCTTCTGATTCAAGT | 6th 2,374 | 5 | 3rd 71,147 | 6 | 3rd 6,798 | 8 |
| 42 | GACTTCATCTTCTGATTCAA | 7th 1,611 | 4 | | | | |
| 43 | GACTTCATCTTCTGATTCAAT | 8th 1,390 | 3 | | | 2nd 8,791 | 9 |
| 44 | ATCTTCTGATTCAAG | 9th 1,169 | 3 | | | | |
| 45 | TCATCTTCTGATTCAAG | 10th 1,133 | 2 | | | | | siRNA I_sense

| SEQ ID NO: | Sequence | Total RNA Count | % | Ago2 IP Count | % | DICER IP Count | % |
|---|---|---|---|---|---|---|---|
| 46 | TGAATCAGAAGATGAAGTCAA | | | | | | |
| 47 | TGAATCAGAAGATGAAGTCA | 1st 1,158,408 | 41 | 2nd 113,839 | 27 | | |
| 46 | TGAATCAGAAGATGAAGTCAA | 2nd 433,899 | 15 | 1st 183,953 | 39 | | |
| 48 | TGAATCAGAAGATGAAGTCAAT | 3rd 240,204 | 8 | | | 2nd 101,685 | 16 |
| 49 | TGAATCAGAAGATGAAGTCAC | 4th 236,612 | 8 | | | | |
| 50 | TGAATCAGAAGATGAAGTCACC | 5th 222,878 | 8 | 3rd 29,375 | 7 | 1st 245,458 | 38 |
| 51 | TGAATCAGAAGATGAAGTC | 6th 113,402 | 4 | | | | |
| 52 | TGAATCAGAAGATGAAGTCAATT | 7th 98,894 | 3 | | | | |
| 53 | TGAATCAGAAGATGAAGTCACT | 8th 73,209 | 3 | | | | |
| 54 | TGAATCAGAAGATGAAGTCAT | 9th 68,772 | 2 | | | | |
| 55 | TGAATCAGAAGATGAAGTCACCA | 10th 69,440 | 2 | | | | |

Figure 12

SEQ ID NO: 1          S : Sense strand          SEQ ID NO: 2     AS : Anti-sense strand siRNA I  U G A A U C A G A A G A U G A A G U C A A          G A C U U C A U C U U C U G A U U C A A G siRNA II  G A A U C A G A A G A U G A A G U C A A A        U G A C U U C A U C U U C U G A U U C A A

SEQ ID NO: 56                                              SEQ ID NO: 57

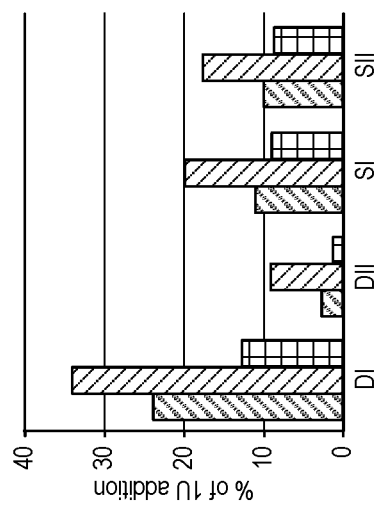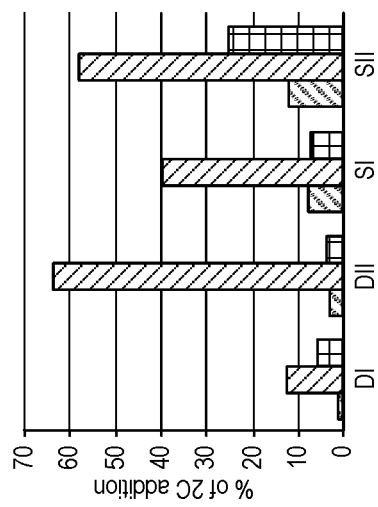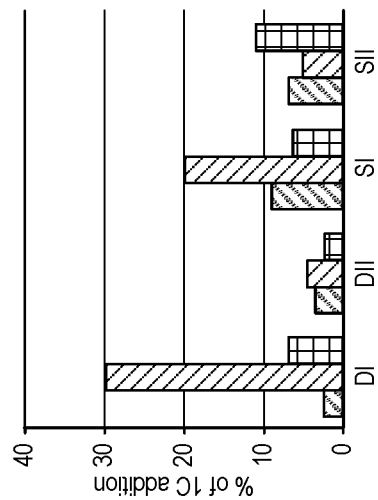
FIG. 24

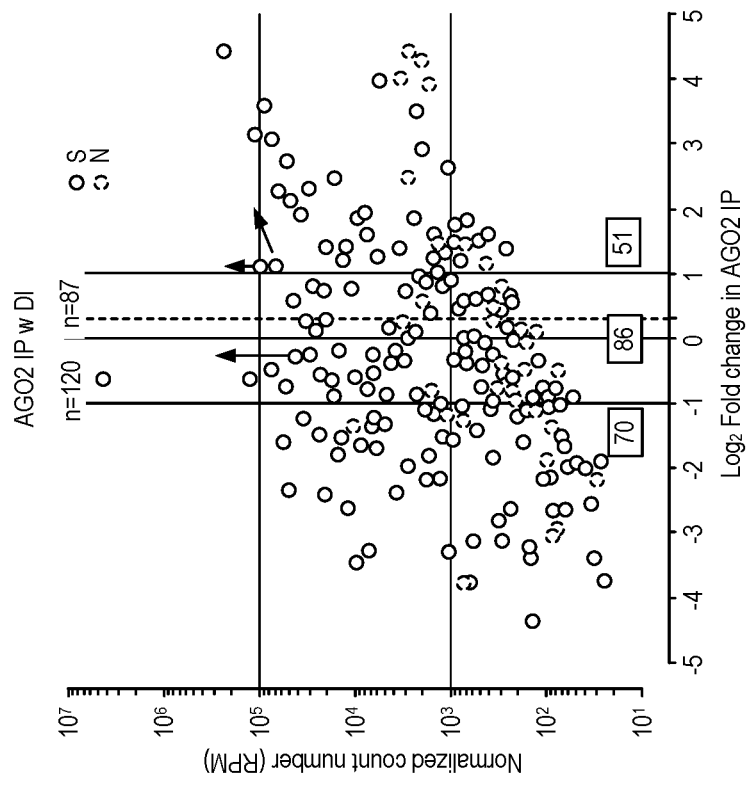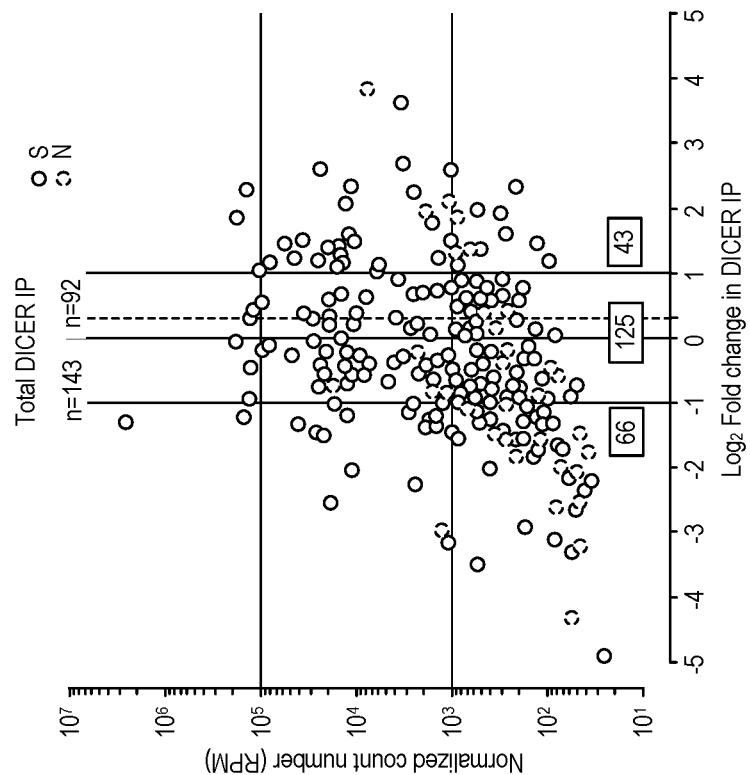
FIG. 43

Vimentin : siRNA for Vim gene

SEQ ID NO: 75   5'-UGAAGCUGCUAACUACCAAUU    SS
SEQ ID NO: 76        UUACUUCGACGAUUGAUGGUU-5'    AS

Vimentin : siRNA CC for Vim gene

SEQ ID NO: 75   5'-UGAAGCUGCUAACUACCAAUU    SS
SEQ ID NO: 77 CCUUACUUCGACGAUUGAUGGUU-5'    AS

Vimentin : siRNA U for Vim gene

SEQ ID NO: 75   5'-UGAAGCUGCUAACUACCAAUU    SS
SEQ ID NO: 78 UUUACUUCGACGAUUGAUGGUU-5'    AS

SEQUENCE LISTING

```
<160> NUMBER OF SEQ ID NOS: 80

<210> SEQ ID NO 1
<211> LENGTH: 21
<212> TYPE: RNA
<213> ORGANISM: Artificial Sequence
<220> FEATURE:
<223> OTHER INFORMATION: Synthetic

<400> SEQUENCE: 1
ugaaucagaa gaugaaguca a                                          21

<210> SEQ ID NO 2
<211> LENGTH: 21
<212> TYPE: RNA
<213> ORGANISM: Artificial Sequence
<220> FEATURE:
<223> OTHER INFORMATION: Synthetic

<400> SEQUENCE: 2
gacuucaucu ucugauucaa g                                          21

<210> SEQ ID NO 3
<211> LENGTH: 22
<212> TYPE: RNA
<213> ORGANISM: Artificial Sequence
<220> FEATURE:
<223> OTHER INFORMATION: Synthetic

<400> SEQUENCE: 3
ugaaucagaa gaugaaguca ac                                         22

<210> SEQ ID NO 4
<211> LENGTH: 23
<212> TYPE: RNA
<213> ORGANISM: Artificial Sequence
<220> FEATURE:
<223> OTHER INFORMATION: Synthetic

<400> SEQUENCE: 4
ugaaucagaa gaugaaguca acc                                        23

<210> SEQ ID NO 5
<211> LENGTH: 31
<212> TYPE: RNA
<213> ORGANISM: Artificial Sequence
<220> FEATURE:
<223> OTHER INFORMATION: Synthetic

<400> SEQUENCE: 5
```

```
gaacuugaau cagaagauga agucaaauug g                                    31

<210> SEQ ID NO 6
<211> LENGTH: 27
<212> TYPE: RNA
<213> ORGANISM: Artificial Sequence
<220> FEATURE:
<223> OTHER INFORMATION: Synthetic

<400> SEQUENCE: 6
gaacuuaguc uucuacuuca guuuaac                                         27

<210> SEQ ID NO 7
<211> LENGTH: 21
<212> TYPE: RNA
<213> ORGANISM: Artificial Sequence
<220> FEATURE:
<223> OTHER INFORMATION: Synthetic

<400> SEQUENCE: 7
gaacuuaguc uucuacuuca g                                               21

<210> SEQ ID NO 8
<211> LENGTH: 27
<212> TYPE: RNA
<213> ORGANISM: Artificial Sequence
<220> FEATURE:
<223> OTHER INFORMATION: Synthetic

<400> SEQUENCE: 8
aacuuagucu ucuacuucag uuuaacc                                         27

<210> SEQ ID NO 9
<211> LENGTH: 21
<212> TYPE: RNA
<213> ORGANISM: Artificial Sequence
<220> FEATURE:
<223> OTHER INFORMATION: Synthetic

<400> SEQUENCE: 9
aacuuagucu ucuacuucag u                                               21

<210> SEQ ID NO 10
<211> LENGTH: 31
<212> TYPE: RNA
<213> ORGANISM: Artificial Sequence
<220> FEATURE:
<223> OTHER INFORMATION: Synthetic

<400> SEQUENCE: 10
ccaauuugac uucaucuucu gauucaaguu c                                    31

<210> SEQ ID NO 11
<211> LENGTH: 25
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (1)..(2)
<223> OTHER INFORMATION: dGdT

<400> SEQUENCE: 11
gtuaaacuga aguagaagac uaagu                                           25
```

<210> SEQ ID NO 12
<211> LENGTH: 21
<212> TYPE: RNA
<213> ORGANISM: Artificial Sequence
<220> FEATURE:
<223> OTHER INFORMATION: Synthetic

<400> SEQUENCE: 12
aacugaagua gaagacuaag u                                                 21

<210> SEQ ID NO 13
<211> LENGTH: 25
<212> TYPE: RNA
<213> ORGANISM: Artificial Sequence
<220> FEATURE:
<223> OTHER INFORMATION: Synthetic
<220> FEATURE:
<221> NAME/KEY: modified_base
<222> LOCATION: (1)..(2)
<223> OTHER INFORMATION: dGdG

<400> SEQUENCE: 13
gguuaaacug aaguagaaga cuaag                                             25

<210> SEQ ID NO 14
<211> LENGTH: 21
<212> TYPE: RNA
<213> ORGANISM: Artificial Sequence
<220> FEATURE:
<223> OTHER INFORMATION: Synthetic

<400> SEQUENCE: 14
aaacugaagu agaagacuaa g                                                 21

<210> SEQ ID NO 15
<211> LENGTH: 27
<212> TYPE: DNA
<213> ORGANISM: Artificial Sequence
<220> FEATURE:
<223> OTHER INFORMATION: Synthetic

<400> SEQUENCE: 15
ccaatttgac ttgatcttct gattcaa                                           27

<210> SEQ ID NO 16
<211> LENGTH: 22
<212> TYPE: DNA
<213> ORGANISM: Artificial Sequence
<220> FEATURE:
<223> OTHER INFORMATION: Synthetic

<400> SEQUENCE: 16
tttgacttca tcttctgatt ca                                                22

<210> SEQ ID NO 17
<211> LENGTH: 21
<212> TYPE: DNA
<213> ORGANISM: Artificial Sequence
<220> FEATURE:
<223> OTHER INFORMATION: Synthetic

<400> SEQUENCE: 17
ttgacttcat cttctgattc a                                                 21

<210> SEQ ID NO 18
<211> LENGTH: 20

```
<212> TYPE: DNA
<213> ORGANISM: Artificial Sequence
<220> FEATURE:
<223> OTHER INFORMATION: Synthetic

<400> SEQUENCE: 18
tgacttcatc ttctgattca                                                    20

<210> SEQ ID NO 19
<211> LENGTH: 21
<212> TYPE: DNA
<213> ORGANISM: Artificial Sequence
<220> FEATURE:
<223> OTHER INFORMATION: Synthetic

<400> SEQUENCE: 19
tgacttcatc ttctgattca a                                                  21

<210> SEQ ID NO 20
<211> LENGTH: 22
<212> TYPE: DNA
<213> ORGANISM: Artificial Sequence
<220> FEATURE:
<223> OTHER INFORMATION: Synthetic

<400> SEQUENCE: 20
ttgacttcat cttctgattc aa                                                 22

<210> SEQ ID NO 21
<211> LENGTH: 21
<212> TYPE: DNA
<213> ORGANISM: Artificial Sequence
<220> FEATURE:
<223> OTHER INFORMATION: Synthetic

<400> SEQUENCE: 21
tttgacttca tcttctgatt c                                                  21

<210> SEQ ID NO 22
<211> LENGTH: 20
<212> TYPE: DNA
<213> ORGANISM: Artificial Sequence
<220> FEATURE:
<223> OTHER INFORMATION: Synthetic

<400> SEQUENCE: 22
ttgacttcat cttctgattc                                                    20

<210> SEQ ID NO 23
<211> LENGTH: 22
<212> TYPE: DNA
<213> ORGANISM: Artificial Sequence
<220> FEATURE:
<223> OTHER INFORMATION: Synthetic

<400> SEQUENCE: 23
tgacttcatc ttctgattca cc                                                 22

<210> SEQ ID NO 24
<211> LENGTH: 22
<212> TYPE: DNA
<213> ORGANISM: Artificial Sequence
<220> FEATURE:
<223> OTHER INFORMATION: Synthetic

<400> SEQUENCE: 24
```
tgacttcatc ttctgattca at    22

<210> SEQ ID NO 25
<211> LENGTH: 23
<212> TYPE: DNA
<213> ORGANISM: Artificial Sequence
<220> FEATURE:
<223> OTHER INFORMATION: Synthetic

<400> SEQUENCE: 25
tttgacttca tcttctgatt caa    23

<210> SEQ ID NO 26
<211> LENGTH: 25
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (24)..(25)
<223> OTHER INFORMATION: dGdG

<400> SEQUENCE: 26
gaatcagaag atgaagtcaa attgg    25

<210> SEQ ID NO 27
<211> LENGTH: 19
<212> TYPE: DNA
<213> ORGANISM: Artificial Sequence
<220> FEATURE:
<223> OTHER INFORMATION: Synthetic

<400> SEQUENCE: 27
gaatcagaag atgaagtca    19

<210> SEQ ID NO 28
<211> LENGTH: 20
<212> TYPE: DNA
<213> ORGANISM: Artificial Sequence
<220> FEATURE:
<223> OTHER INFORMATION: Synthetic

<400> SEQUENCE: 28
gaatcagaag atgaagtcaa    20

<210> SEQ ID NO 29
<211> LENGTH: 22
<212> TYPE: DNA
<213> ORGANISM: Artificial Sequence
<220> FEATURE:
<223> OTHER INFORMATION: Synthetic

<400> SEQUENCE: 29
gaatcagaag atgaagtcaa at    22

<210> SEQ ID NO 30
<211> LENGTH: 21
<212> TYPE: DNA
<213> ORGANISM: Artificial Sequence
<220> FEATURE:
<223> OTHER INFORMATION: Synthetic

<400> SEQUENCE: 30
gaatcagaag atgaagtcaa t    21

```
<210> SEQ ID NO 31
<211> LENGTH: 21
<212> TYPE: DNA
<213> ORGANISM: Artificial Sequence
<220> FEATURE:
<223> OTHER INFORMATION: Synthetic

<400> SEQUENCE: 31
gaatcagaag atgaagtcaa a                                      21

<210> SEQ ID NO 32
<211> LENGTH: 16
<212> TYPE: DNA
<213> ORGANISM: Artificial Sequence
<220> FEATURE:
<223> OTHER INFORMATION: Synthetic

<400> SEQUENCE: 32
agaagatgaa gtcaaa                                            16

<210> SEQ ID NO 33
<211> LENGTH: 23
<212> TYPE: DNA
<213> ORGANISM: Artificial Sequence
<220> FEATURE:
<223> OTHER INFORMATION: Synthetic

<400> SEQUENCE: 33
gaatcagaag atgaagtcaa att                                    23

<210> SEQ ID NO 34
<211> LENGTH: 18
<212> TYPE: DNA
<213> ORGANISM: Artificial Sequence
<220> FEATURE:
<223> OTHER INFORMATION: Synthetic

<400> SEQUENCE: 34
agaagatgaa gtcaaatt                                          18

<210> SEQ ID NO 35
<211> LENGTH: 15
<212> TYPE: DNA
<213> ORGANISM: Artificial Sequence
<220> FEATURE:
<223> OTHER INFORMATION: Synthetic

<400> SEQUENCE: 35
agaagatgaa gtcaa                                             15

<210> SEQ ID NO 36
<211> LENGTH: 21
<212> TYPE: DNA
<213> ORGANISM: Artificial Sequence
<220> FEATURE:
<223> OTHER INFORMATION: Synthetic

<400> SEQUENCE: 36
gacttcatct tctgattcaa g                                      21

<210> SEQ ID NO 37
<211> LENGTH: 20
<212> TYPE: DNA
<213> ORGANISM: Artificial Sequence
<220> FEATURE:
<223> OTHER INFORMATION: Synthetic
```

```
<400> SEQUENCE: 37
acttcatctt ctgattcaag                                          20

<210> SEQ ID NO 38
<211> LENGTH: 19
<212> TYPE: DNA
<213> ORGANISM: Artificial Sequence
<220> FEATURE:
<223> OTHER INFORMATION: Synthetic

<400> SEQUENCE: 38
cttcatcttc tgattcaag                                           19

<210> SEQ ID NO 39
<211> LENGTH: 16
<212> TYPE: DNA
<213> ORGANISM: Artificial Sequence
<220> FEATURE:
<223> OTHER INFORMATION: Synthetic

<400> SEQUENCE: 39
catcttctga ttcaag                                              16

<210> SEQ ID NO 40
<211> LENGTH: 19
<212> TYPE: DNA
<213> ORGANISM: Artificial Sequence
<220> FEATURE:
<223> OTHER INFORMATION: Synthetic

<400> SEQUENCE: 40
gacttcatct tctgattca                                           19

<210> SEQ ID NO 41
<211> LENGTH: 22
<212> TYPE: DNA
<213> ORGANISM: Artificial Sequence
<220> FEATURE:
<223> OTHER INFORMATION: Synthetic

<400> SEQUENCE: 41
gacttcatct tctgattcaa gt                                       22

<210> SEQ ID NO 42
<211> LENGTH: 20
<212> TYPE: DNA
<213> ORGANISM: Artificial Sequence
<220> FEATURE:
<223> OTHER INFORMATION: Synthetic

<400> SEQUENCE: 42
gacttcatct tctgattcaa                                          20

<210> SEQ ID NO 43
<211> LENGTH: 21
<212> TYPE: DNA
<213> ORGANISM: Artificial Sequence
<220> FEATURE:
<223> OTHER INFORMATION: Synthetic

<400> SEQUENCE: 43
gacttcatct tctgattcaa t                                        21

<210> SEQ ID NO 44
<211> LENGTH: 15
```

```
<212> TYPE: DNA
<213> ORGANISM: Artificial Sequence
<220> FEATURE:
<223> OTHER INFORMATION: Synthetic

<400> SEQUENCE: 44
atcttctgat tcaag                                                          15

<210> SEQ ID NO 45
<211> LENGTH: 17
<212> TYPE: DNA
<213> ORGANISM: Artificial Sequence
<220> FEATURE:
<223> OTHER INFORMATION: Synthetic

<400> SEQUENCE: 45
tcatcttctg attcaag                                                        17

<210> SEQ ID NO 46
<211> LENGTH: 21
<212> TYPE: DNA
<213> ORGANISM: Artificial Sequence
<220> FEATURE:
<223> OTHER INFORMATION: Synthetic

<400> SEQUENCE: 46
tgaatcagaa gatgaagtca a                                                   21

<210> SEQ ID NO 47
<211> LENGTH: 20
<212> TYPE: DNA
<213> ORGANISM: Artificial Sequence
<220> FEATURE:
<223> OTHER INFORMATION: Synthetic

<400> SEQUENCE: 47
tgaatcagaa gatgaagtca                                                     20

<210> SEQ ID NO 48
<211> LENGTH: 22
<212> TYPE: DNA
<213> ORGANISM: Artificial Sequence
<220> FEATURE:
<223> OTHER INFORMATION: Synthetic

<400> SEQUENCE: 48
tgaatcagaa gatgaagtca at                                                  22

<210> SEQ ID NO 49
<211> LENGTH: 21
<212> TYPE: DNA
<213> ORGANISM: Artificial Sequence
<220> FEATURE:
<223> OTHER INFORMATION: Synthetic

<400> SEQUENCE: 49
tgaatcagaa gatgaagtca c                                                   21

<210> SEQ ID NO 50
<211> LENGTH: 22
<212> TYPE: DNA
<213> ORGANISM: Artificial Sequence
<220> FEATURE:
<223> OTHER INFORMATION: Synthetic

<400> SEQUENCE: 50
```

```
tgaatcagaa gatgaagtca cc                                              22

<210> SEQ ID NO 51
<211> LENGTH: 19
<212> TYPE: DNA
<213> ORGANISM: Artificial Sequence
<220> FEATURE:
<223> OTHER INFORMATION: Synthetic

<400> SEQUENCE: 51
tgaatcagaa gatgaagtc                                                  19

<210> SEQ ID NO 52
<211> LENGTH: 23
<212> TYPE: DNA
<213> ORGANISM: Artificial Sequence
<220> FEATURE:
<223> OTHER INFORMATION: Synthetic

<400> SEQUENCE: 52
tgaatcagaa gatgaagtca att                                             23

<210> SEQ ID NO 53
<211> LENGTH: 22
<212> TYPE: DNA
<213> ORGANISM: Artificial Sequence
<220> FEATURE:
<223> OTHER INFORMATION: Synthetic

<400> SEQUENCE: 53
tgaatcagaa gatgaagtca ct                                              22

<210> SEQ ID NO 54
<211> LENGTH: 21
<212> TYPE: DNA
<213> ORGANISM: Artificial Sequence
<220> FEATURE:
<223> OTHER INFORMATION: Synthetic

<400> SEQUENCE: 54
tgaatcagaa gatgaagtca t                                               21

<210> SEQ ID NO 55
<211> LENGTH: 23
<212> TYPE: DNA
<213> ORGANISM: Artificial Sequence
<220> FEATURE:
<223> OTHER INFORMATION: Synthetic

<400> SEQUENCE: 55
tgaatcagaa gatgaagtca cca                                             23

<210> SEQ ID NO 56
<211> LENGTH: 21
<212> TYPE: RNA
<213> ORGANISM: Artificial Sequence
<220> FEATURE:
<223> OTHER INFORMATION: Synthetic

<400> SEQUENCE: 56
gaaucagaag augaagucaa a                                               21

<210> SEQ ID NO 57
<211> LENGTH: 21
<212> TYPE: RNA
<213> ORGANISM: Artificial Sequence
```

```
<220> FEATURE:
<223> OTHER INFORMATION: Synthetic

<400> SEQUENCE: 57
ugacuucauc uucugauuca a                                              21

<210> SEQ ID NO 58
<211> LENGTH: 27
<212> TYPE: RNA
<213> ORGANISM: Artificial Sequence
<220> FEATURE:
<223> OTHER INFORMATION: Synthetic

<400> SEQUENCE: 58
caauuugacu ucaucuucug auucaag                                        27

<210> SEQ ID NO 59
<211> LENGTH: 25
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (24)..(25)
<223> OTHER INFORMATION: dTdG

<400> SEQUENCE: 59
ugaaucagaa gaugaaguca aautg                                          25

<210> SEQ ID NO 60
<211> LENGTH: 27
<212> TYPE: RNA
<213> ORGANISM: Artificial Sequence
<220> FEATURE:
<223> OTHER INFORMATION: Synthetic

<400> SEQUENCE: 60
ccaauuugac uucaucuucu gauucaa                                        27

<210> SEQ ID NO 61
<211> LENGTH: 23
<212> TYPE: RNA
<213> ORGANISM: Artificial Sequence
<220> FEATURE:
<223> OTHER INFORMATION: Synthetic

<400> SEQUENCE: 61
gaaucagaag augaagucaa auu                                            23

<210> SEQ ID NO 62
<211> LENGTH: 25
<212> TYPE: RNA
<213> ORGANISM: Artificial Sequence
<220> FEATURE:
<223> OTHER INFORMATION: Synthetic

<400> SEQUENCE: 62
ugaacuugaa ucagaagaug aaguc                                          25

<210> SEQ ID NO 63
<211> LENGTH: 21
<212> TYPE: RNA
<213> ORGANISM: Artificial Sequence
<220> FEATURE:
<223> OTHER INFORMATION: Synthetic
```

```
<400> SEQUENCE: 63
aacuugaauc agaagaugaa g                                              21

<210> SEQ ID NO 64
<211> LENGTH: 21
<212> TYPE: RNA
<213> ORGANISM: Artificial Sequence
<220> FEATURE:
<223> OTHER INFORMATION: Synthetic

<400> SEQUENCE: 64
acuugaacuu agucuucuac u                                              21

<210> SEQ ID NO 65
<211> LENGTH: 21
<212> TYPE: RNA
<213> ORGANISM: Artificial Sequence
<220> FEATURE:
<223> OTHER INFORMATION: Synthetic

<400> SEQUENCE: 65
acuugaauca gaagaugaag u                                              21

<210> SEQ ID NO 66
<211> LENGTH: 21
<212> TYPE: RNA
<213> ORGANISM: Artificial Sequence
<220> FEATURE:
<223> OTHER INFORMATION: Synthetic

<400> SEQUENCE: 66
cuugaacuua gucuucuacu u                                              21

<210> SEQ ID NO 67
<211> LENGTH: 21
<212> TYPE: RNA
<213> ORGANISM: Artificial Sequence
<220> FEATURE:
<223> OTHER INFORMATION: Synthetic

<400> SEQUENCE: 67
aggcaagaug cuggcauagc u                                              21

<210> SEQ ID NO 68
<211> LENGTH: 23
<212> TYPE: RNA
<213> ORGANISM: Artificial Sequence
<220> FEATURE:
<223> OTHER INFORMATION: Synthetic

<400> SEQUENCE: 68
aggcaagaug cuggcauagc ucc                                            23

<210> SEQ ID NO 69
<211> LENGTH: 22
<212> TYPE: RNA
<213> ORGANISM: Artificial Sequence
<220> FEATURE:
<223> OTHER INFORMATION: Synthetic

<400> SEQUENCE: 69
uguaaacauc cuugacugga ag                                             22

<210> SEQ ID NO 70
<211> LENGTH: 24
```

-continued

<212> TYPE: RNA
<213> ORGANISM: Artificial Sequence
<220> FEATURE:
<223> OTHER INFORMATION: Synthetic

<400> SEQUENCE: 70
uguaaacauc cuugacugga agcc                                              24

<210> SEQ ID NO 71
<211> LENGTH: 22
<212> TYPE: RNA
<213> ORGANISM: Artificial Sequence
<220> FEATURE:
<223> OTHER INFORMATION: Synthetic

<400> SEQUENCE: 71
uguaaacauc cccgacugga ag                                                22

<210> SEQ ID NO 72
<211> LENGTH: 24
<212> TYPE: RNA
<213> ORGANISM: Artificial Sequence
<220> FEATURE:
<223> OTHER INFORMATION: Synthetic

<400> SEQUENCE: 72
uguaaacauc cccgacugga agcc                                              24

<210> SEQ ID NO 73
<211> LENGTH: 22
<212> TYPE: DNA
<213> ORGANISM: Artificial Sequence
<220> FEATURE:
<223> OTHER INFORMATION: Synthetic

<400> SEQUENCE: 73
agctacatct ggctactggg tc                                                22

<210> SEQ ID NO 74
<211> LENGTH: 23
<212> TYPE: DNA
<213> ORGANISM: Artificial Sequence
<220> FEATURE:
<223> OTHER INFORMATION: Synthetic

<400> SEQUENCE: 74
agctacatct ggctactggg tcc                                               23

<210> SEQ ID NO 75
<211> LENGTH: 21
<212> TYPE: RNA
<213> ORGANISM: Artificial Sequence
<220> FEATURE:
<223> OTHER INFORMATION: Synthetic

<400> SEQUENCE: 75
ugaagcugcu aacuaccaau u                                                 21

<210> SEQ ID NO 76
<211> LENGTH: 21
<212> TYPE: RNA
<213> ORGANISM: Artificial Sequence
<220> FEATURE:
<223> OTHER INFORMATION: Synthetic

<400> SEQUENCE: 76

```
uugguaguua gcagcuucau u                                         21

<210> SEQ ID NO 77
<211> LENGTH: 23
<212> TYPE: RNA
<213> ORGANISM: Artificial Sequence
<220> FEATURE:
<223> OTHER INFORMATION: Synthetic

<400> SEQUENCE: 77
uugguaguua gcagcuucau ucc                                       23

<210> SEQ ID NO 78
<211> LENGTH: 22
<212> TYPE: RNA
<213> ORGANISM: Artificial Sequence
<220> FEATURE:
<223> OTHER INFORMATION: Synthetic

<400> SEQUENCE: 78
uugguaguua gcagcuucau uu                                        22

<210> SEQ ID NO 79
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (20)..(21)
<223> OTHER INFORMATION: dTdT

<400> SEQUENCE: 79
uuuguugcga ggcugauuct t                                         21

<210> SEQ ID NO 80
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (20)..(21)
<223> OTHER INFORMATION: dTdT

<400> SEQUENCE: 80
gcacggaagu ccaucugaat t                                         21
```

MODIFICATION OF SMALL RNAs FOR THERAPEUTIC USES

PRIORITY CLAIM

This application is a U.S. national phase application of International Patent Application No. PCT/US19/39622, filed Jun. 27, 2019, which claims priority to U.S. Provisional Application No. 62/690,538, filed on Jun. 27, 2018, each of which are incorporated by reference herein in their entirety, including drawings.

STATEMENT OF GOVERNMENT INTEREST

This invention was made with government support under R01 AI029329, and R01 HL074704 awarded by the National Institutes of Health. The government has certain rights in the invention.

SEQUENCE LISTING

This application contains a Sequence Listing, which was submitted in ASCII format via Patent Center, and is hereby incorporated by reference in its entirety. The ASCII copy, created on Dec. 17, 2020, is named 8187US01_SequenceListing.txt and is 15,000 bytes in size.

BACKGROUND

Small RNAs are a type of non-coding RNA having many therapeutic uses due to their specificity, functional diversity and limited toxicity. Many of such small RNAs are in clinical development or available for clinical use. However, small RNAs are unstable in a biological environment and their short in vivo half-life due to quick degradation by nucleases limits their therapeutic effects. Therefore, there is a need in the field for modified small RNAs having improved stability and prolonged in vivo half-life.

SUMMARY

In one aspect, provided herein is a method of improving the stability of a small RNA molecule by adding one or more non-templated nucleotides to the 3' end of the small RNA molecule. The method may comprise a step of contacting the small RNA molecule with an exonuclease to remove the 3' overhang of the small RNA molecule before adding one or more non-templated nucleotides to the 3' end of the small RNA molecule. In some embodiments, the exonuclease is 3' to 5' exonuclease. In some 14412229.3 embodiments, the exonuclease directly binds to Dicer.

In some embodiments, the small RNA molecule is cytidylated by adding one or more cytidines to the 3' end of the small RNA molecule. For example, one cytidine, two cytidines, three cytidines, four cytidines, or five cytidines are added to the 3' end of the small RNA molecule. In certain embodiments, adding one or two cytidines to the 3' end of the small RNA molecule improved the stability of the small RNA molecule without any undesired impact on the therapeutic effects of the small RNA molecule. In some embodiments, the small RNA molecule is uridylated by adding one or more uridines to the 3' end of the small RNA molecule. For example, one uridine, two uridines, three uridines, four uridines, or five uridines are added to the 3' end of the small RNA molecule. In certain embodiments, adding one or two uridines to the 3' end of the small RNA molecule improved the stability of the small RNA molecule without any undesired impact on the therapeutic effects of the small RNA molecule. In some embodiments, the in vivo stability of the small RNA molecule is improved by the modifications disclosed above. The improved in vivo stability is demonstrated by prolonged half-life and decreased degradation of the modified small RNA molecule in cells in comparison to the corresponding unmodified small RNA molecule in cells.

In some embodiments, the small RNA molecules encompassed in this disclosure include but are not limited to small RNAs that are capable of inducing RNA interference (RNAi), such as small interfering RNA (siRNA), short hairpin RNA (shRNA), microRNA (miRNA) and Piwi-interacting RNAs (piRNAs). In some embodiments, the small RNA molecules include small activating RNAs (saRNAs) which are small double-stranded RNAs (dsRNAs) capable of inducing transcriptional gene activation. In some embodiments, the small RNA molecules disclosed herein are Dicer-derived, e.g., produced by cleaving double-stranded RNAs with Dicer. In some embodiments, the small RNA molecules disclosed herein bind to the Argonaute protein to form a RNA-induced silencing complex (RISC). In some embodiments, the small RNA molecules disclosed herein have a size of less than 50 base pairs (bps), less than 45 bps, less than 40 bps, less than 35 bps, less than 30 bps, less than 35 bps, less than 30 bps, less than 25 bps, less than 20 bps, or less than 15 bps. In some embodiments, the small RNA molecules disclosed herein have a size of about 15 bps, about 16 bps, about 17 bps, about 18 bps, about 19 bps, about 20 bps, about 21 bps, about 22 bps, about 23 bps, about 24 bps, about 25 bps, about 26 bps, about 27 bps, about 28 bps, about 29 bps, or about 30 bps.

In another aspect, disclosed herein is a modified small RNA molecule having an improved stability comparing to the unmodified small RNA molecule. Preferably the in vivo stability of the small RNA molecule is improved. The modified small RNA molecule comprises the entire nucleotide sequence of the corresponding unmodified small RNA molecule, and one or more non-templated cytidines added to the 3' end of the unmodified small RNA molecule. For example, one cytidine, two cytidines, three cytidines, four cytidines, or five cytidines are added to the 3' end of the small RNA molecule. In certain embodiments, adding one or two cytidines to the 3' end of the small RNA molecule improved the in vivo stability of the small RNA molecule without any undesired impact on the therapeutic effects of the small RNA molecule. Alternatively, the modified small RNA molecule comprises the entire nucleotide sequence of the corresponding unmodified small RNA molecule, and one or more uridines added to the 3' end of the unmodified small RNA molecule. For example, one uridine, two uridines, three uridines, four uridines, or five uridines are added to the 3' end of the small RNA molecule. In certain embodiments, adding one or two uridines to the 3' end of the small RNA molecule improved the in vivo stability of the small RNA molecule without any undesired impact on the therapeutic effects of the small RNA molecule.

In another aspect, disclosed herein is a pharmaceutical composition comprising a therapeutically effective amount of a modified small RNA molecule having an improved stability comparing to the unmodified small RNA molecule. The modified small RNA molecule comprises the nucleotide sequence of the unmodified small RNA molecule, and one or more cytidines added to the 3' end of the unmodified small RNA molecule. For example, one cytidine, two cytidines, three cytidines, four cytidines, or five cytidines are added to the 3' end of the small RNA molecule. In certain embodiments, adding one or two cytidines to the 3' end of the small RNA molecule improved the in vivo stability of the small RNA molecule without any undesired impact on the therapeutic effects of the small RNA molecule. Alternatively, the modified small RNA molecule comprises the nucleotide sequence of the unmodified small RNA molecule, and one or more uridines added to the 3' end of the unmodified small RNA molecule. For example, one uridine, two uridines, three uridines, four uridines, or five uridines are added to the 3' end of the small RNA molecule. In certain embodiments, adding one or two uridines to the 3' end of the small RNA molecule improved the in vivo stability of the small RNA molecule without any undesired impact on the therapeutic effects of the small RNA molecule. In some embodiments, the pharmaceutical composition further comprises one or more pharmaceutically acceptable carriers or excipients.

In another aspect, disclosed herein is a method of treating various diseases and conditions treatable by small therapeutic RNAs in a subject. Such diseases and conditions include but are not limited to cancer, physiological and metabolic disorders, cardiovascular diseases, monogenic diseases, neurological diseases, ocular diseases, and viral infections. Various diseases are treatable by small therapeutic RNAs, and can benefit from the technology disclosed herein. For a given disease or condition, a particular small therapeutic RNA for treating the disease or condition can be stabilized by modification, thereby enhancing its therapeutic effects. The method comprises administering to a subject suffering from a disease or condition a therapeutically effective amount of the modified small RNA molecule or the pharmaceutical composition comprising the modified small RNA molecule, both described above. In some embodiments, the subject suffers from cancer such as colon cancer. In some embodiments, the small RNA molecule targets hnRNP H1.

BRIEF DESCRIPTION OF THE DRAWINGS

FIG. 1 illustrates the structure of certain small RNAs used in this disclosure, such as hnRNP H1 targeted small RNAs.

FIG. 5 compares the efficiency and stability of the DsiRNAs and siRNAs. The efficiency was tested by luciferase assay for siRNA gene knockdown activity. The stability was determined by the normalized count numbers of each siRNA strand by deep-sequencing. S represents the knockdown activity or count numbers of the sense strand from siRNAs. AS represents the knockdown activity or count numbers of the anti-sense strand from siRNAs.

FIG. 6 compares the efficiency and stability of the antisense strand in DsiRNAs.

FIG. 9 shows the top 10 reads for deep sequencing of perfectly aligned small RNAs from corrected total RNA, Ago2 and DICER immunoprecipitation (IP). To calculate the normalized count numbers, reads for each strand were divided by the total number of each deep-sequencing.

FIG. 12 shows that the mono-uridylation predominantly exhibited in the sequencing cohort of Dicer bound siRNAs.

FIG. 14A shows the efficiency of siRNA (middle bar) and uridylated siRNA (right bar) in HCT116 (no treatment, left bar), Dicer knockdown HCT116 (siDicer), and Ago2 deficient HCT116 (siAgo2). siRNA H1 and H2 targeted hnRNPH1 was designed (FIG. 14B) and siRNA efficiency was tested in HCT116, Dicer deficient HCT116, and Ago2 knockdown HCT116 (FIGS. 14C-14D). In FIG. 14B, the top strands are antisense strands for siRNA H1 and siRNA H2. FIG. 14C shows the siRNA efficiency of antisense (left bar) or sense strand (right bar). Both siRNAs were selected for the sense strand. In FIG. 14D, for each group of siRNA H1 and siRNA H2, left bar is siRNA, and right bar is uridylated siRNA.

FIGS. 15A-15B show the normalized count number of individual miRNA in total RNA (−Con.) and RNA from Dicer immunoprecipitation (DIP). The mean of the normalized count number reduced in DIP (FIG. 15B). Error bar represents SEM. FIGS. 15C-15D show the percentage of uridylated sequence in individual miRNA. Each dot represents an individual miRNA. The percentage of uridylated sequence of miRNA reduced in DIP.

FIG. 24 compares C addition and U addition of the Dicer and Ago2 binding pattern of 3' end non-templated smRNAs. Left bar: cell lysates from total RNA, middle bar: cell lysates from collected by Dicer, and right bar: cell lysates from immunoprecipitated Ago2.

FIG. 43 shows the expression levels of individual miRNAs in Dicer or Ago2 IP. Solid circles show the selected strand of miRNA. Dashed circles show the non-selected strand of miRNA.

DETAILED DESCRIPTION

Figure 2:
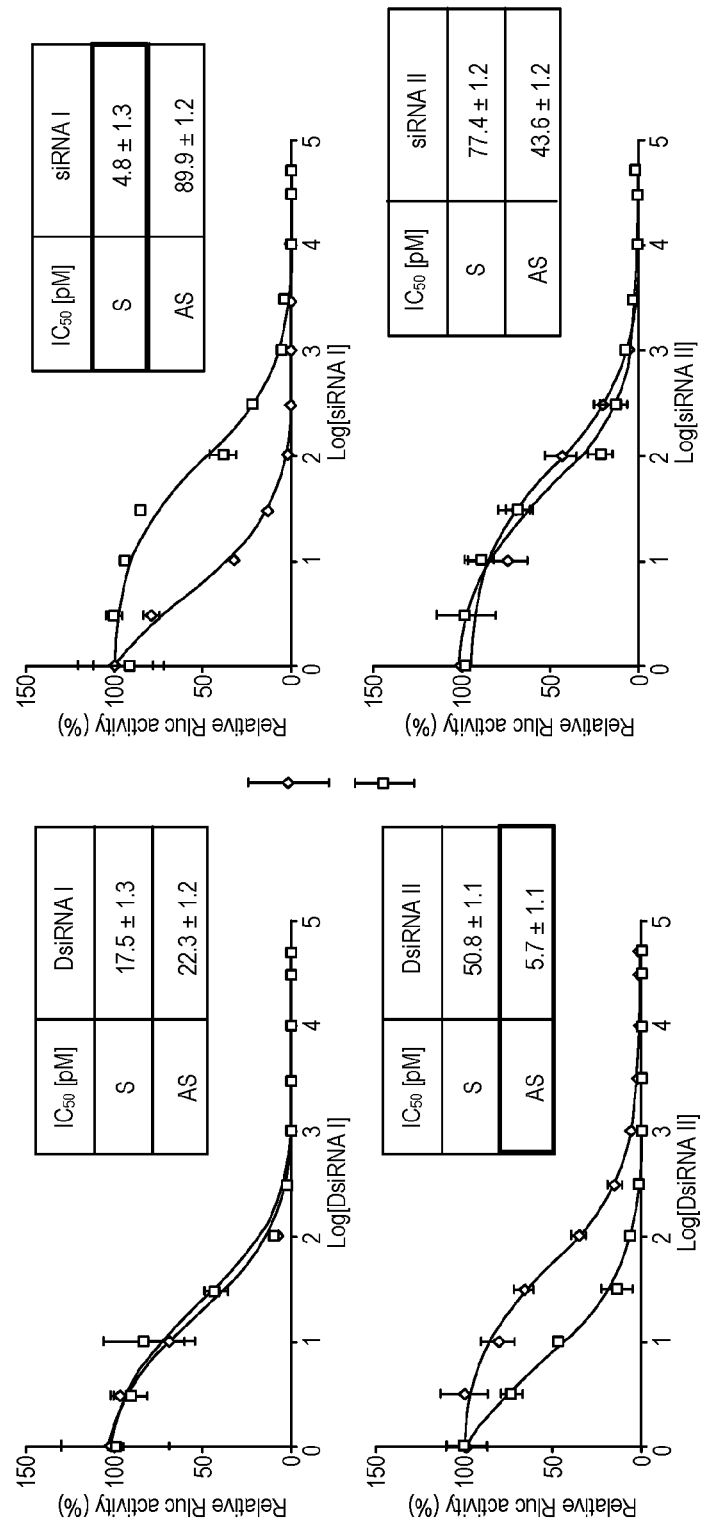
FIG. 2 demonstrates the gene knockdown efficiency of the Dicer substrate siRNAs (DsiRNAs) and siRNAs. HCT116 cells were co-transfected with psi-hnRNPH1_AS or _S reporter plasmid and a small RNA (3 PM to 50 nM). Cell lysates were collected 24-hours post-transfection and used in the Dual-Luciferase Reporter assay system.

Methods of improving the stability of small therapeutic RNAs are provided herein. The method includes adding one or more non-templated nucleotides, such as cytidines and uridines, to the 3' end of the small therapeutic RNA molecule. Such modified small RNAs can stably bind to Dicer and escape the cell defense system to stably exist in cells for a longer time such that the modified small RNAs can achieve their therapeutic effects. Various small therapeutic RNAs are encompassed by this disclosure. In some embodiments, the small RNAs include, for example, siRNA, shRNA, miRNA, and saRNA. In some embodiments, the small RNAs include Dicer substrate small RNAs, such as Dicer substrate siRNAs (DsiRNAs), which can bind to Dicer and result in increased RNAi activities.

Adding non-templated nucleotides to the 3' ends of small RNA molecules can have a profound impact on the stability and biological function of the small RNA molecules. Evidence accumulated over the past few decades has established roles for uridylation and adenylation in small RNA stabilization and degradation. 3'-end formation of small RNAs occurs through a delicate balance between the removal and the addition of nucleotides. By sequencing transfected small RNAs of total RNA and associated with Dicer-containing ribonucleoprotein (RNP), the majority of non-template mono-uridine in 3' end of small RNAs were demonstrated to be associated with Dicer.

miRNAs and siRNAs appeared to be distinguished in two primary ways. First, miRNAs were viewed as endogenous and purposefully expressed products of an organism's own genome, whereas siRNAs were thought to be primarily exogenous in origin, derived directly from the virus, transposon, or transgene trigger. Second, miRNAs appeared to be processed from stem-loop precursors with incomplete double-stranded character, whereas siRNAs were found to be excised from long, fully complementary double-stranded RNAs (dsRNAs). Despite these differences, the size similarities and sequence-specific inhibitory functions of miRNAs and siRNAs immediately suggested relatedness in biogenesis and mechanism. As demonstrated herein, EXOD (ERI protein) enriched the siRNA stability. EXOD stimulates the long-term stability of mono-uridylated siRNAs in colon cancer cells. This feature makes mono-uridylated siRNA a more powerful therapeutic agent.

As demonstrated herein, non-template uridine addition was predominant in Dicer immunoprecipitation with both the selected strand and non-selected strand of the small RNAs. The experimental data shows that the mono-uridylated small RNAs are favorable to Dicer. However, EXOD enriched siRNA stability but not miRNA. Mono-uridine modified siRNA shows the efficiency for a longer term in colorectal cancer, and therefore such modified siRNAs have therapeutic uses in treating cancer.

As disclosed herein are cytidylated small RNAs which demonstrated improved stability, thereby enhancing the therapeutic effects comparing to unmodified small RNAs. It was demonstrated that small RNAs such as siRNA and CTP were co-localized in the nucleus of the cell.

For exogenous small RNAs such as siRNAs, the small RNA molecules are modified based on the known sequences of such RNA molecules by adding one or more non-templated nucleotide to the 3' end of the known sequences. Optionally, the small RNA molecules are treated with an exonuclease to remove the 3' overhang before cytidylation.

For endogenous small RNAs such as miRNAs, immunoprecipitation of Dicer or Argonaute complex are performed to recover endogenous small RNAs captured by Dicer or Argonaute. Sequence analysis is performed to determine the sequence of the captured endogenous small RNAs. Based on the obtained sequence, modified small RNAs are produced by adding one or more non-templated cytidines or uridines to the 3' end of the sequence. Such modified miRNAs are transfected to cells for therapeutic uses.

The following examples are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Example 1: Materials and Methods

Determination of IC50 value: Generation of the psiCHECK-hnRNPH_AS (antisense reporter) and psiCHECK-hnRNPH_S (sense reporter) vectors used in this study was previously disclosed (Sakurai et al., 2011). HCT116 cells were co-transfected in a 48-well format (50,000 cells/well) with psiCHECK-hnRNPH-AS or psiCHECK-hnRNPH-S vector (50 ng), 3 pM-50 nM small RNAs and 1 µL Lipofectamine 2000 (Invitrogen) per well. Cells were lysed in 1× Passive Lysis Buffer (Promega) 24 hours after transfection and the efficiency and duration of small RNA mediated gene silencing analyzed using the Dual-Luciferase Reporter System (Promega) and a Veritas microplate luminometer (Turner Biosystems). The average was calculated from the replicates to set Renilla/Firefly luciferase expression to 100%. An IC50 curve was generated using Prism 5.01 software (GraphPad). Sigmoidal dose response was calculated according to $\gamma=\text{Bottom}+(\text{Top-Bottom})/(1+10) \lambda$ (($\text{Log EC50}-\chi$)); where $\chi$ is the logarithm of concentration and $\gamma$ is the response.

For siDicer or siAGO2 treatment, HCT116 cells were seeded in a 24-well plate (100,000 cells/well) and transfected with 20 nM siRNA-targeting Dicer or AGO2. The sequences of the siRNAs used in this study were: Dicer, 5'-UUUGUUGCGAGGCUGAUUCdTdT-3' (SEQ ID NO: 79); AGO2, 5'-GCACGGAAGUCCAUCUGAAdTdT-3' (SEQ ID NO: 80). Twenty-four hours later, the siRNA-treated cells were lysed and used for Dual Luciferase assays and RT-qPCR, respectively. The same procedure described above was used for Dual Luciferase assays.

Flag-tag immunoprecipitation: HCT116 cell cultures (~80% confluent) in 10-cm dishes were co-transfected with a Flag-tagged Argonaute or Dicer expression plasmid and each small RNA and incubated for 48 hours. Cells were then washed with ice-cold 1×PBS, followed by incubation (15 minutes) in 1 mL of lysis buffer (10 mM Tris-HCl PH 7.5, 10 mM KCl, 2 mM $MgCl_2$, 5 mM DTT, 2 M NaCl and 1× Complete EDTA-free protease inhibitor cocktail; Roche). Cells were then scraped off the plate and the suspensions were supplemented with recombinant RNasin (final concentration 0.4 U/µL, Promega). The resulting mixtures were centrifuged for 20 minutes at 13,000 rpm. The supernatant was recovered and centrifuged for 5 minutes at 13,000 rpm. Anti-Flag agarose beads (40 µL; Sigma) were pre-blocked for 2 hours at 4° C. in W1 buffer (0.5% Nonidet P-40, 150 mM NaCl, 2 mM MgCl2, 2 mM CaCl2, 20 mM Tris-HCl, pH 7.5, 5 mM DTT and 1× Complete EDTA-free protease inhibitor cocktail) containing 1 mg/mL yeast tRNA and 1 mg/mL BSA. Anti-Flag M2 affinity beads (Sigma) were mixed with the supernatant protein extract according to the manufacturer's recommendations and then incubated (3 hours, 4° C.). The gel was washed with the same buffer, and the beads were resuspended in 3× Flag peptide for elution and incubated (30 minutes, 4° C.). RNAs were eluted from the beads by phenol extraction.

Small RNA deep sequencing: HCT116 cells were split in 10-cm dish to 70-80% confluency in DMEM media one day prior to transfection. Cells were transfected with the small RNAs (50 nM) using lipofectamine 2000 according to the manufacturer's instructions (Invitrogen). Forty-eight hours after transfection, total RNA was isolated with TriZol reagent (Invitrogen, Carlsbad, CA) for Illumina deep sequencing.

Bioinformatic analysis: To identify the most frequent sense and anti-sense products from each dsiRNA molecule, Novoalign v2.05 (www.novocraft.com) was used to align the sequences generated from Illumina Pipeline v1.6 to the sense and antisense strand of each siRNA molecule. All subsequent analysis was done using the R statistical environment and Bioconductor packages "Biostrings" and "ShortRead" (Morgan et al., 2009). Only sequences that could be aligned to the siRNA sequences without mismatches were retained. The relative start and end position of identified sequences on the siRNA sequence were summarized based on their aligned position and length. The frequency for each product was counted.

To examine if nucleotides were added at either end of the dicer-processed product, the raw sequences were matched to the siRNA anti-sense sequence with a seed size of 16 after removing the 3'-adapter with Bioconductor package "ShortRead". For example, for an siRNA sequence length of 23, the Illumina sequences were aligned to 8 seeds, which included the sub-sequence from bases 1-16, 2-17, and so on, of the original siRNA sequence. The matched sequences were then reduced to a set of unique sequences along with the frequencies of occurrence. This set of sequences was then aligned along with the siRNA reference sequence by using the ClustalX2 multiple alignment tool (Larkin et al., 2007) and not allowing gaps. The multiple aligned sequences were visualized and exported with JalView (Waterhouse et al., 2009). Extra bases at either end of the product were highlighted manually.

Confocal Microscopy: A two-Photon Zeiss LSM510 META Inverted microscope (Carl Zeiss, Jena, Germany) was used. Images were taken with the 40× or 63× water immersion C-APOCHROMAT objective lenses (N.A.=1.2) using multi-track configuration. The following filter sets were used: HFT UV488/543/633 with DBS NFT 490 or NFT 545, HFT KP 650 or mirror or none. An argon laser (488 nm) was used to excite Alexa 488 and emission was collected using a 500-550 nm band pass filter. A helium-neon laser (543 nm) was used to excite Alexa 555 and emission was collected using a 565-615 nm band pass filter. A Ti-Sapphire (Coherent, Inc) laser (790 nm) was used to excite DAPI and emission was collected using a 435-485 nm band pass filter.

Statistical analysis: All data represent the mean±S.D. Student's t-tests were performed using GraphPad Prism v4 (GraphPad Software).

Example 2: Difference Between miRNA-Mediated Gene Silencing and RNA Stability The efficacy of siRNAs targeting the hnRNP H1 mRNA was examined using the sequences shown in FIG. 1. Two versions of the small RNAs (I and II), which differed by only a single base pair, were designed. To address which features of siRNAs determine gene knockdown and activity strand selectivity, dual luciferase reporter assays were performed, in which the target hnRNP H1 sequence was cloned into the psiCHECK2 vector in either the sense or antisense orientation within the 3' untranslated region (UTR) of the *Renilla* luciferase gene. For this translation-based assay, the interference effects correlate well with small RNA efficiency at inhibiting mRNA translation of the *Renilla* luciferase gene. The relative silencing efficiencies of the sense versus antisense reporters were determined by which strand was most efficiently incorporated into RISC and advanced to the miRNA-mediated gene silencing pathway. Dose-dependent inhibition assays were performed to determine the IC50 values (i.e., the concentration of the small RNA for which its efficiency of gene silencing was reduced by half) for both strands of the small RNAs (Table 1, FIG. 2).

TABLE 1

Determination of hnRNPH1 small RNAs $IC_{50}$ value

| IC50 [pM] | siRNA I | siRNA II |
|---|---|---|
| Antisense strand (targeted sense strand) | 89.92 ± 1.206 | 43.55 ± 1.181 |
| Sense strand (targeted antisense strand) | 4.278 ± 1.213 | 77.41 ± 1.228 |

TABLE 1-continued

Determination of hnRNPH1 small RNAs $IC_{50}$ value

| IC50 [pM] | siRNA I | siRNA II |
|---|---|---|
| AS vs S* | 0.05 | 1.78 |
| S vs AS** | 21 | 0.56 |

*AS vs S (S preference): $IC_{50}$ value of antisense strand/$IC_{50}$ value of sense strand;
**S vs AS (AS preference): $IC_{50}$ value of sense strand/$IC_{50}$ value of antisense strand.

siRNAs targeting hnRNP H1 were tested at concentrations ranging from 0.001 to 50 nM. Asymmetric knockdown of the hnRNP H1 targets by the antisense and sense strands of both types of small RNAs was observed; the antisense strand of small RNAs targeted the sense mRNA strand of hnRNP H1. However, strand bias differed significantly between the siRNA I and II for a given version of these small RNAs. The sense strand of siRNA I (SI) had a 21-fold difference in IC50 value in preference of targeting the antisense mRNA strand of hnRNP H1, while the preference of siRNA II (SII) for targeting the sense mRNA strand of hnRNP H1 was only slightly greater than unity (Table 1 and FIG. 2). One of the two strands was preferred to serve as the guide of the sense strand of siRNA I and antisense strand of siRNA II. Thus, both the sequence targeted and the form (I versus II) of the small RNA influenced strand selectivity.

Figure 7:
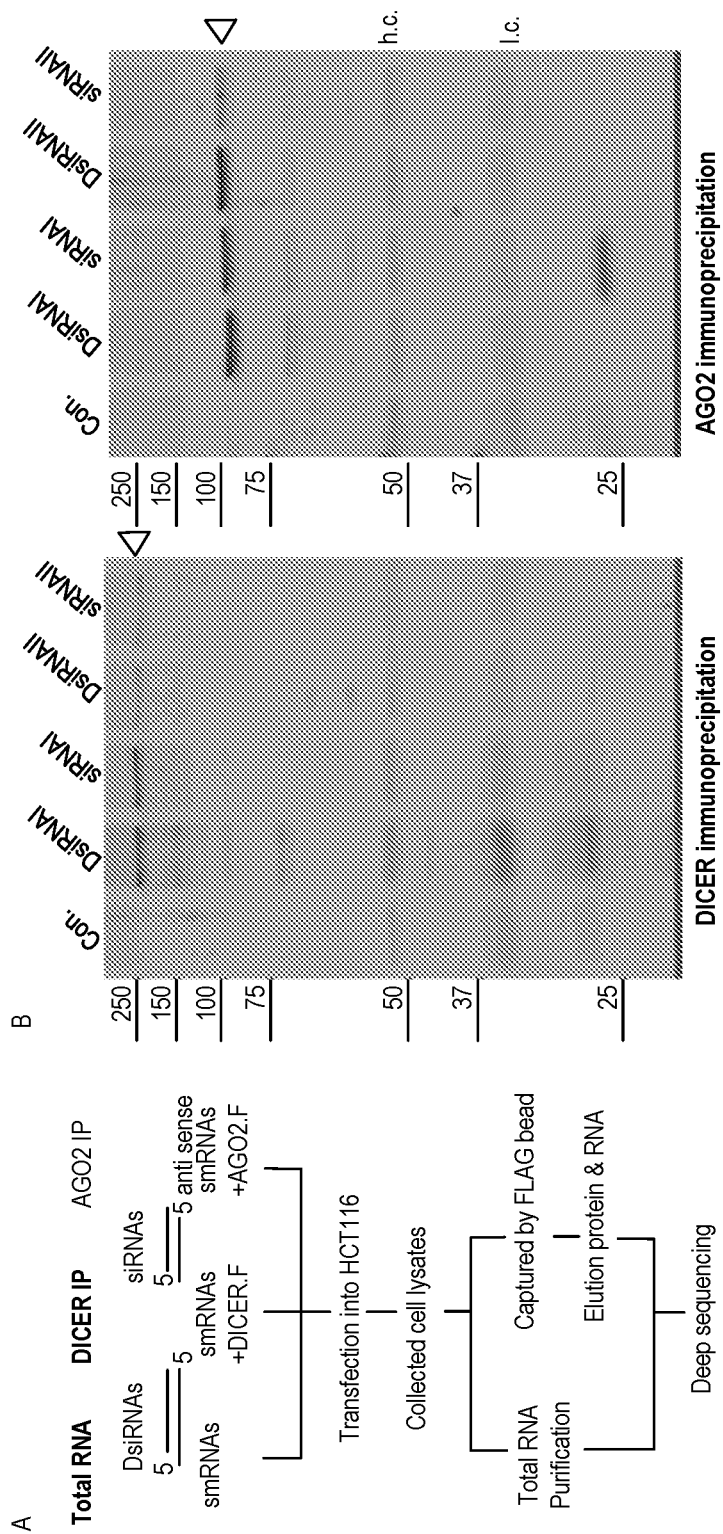
FIGS. 7A-7B show the process (FIG. 7A) and results (FIG. 7B) of immunoprecipitation for Dicer and Ago2. HCT116 cells were co-transfected with the small RNAs and FLAG-DICER or FLAG-AGO2 plasmid and then Dicer and Ago2 were immunoprecipitated using anti-FLAG beads and eluted from the bead using FLAG peptide. Cell extracts and FLAG-eluted proteins (FLAG-IP) were separated by SDS-PAGE, stained with silver staining solution.
Figure 8:
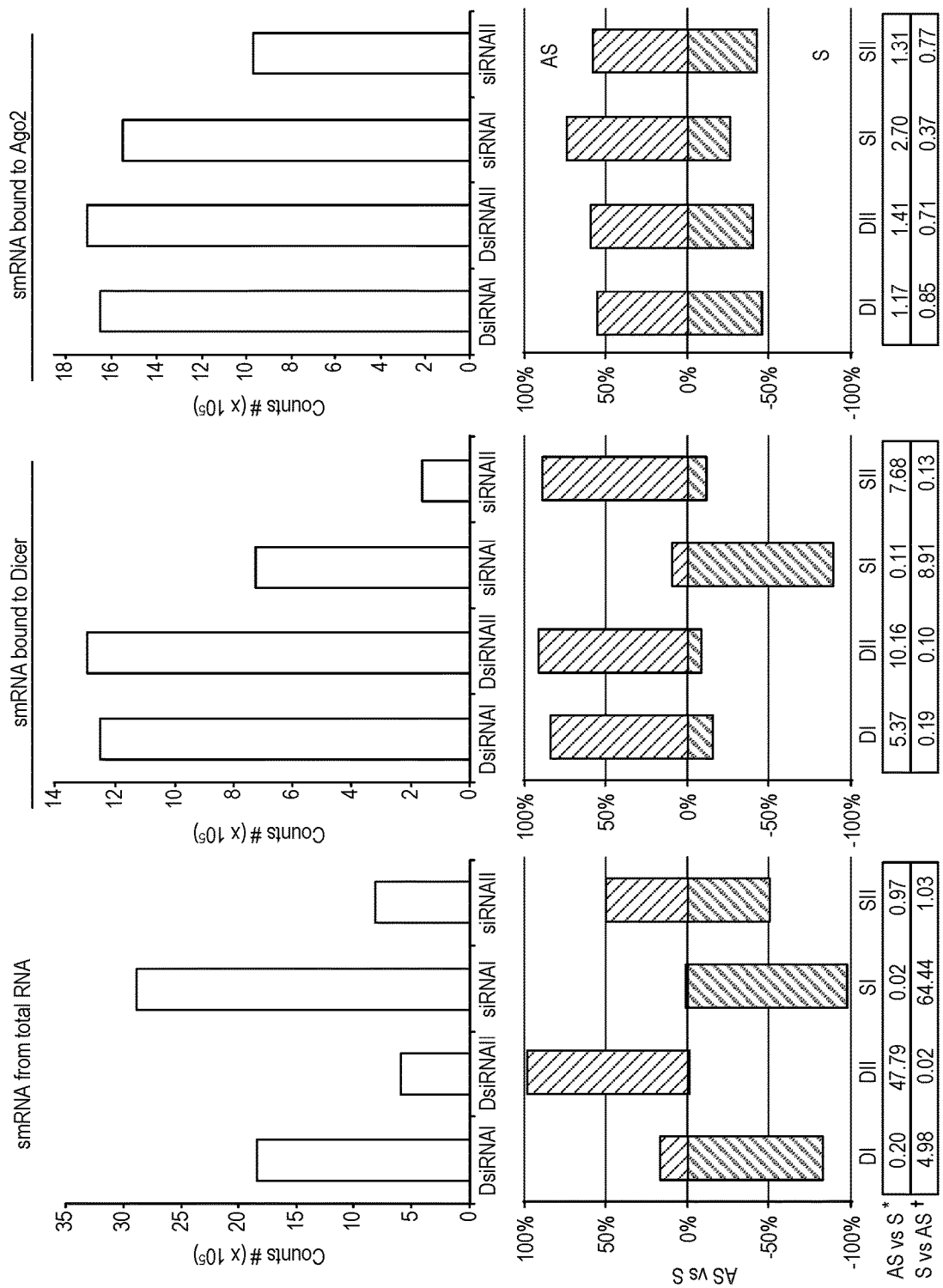
FIG. 8 shows the normalized count number of small RNAs from the total RNA, small RNAs bound to Dicer, and small RNAs bound to Ago2.

To identify the sequences that interact with AGO2 and DICER, FLAG-tagged AGO2 and DICER were expressed in HCT116 cells by transfection, and cell lysates were subjected to affinity purification with an anti-FLAG bead. Protein and RNA complexes eluted with 3× FLAG peptide, and the purified RNA was identified using deep-sequencing (FIG. 7A).

To further investigate the strand selectivity of the four small RNAs tested, an Illumina GAII sequencer was used to deep-sequence a transfected short RNA library from HCT116 cells. The extracted tags were then mapped to individual small RNAs. In this experiment, the number of reads obtained reflects the relative existence and stability of a given strand species (Table 2).

TABLE 2

Transfected small RNAs counts number of total RNA, Dicer RNA and Ago2 immunoprecipitation

| | siRNA I | | | siRNA II | | |
|---|---|---|---|---|---|---|
| | Total RNA | Dicer IP | AGO2 IP | Total RNA | Dicer IP | AGO2 IP |
| Total Reads | 21,388,815 | 10,606,494 | 22,003,133 | 25,345,783 | 1,940,450 | 16,282,902 |
| Matched to AS | 45,542 | 73,135 | 1,158,830 | 405,642 | 146,281 | 555,069 |
| Matched to S | 2,853,298 | 651,505 | 422,828 | 419,135 | 19,040 | 425,620 |
| Mapped Total | 2,898,840 | 724,640 | 1,581,658 | 824,777 | 165,321 | 980,689 |
| % of AS[1] | 0% | 1% | 5% | 2% | 8% | 3% |
| % of S[2] | 13% | 6% | 2% | 2% | 1% | 3% |
| % mapped to smRNA[3] | 14% | 7% | 7% | 3% | 9% | 6% |
| AS vs S[4] | 0.0 | 0.1 | 2.7 | 1.0 | 7.7 | 1.3 |
| S vs AS[5] | 62.7 | 8.9 | 0.4 | 1.0 | 0.1 | 0.8 |

[1]% of AS: matched to AS × 100/total reads
[2]% of S: matched to S × 100/total reads
[3]mapped to smRNA %: mapped total × 100/total reads
[4]AS vs S (AS preference): % of AS/% of S
[5]S vs AS (S preference): % of S/% of AS To compare the levels of each small RNA in the different samples, lists of the most prevalent species of short RNAs derived from both strands of transfected species were generated. The sequences, normalized counts and percent abundance of transfected small RNAs are shown in Table 2. The mapped total of siRNA I_sense which was the best gene knockdown efficiency in Table 1, had the highest normalized count number of 2,853,298 from lysates of total RNA.

Figure 3:
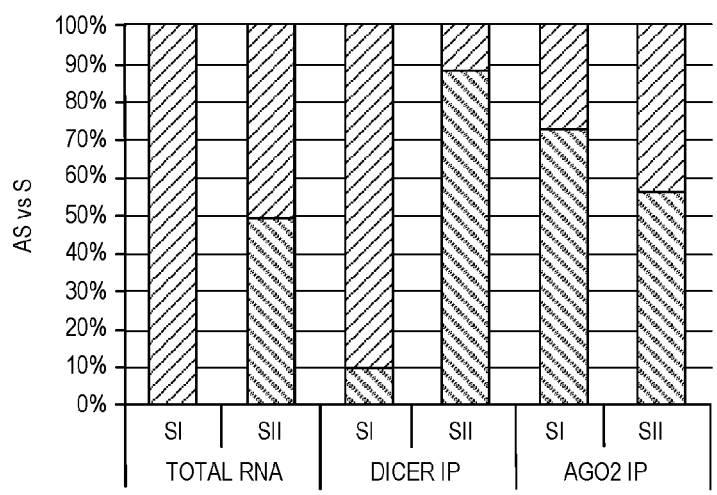
FIG. 3 shows the percentage of antisense (bottom bars) and sense strands (top bars) in total RNA, Dicer immunoprecipitation and Ago2 immunoprecipitation.
Figure 4:
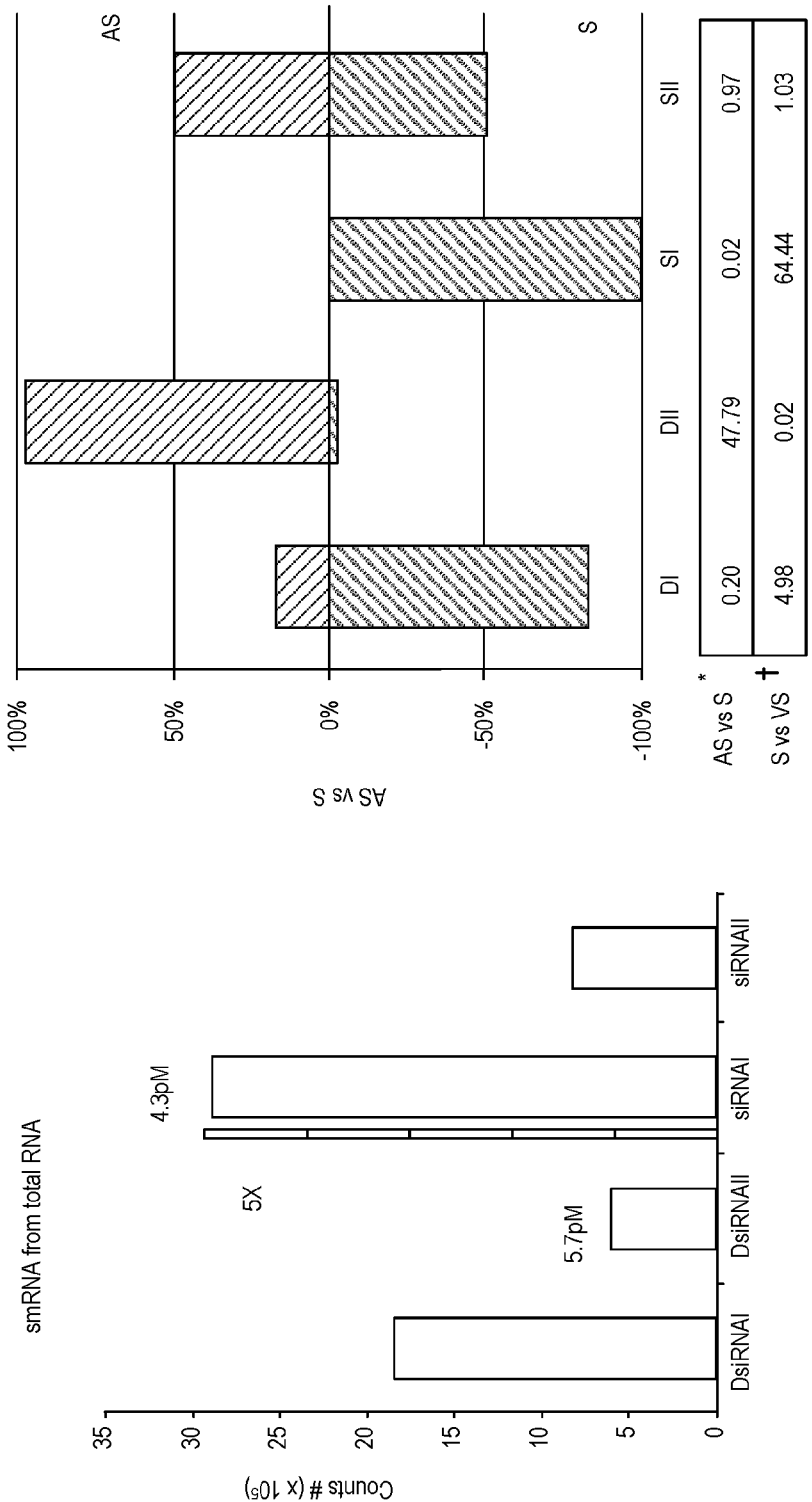
FIG. 4 demonstrates the strand stability of the sense and antisense RNAs. The count number of each small RNA in the cell is determined by deep-sequencing. The cells were transfected with small RNAs such as DSiRNAs and siRNAs and after two days, the total RNA was recovered for sequencing.

To compare the antisense and sense strands of transfected small RNAs, the percentage of antisense or sense strands was calculated (FIG. 3). The antisense strand is the nonselective strand in the version I of the small RNA. The antisense strand of siRNA I immediately degraded in cells, this means that the antisense strand of siRNA I is the passenger strand, and the other strand of the selected strand of sense appeared to be the high-efficiency strand.

Figure 10:
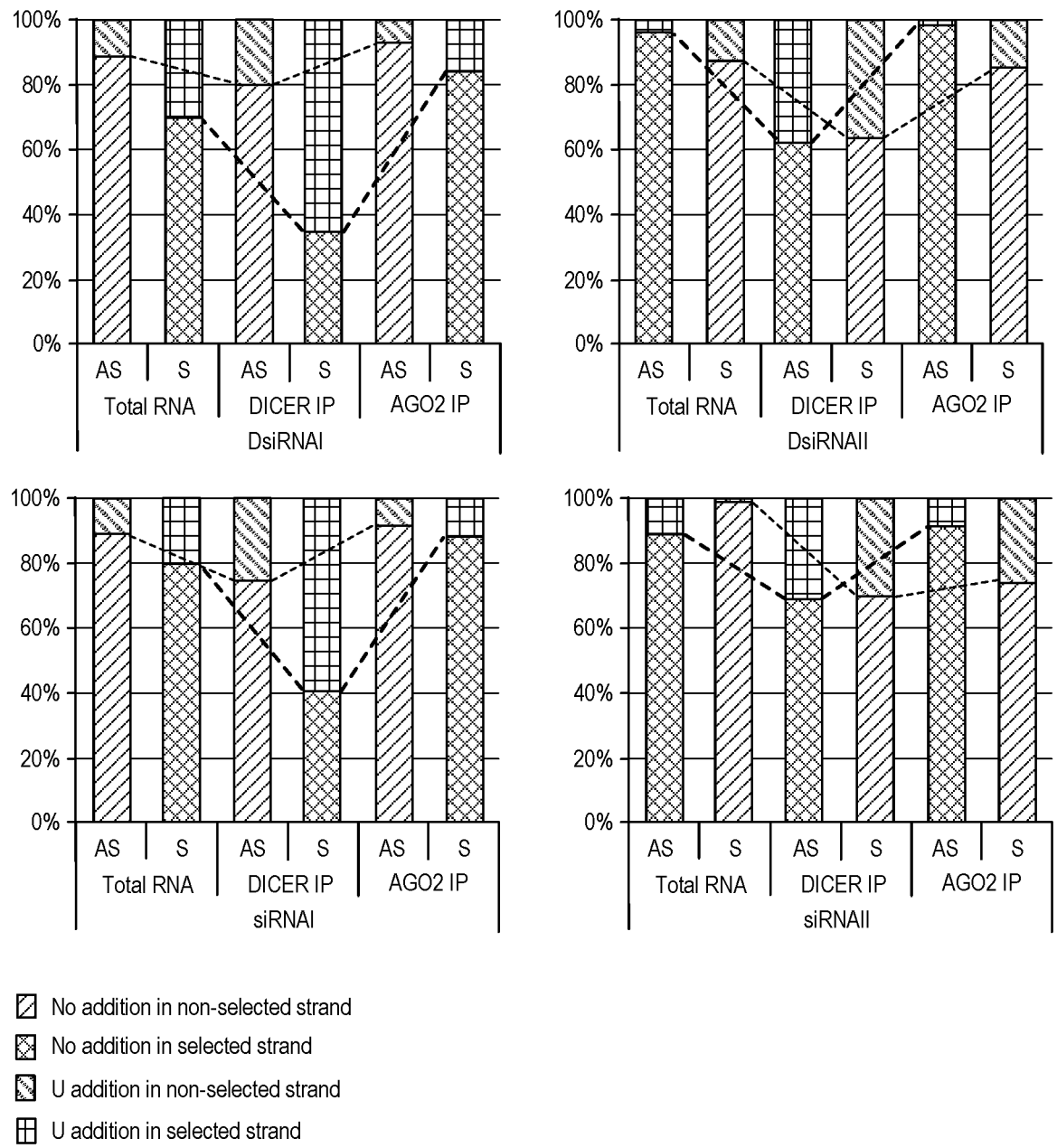
FIG. 10 shows the percentage of uridylation of the small RNAs in HCT116 cells. Gray bars represent no addition in non-selected strand, black bars represent no addition in selected strand, light green bars represent uridine addition in non-selected strand, and dark green bars represent uridine addition in selected strand. Non-templated uridine was added at the 3' end of the small RNAs and the non-modified and modified small RNAs were used to transfect HCT116 cells. AS top bars: U addition in non-selected strand; AS bottom bars: no addition in non-selected strand; S top bars: U addition in selected strand; S bottom bars: no addition in selected strand.

To understand the uridylation in siRNAs, the percentage of uridylation in each strand of siRNAs from total, Ago2 bound and Dicer bound RNA pools was analyzed (FIG. 10). Interestingly, the percentage of uridylation increased in DICER bound small RNA pools. However, Ago2 bound siRNA showed a percentage similar to total RNA. These results suggest that uridylated siRNA can bind to Dicer but not Ago2.

Example 3: Pattern of Uridylation

To investigate the association between the extent of U addition and truncation in 3' end of siRNAs, the siRNA sequences from small RNA deep sequencing data were analyzed (Tables 3-5).

TABLE 3

U addition from total lysate

| Number of U addition | Total Count | | | | Percentage | | | |
|---|---|---|---|---|---|---|---|---|
| | siRNA I | | siRNA II | | siRNA I | | siRNA II | |
| | GS | PS | GS | PS | GS | PS | GS | PS |
| 0 | 37,694 | 1,821,412 | 279,231 | 388,781 | 85.3 | 64.0 | 69.2 | 93.2 |
| 1 | 4,516 | 315,505 | 27,282 | 5,561 | 10.2 | 11.1 | 6.8 | 1.3 |
| 2 | 371 | 135,974 | 7,441 | 954 | 0.8 | 4.8 | 1.8 | 0.2 |
| 3 | 36 | 19,737 | 1,071 | 91 | 0.1 | 0.7 | 0.3 | 0.0 |
| 4 | 2 | 696 | 48 | 2 | 0.0 | 0.0 | 0.0 | 0.0 |
| 5 | | 23 | 1 | | | 0.0 | 0.0 | |
| 6 | | 1 | | | | 0.0 | | |
| | 42,619 | 2,293,348 | 315,074 | 395,389 | | | | |

TABLE 4

Ago2 Immunoprecipitation

| Number of U addition | Total Count | | | | Percentage | | | |
|---|---|---|---|---|---|---|---|---|
| | siRNA I | | siRNA II | | siRNA I | | siRNA II | |
| | AS | S | AS | S | AS | S | AS | S |
| 0 | 973,951 | 297,275 | 252,018 | 226,015 | 91.0 | 88.4 | 91.0 | 73.4 |
| 1 | 95,649 | 30,650 | 22,829 | 70,611 | 8.9 | 9.1 | 8.2 | 22.9 |
| 2 | 833 | 7,758 | 2,053 | 10,255 | 0.1 | 2.3 | 0.7 | 3.3 |
| 3 | 63 | 611 | 96 | 1,030 | 0.0 | 0.2 | 0.0 | 0.3 |
| 4 | | 12 | 6 | 15 | | 0.0 | 0.0 | 0.0 |
| 5 | | 1 | 1 | | | 0.0 | 0.0 | 0.0 |
| 6 | | | | 1 | | | | 0.0 |
| | 1,070,496 | 336,307 | 277,003 | 307,927 | | | | |

TABLE 5

| | Dicer Immunoprecipitation | | | | | | | |
|---|---|---|---|---|---|---|---|---|
| Number of U addition | Total Count | | | | Percentage | | | |
| | siRNA I | | siRNA II | | siRNA I | | siRNA II | |
| | AS | S | AS | S | AS | S | AS | S |
| 0 | 47,100 | 90,516 | 30,483 | 11,506 | 64.4 | 13.9 | 20.8 | 60.4 |
| 1 | 14,724 | 115,219 | 12,677 | 4,728 | 20.1 | 17.7 | 8.7 | 24.8 |
| 2 | 1,215 | 15,843 | 1,475 | 285 | 1.7 | 2.4 | 1.0 | 1.5 |
| 3 | 77 | 2,148 | 1 | 4 | | 0.3 | 0.0 | 0.0 |
| 4 | | 36 | | | | 0.0 | | |
| 5 | | | | | | 0.0 | | |
| 6 | | | | | | 0.0 | | |
| | 63,116 | 223,762 | 44,636 | 16,523 | | | | |

Figure 11:
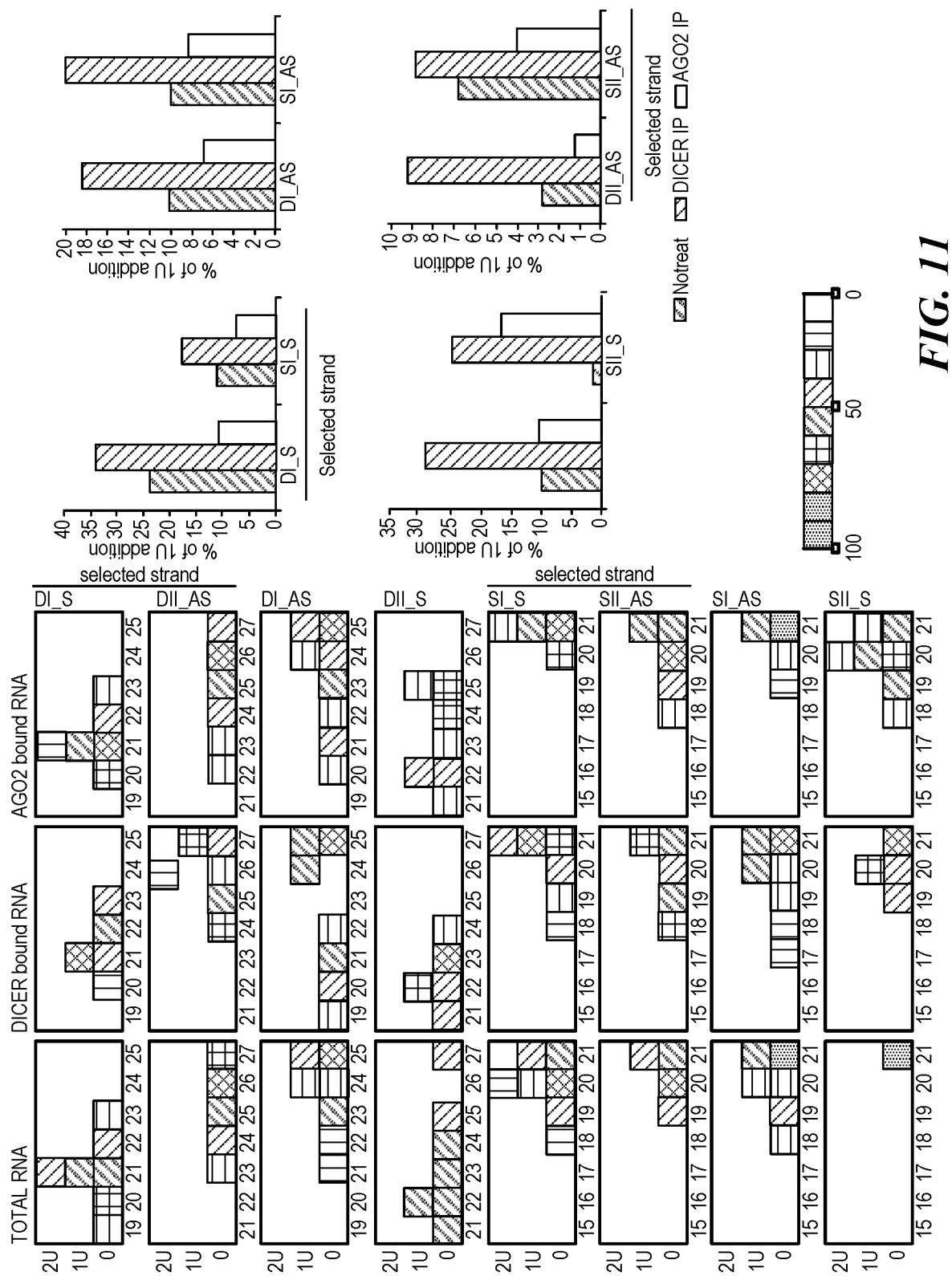
FIG. 11 is a histogram of uridylation demonstrating that the mono-uridylated small RNAs are favorable to Dicer. In the right panel, left bars are no treatment, middle bars are Dicer IP, and right bars are Ago2 IP.
Figure 13:
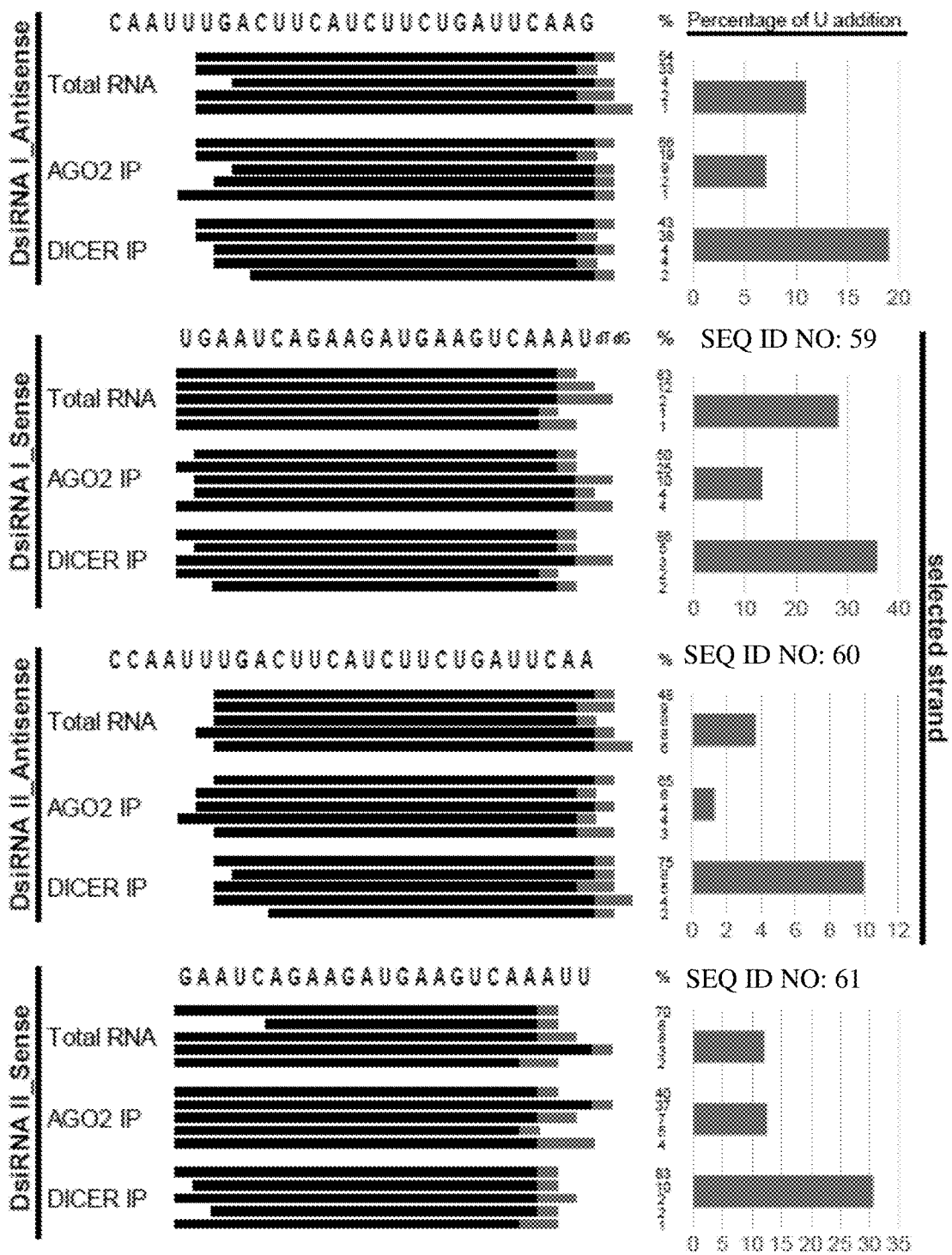
FIG. 13 shows the five most representative sequence variants of uridylated siRNAs in different condition. The striped bar shows nucleotide matched small RNAs. The solid bar represents nucleotide of U. The percentage shows expression level of each sequence. The graphs on the right show that the proportion of uridylation small RNAs in total RNA, Ago2 IP and Dicer IP.

The selected strands of siRNAs were truncated to the last nucleotide of 21 from total RNA (which is transfected siRNAs, collected total RNA and then sequenced). However, it disappeared non-selected strand of siRNAs of SI_AS and SII_S from total RNA (FIG. 11, left). Surprisingly, the mono-uridylation predominantly exhibit in the sequencing cohort of Dicer bound siRNAs (FIG. 12). No significant increment of mono-uridylated siRNAs in Ago2 bound siRNAs was found (FIG. 11, right). The uridylation pattern, including sequencing data from the total lysate, DICER immunoprecipitate, and Ago2 immunoprecipitate, was further investigated. The five most representative sequence variants of uridylated siRNAs were selected (FIG. 13).

Example 4: Mono-Uridylated siRNA Affected by Dicer not Ago2

Figure 14:
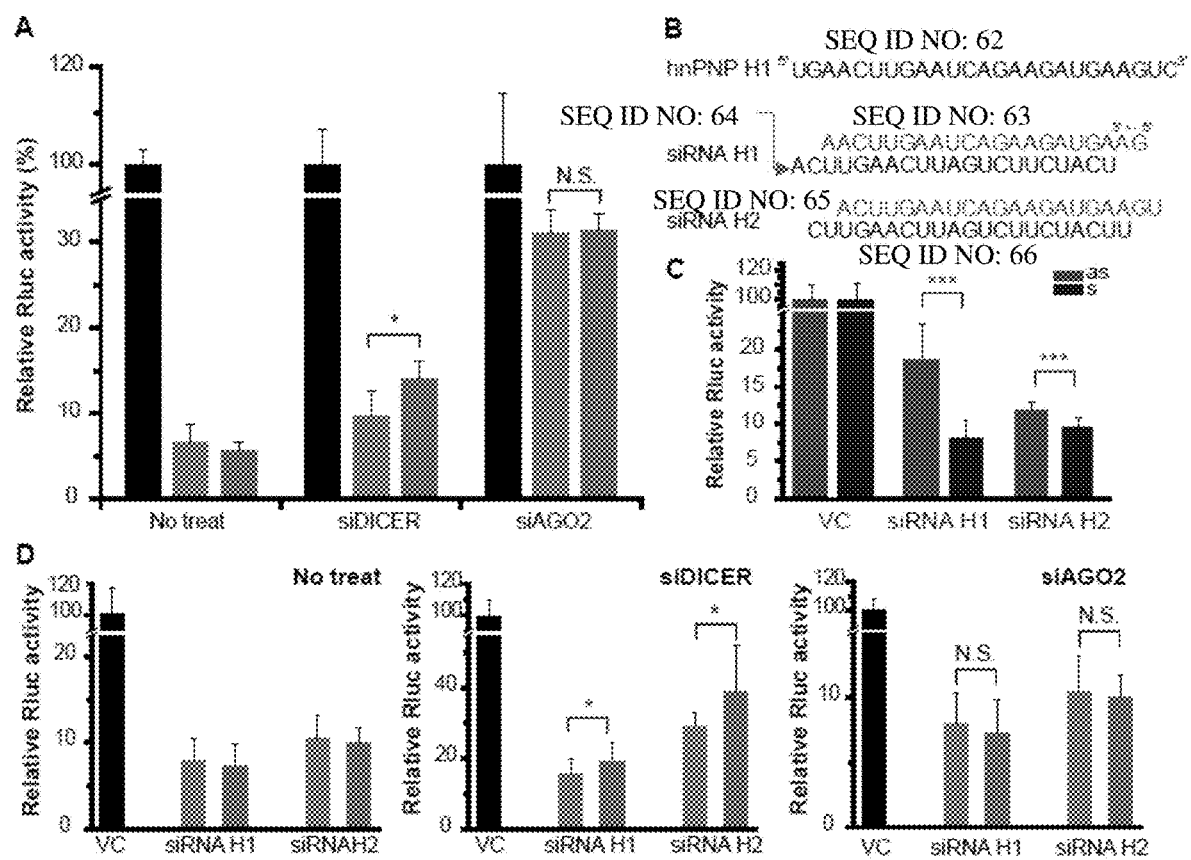
FIGS. 14A-14D show that mono-uridylated siRNA affected by Dicer but not Ago2.

The impact of Dicer knockdown on uridylated siRNAs affected the activity of small RNA, indicating that Dicer may have affected efficiency of mono-uridylated siRNAs. However, the change of activity in siRNA and mono-uridylated siRNA was insignificant in Ago2-deficient cells; knockdown of Ago2 did not influence upon the activity of siRNA. Thus, Dicer may contribute to activity of mono-uridylated siRNAs (FIG. 14A). Other siRNAs were further examined to detect the effect of mono-uridylation. To see whether other mono-uridylated siRNAs are regulated by the same mechanism with Dicer, the effects of mono-uridylation by other siRNAs of siRNA H1 and H2 were examined (FIG. 14B). The sense strand of these selected siRNAs showed more gene knockdown efficiency than antisense strand (FIG. 14C). M mono-uridylation was added in 3' end of the sense strand and gene knockdown efficiency was compared between original siRNAs and U added siRNAs in Dicer or Ago2 deleted cells. Another mono-uridylated siRNAs gave a similar but more dramatic result (FIG. 14D). It was reported that Dicer can interact with many classes of RNA without endonuclease activity (Rybak-Wolf et al., 2014). This example indicates that mono-uridylated siRNAs promote, modulate, and/or regulate the activity of small RNA gene knockdown efficiency by Dicer processing.

Example 5: Eri1 Affected Different Functions in miRNAs and siRNAs

Figure 15:
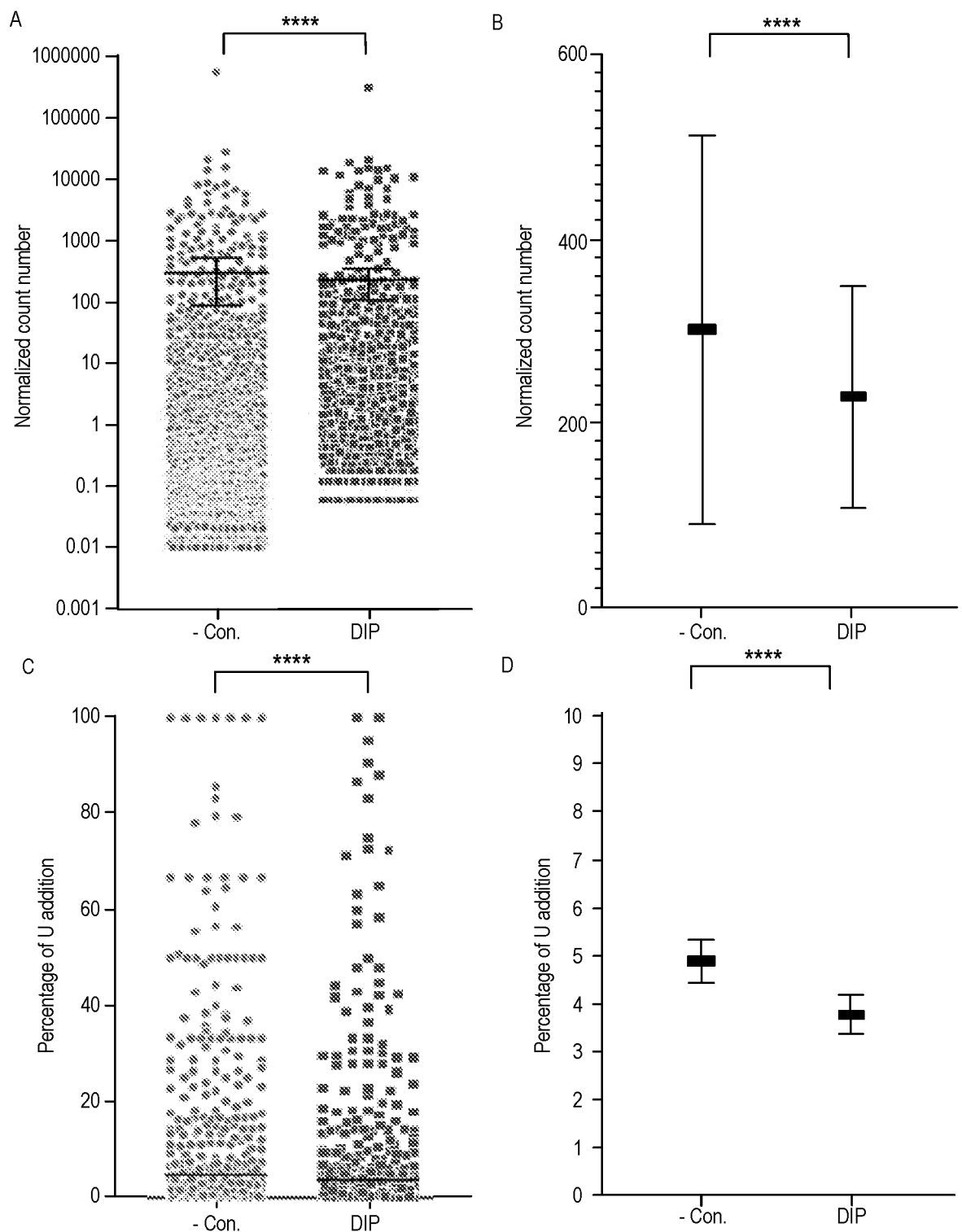
FIGS. 15A-15D show that the normalized count number of miRNA reduced in Dicer immunoprecipitation (DIP) but uridylated miRNA increased in DIP.

Uridylation of siRNA might degrade with 3' to 5' exonuclease of Eri1. Therefore, the effect of human Eri1 was tested, using Eri-1 knockdown HCT116. Next, the miRNA abundance and/or distribution and uridylation bound with Dicer was tested. 3' uridylation of mature miRNA was reported to modulate the stability of small RNAs (Gutierrez-Vazquez et al., 2017). The normalized counts were significantly reduced in Dicer bound small RNAs. A global down-regulation of miRNA was detected between negative control and Dicer bound miRNA when miRNA count distributions were analyzed with Kolmogorov Smirnoff test (FIGS. 15A and 15B). Uridylated miRNAs with Dicer were further evaluated (FIG. 15C). The mean of the percentage of U addition in global mature miRNA reduced in Dicer bound RNA (FIG. 15D). On the other hand, the portion of uridylated siRNAs increased in Dicer immunoprecipitates (FIG. 10). These results indicate that Dicer plays an integral role in the uridylation of miRNAs and siRNAs.

Figure 16:
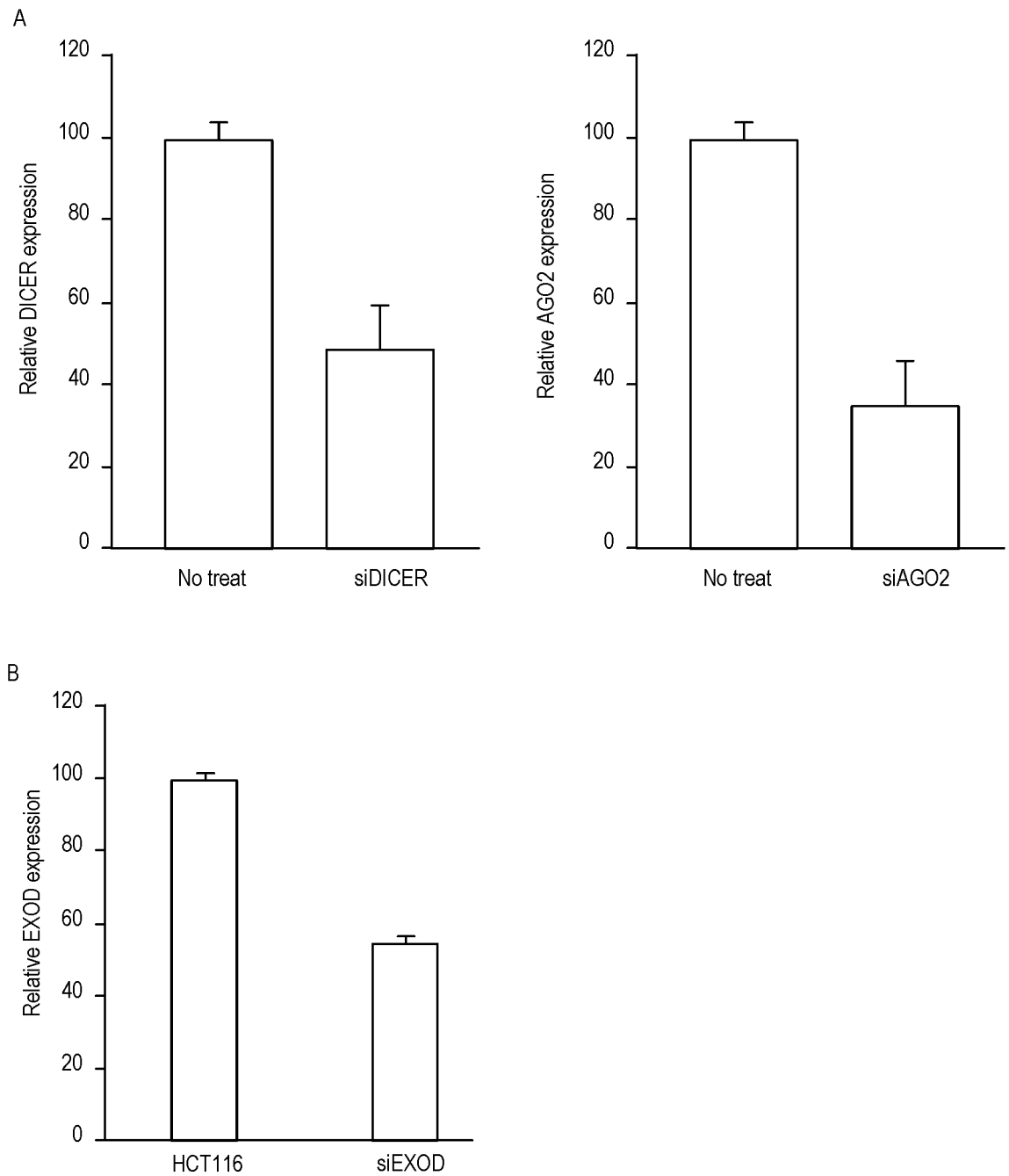
FIGS. 16A-16B show the knockdown efficiency of siRNA targeted Dicer (siDICER), Ago2 (siAGO2) (FIG. 16A) or Eri1 (siEXOD) (FIG. 16B). siRNA targeted Dicer, Ago2 and Eri1 were transfected and expression levels of Dicer, Ago2 and Eri1 were determined by RT-qPCR. These results show the knockdown of dicer, Ago2 and Eri1 by each siRNA.
Figure 17:
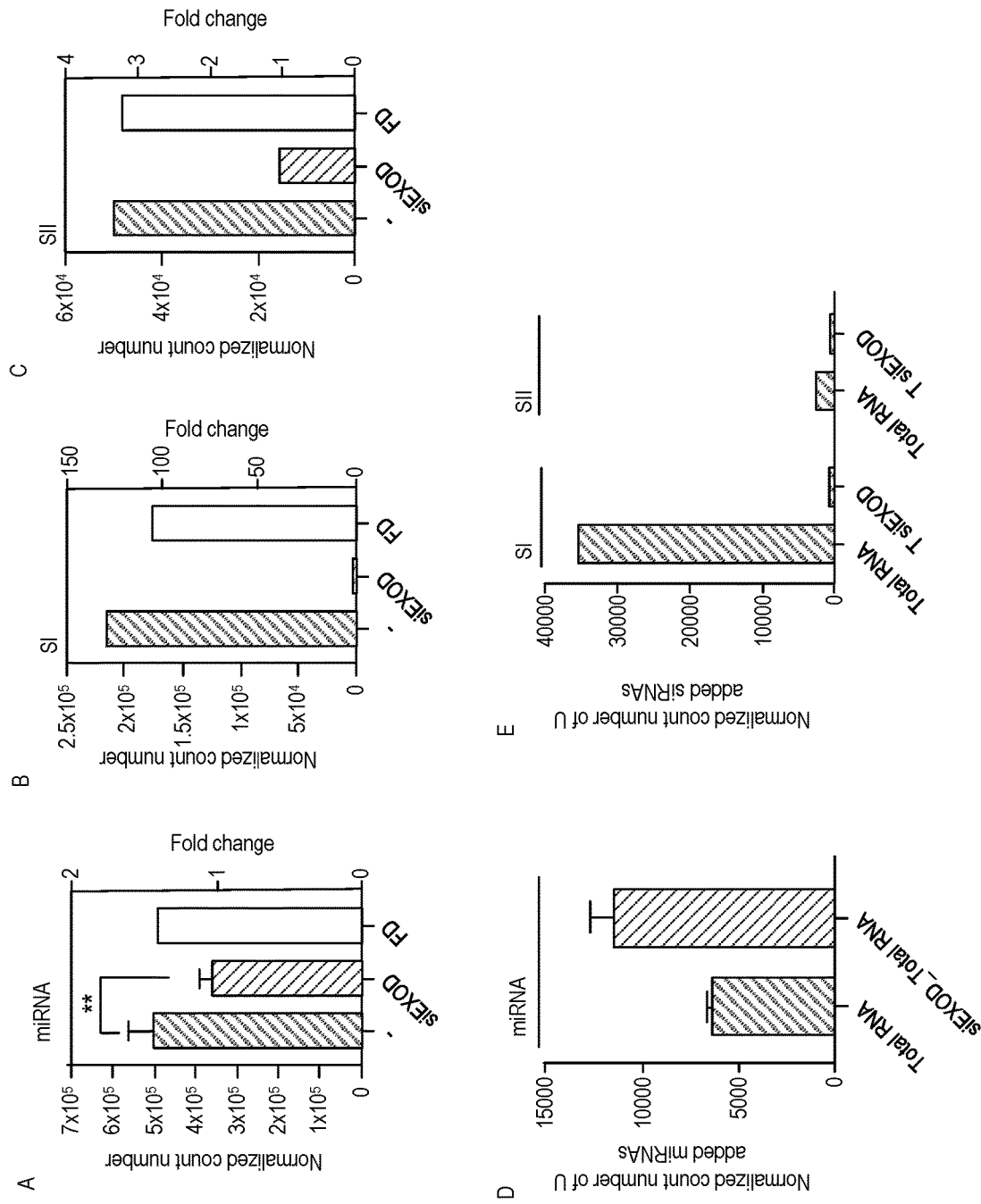
FIGS. 17A-17C show the normalized count number of miRNAs or siRNAs.
FIGS. 17D-17E show the population of uridylated miRNA or siRNAs. The fold change was calculated by dividing the normalized count number in Eri knockdown cell by the normalized count number of the control from total RNA.

To determine the 3' exonuclease involved in miRNAs and siRNA biogenesis, Eri1 knockdown was generated by transfecting siRNA mixtures into HCT116 (FIG. 16B) and deep sequencing was performed as Eri1 was reported to be a regulator of many types of RNA species and conduct microRNA homeostasis (Thomas et al., 2012) and histone mRNA. Besides, Eri1 forms a complex with Dicer that generates endo-siRNAs in Caenorhabditis elegans (Duchaine et al., 2006; Lee et al., 2006). The overall distribution of miRNAs upon global examination of the data decreased in siEri1 treated cells (FIG. 17A). Surprisingly, a significant reduction of siRNA counts, both SI and SII, was observed in Eri1 defected cells (FIGS. 17B and 17C). The change was quantified by dividing the normalized read number of miRNAs with siEri1 by that of total miRNAs. The change was 100-fold in siRNA I (FIG. 17C). Notably, the impact of Eri1 knockdown on the stability of small RNAs significantly differed between miRNAs and siRNAs, which indicated that Eri1 may have different roles in miRNAs and siRNAs.

Next, whether Eri1 had any effect on the uridylation of miRNAs and siRNA was determined. A global up-regulation of uridylated miRNA was detected in Eri1 mutants (FIG. 17D). Interestingly, the abundance of uridylated siRNAs dramatically reduced in Eri1 deficient condition (FIG. 17E). These data suggest that Eri1 can affect different pathway of uridylation for miRNAs and siRNAs.

Example 6: Potential Mechanism of Eri1-Mediated Effects on smRNA Stability

Figure 18A:
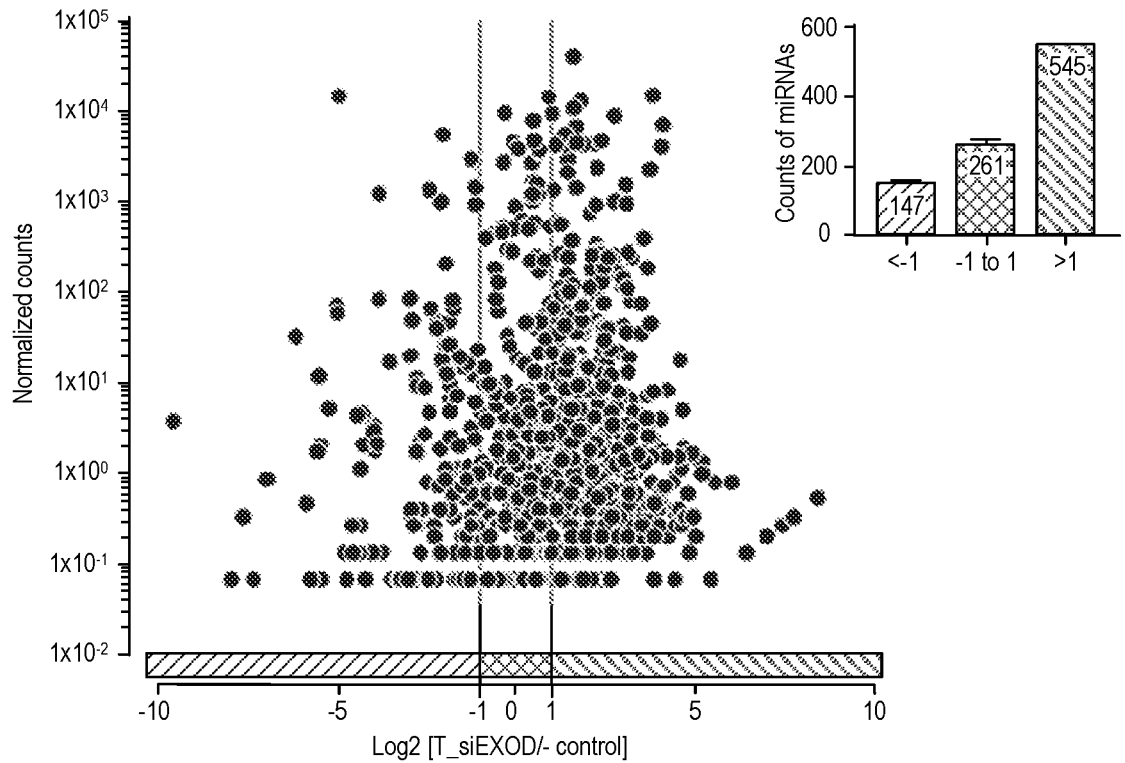
FIG. 18A shows that miRNA expression measured by deep-sequencing in Eri1 knockdown HCT116 cell line. Scatter plot matrix of each miRNA array for the Log 2 fold change (x-axis) and normalized counts (y-axis) of miRNA in Eri deficient cells. The relative miRNA expression levels from treated Eri-knockdown cells to miRNA independent of their total expression levels was examined.

To understand the function of uridylation underlying Eri1 and Dicer in miRNAs, the relative miRNA expression levels were characterized by dividing the read number of miRNA with siEri1 by that of total miRNA(–control) [Log 2 (normalized counts of miRNAs in absent of Eri1/normalized counts of miRNA in total RNA fraction)] of an individual examination of each miRNA (FIG. 18A). Five hundred forty-five miRNAs increased in Eri1 deficient cells.

In contrast, the total normalized counts of miRNAs in the siEri1 treated cell seemed to be decreased miRNAs when analyzed globally (FIG. 17A). However, it was not shown the individual miRNA (FIG. 18A). This inconsistency was because a global analysis does not reflect the general behavior of each miRNA that is better that is characterized in the individual study.

The stability of many miRNAs (545 miRNAs) was increased in Eri1 defected cells (FIG. 18A). But the normalized counts of siRNA were decreased in siEri1 (FIGS. 17B and 17C). Thus, Eri1 may have different impact on the stability of miRNAs and SiRNAs.

Figure 18B:
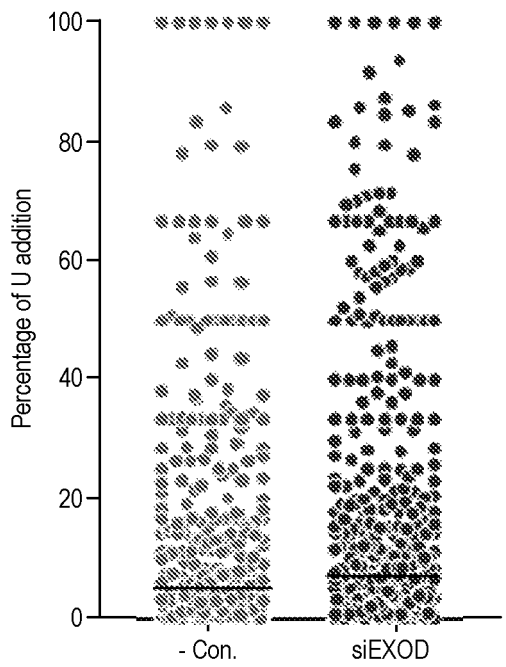
FIGS. 18B and 18C show the uridylation percentage of each miRNA. Error bar represents SEM for relocates (n=4) in FIG. 18C.
Figure 18C:
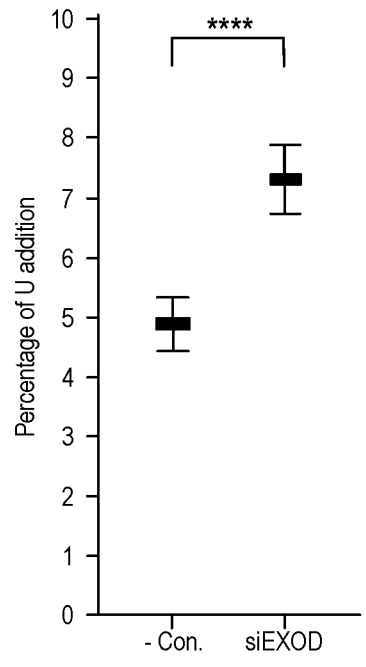

A significant increment of miRNA uridylation was observed when treated with siEri1. The percentage of U addition of global miRNA was analyzed to investigate the change of miRNA upon knockdown of Eri1 (FIG. 18B). The percentage of U addition in miRNAs increased after depletion of Eri1. The analysis of uridylation of individual miRNA revealed that many miRNAs (170 out of 253 uridylated miRNAs) uridylated in Eri1 depleted condition. These results strongly suggested that Eri1 inhibits most, if not all, miRNA uridylation.

Figure 18D:
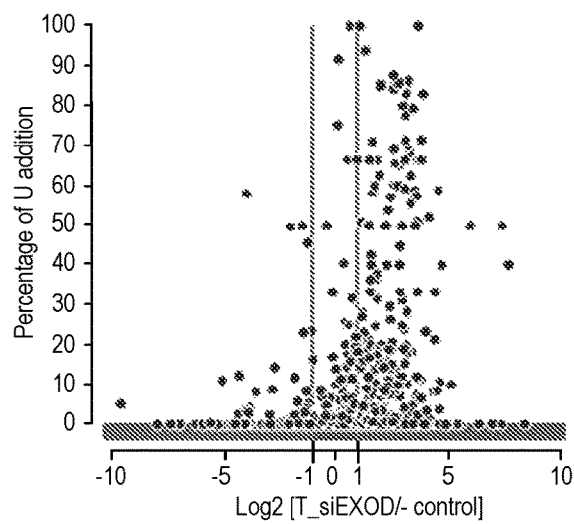
FIG. 18D shows that uridylation population of individual miRNA to grouped up-regulation (>1, more than 2 folds, right pink bar) or down-regulation (<1, less than 2 folds, left blue bar) in Eri-deleted cells depending on FIG. 18A.

If Eri1 exonuclease acts in separate pathways, the uridylated miRNAs should differ in up-regulated and down-regulated miRNAs by Eri1. The uridylation fraction of individual miRNA to grouped up-regulation (>1: more than 2-fold) or down-regulation (<−1: less than 2-fold) in Eri1-deleted cells depend on FIG. 18A (FIG. 18D). The group of up-regulated or down-regulated miRNA to collect the dots (each miRNA) in the right side include in the red bar increased the abundance in Eri1 knockdown cells (FIG. 18E), which indicated that the grouped miRNA controlled the degradation by 3' to 5' exonuclease of Eri1. Down-regulated miRNAs may have coordinated the activation by Eri1. Previous studies showed that Eri1 was associated with both stabilization and degradation in histone mRNA biogenesis by controlling uridylation of mRNA (Scheer et al., 2016; Zuber et al., 2016). The percentage of uridylation was increased in the group of up-regulated miRNAs (FIG. 18D). These results demonstrate that Eri1 was required for uridylation to control miRNA biogenesis.

Figure 18E:
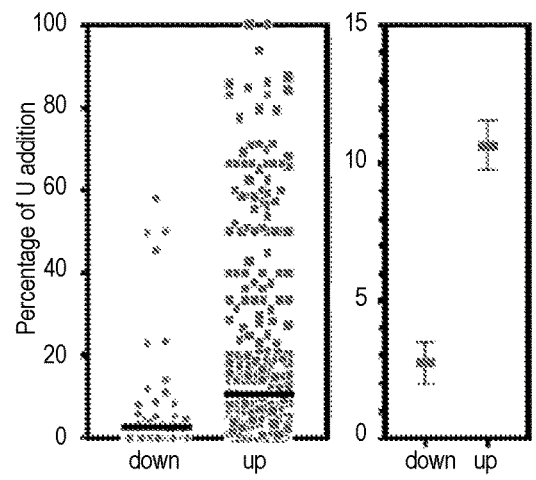
FIG. 18E shows the mean of percentage of uridylated miRNA in up or down grouped miRNA depending on Eri1.
Figure 18F:
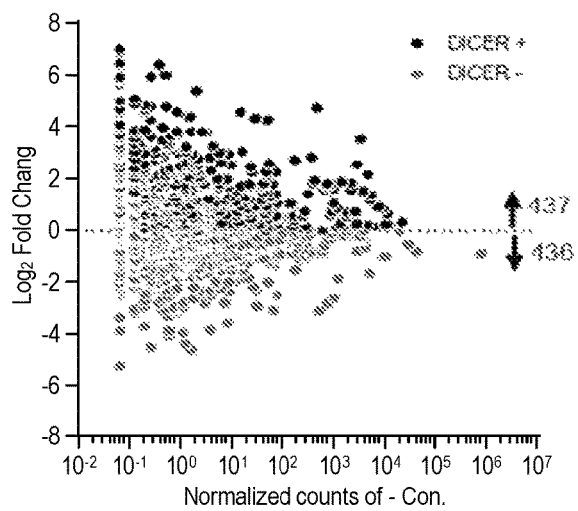
FIGS. 18F-18G show the grouped miRNA depend on Dicer.
Figure 18G:
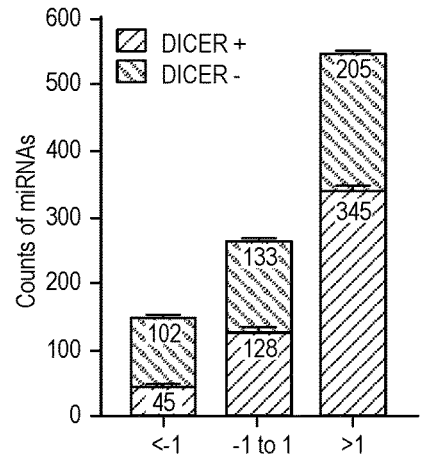
Figure 19:
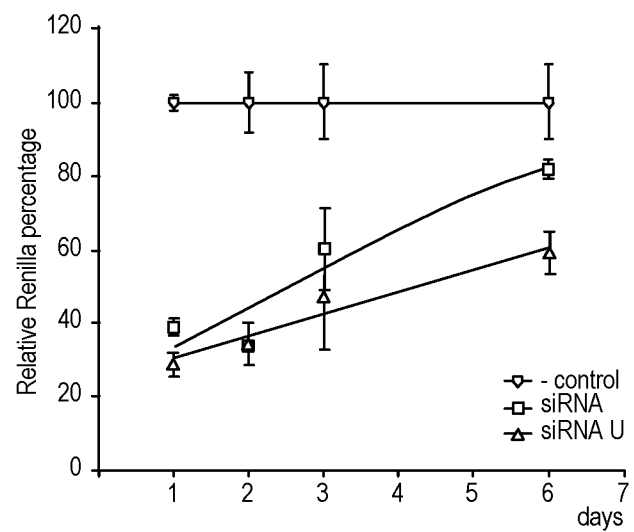
FIG. 19 shows the siRNA efficiency over the period of one week.
Figure 20:
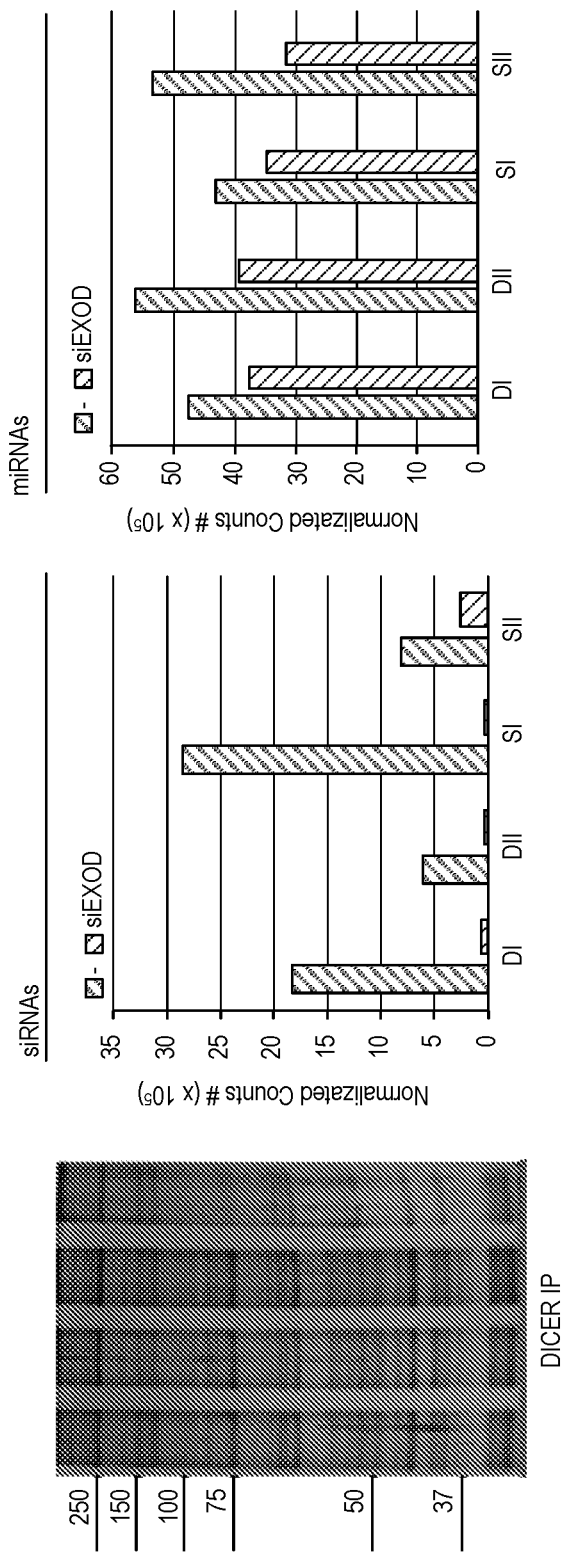
FIG. 20 shows immunoprecipitation for Dicer of Ago2 in Eri knockdown HCT116 (left gel picture: silver stain). The graph on the right shows the normalized count number of transfected siRNAs (siRNAs) and endogenous miRNAs (miRNAs) in HCT116 (−: bars on the left) and Eri deficient HCT116 (siEXOD: right bars) by deep-sequencing.
Figure 21:
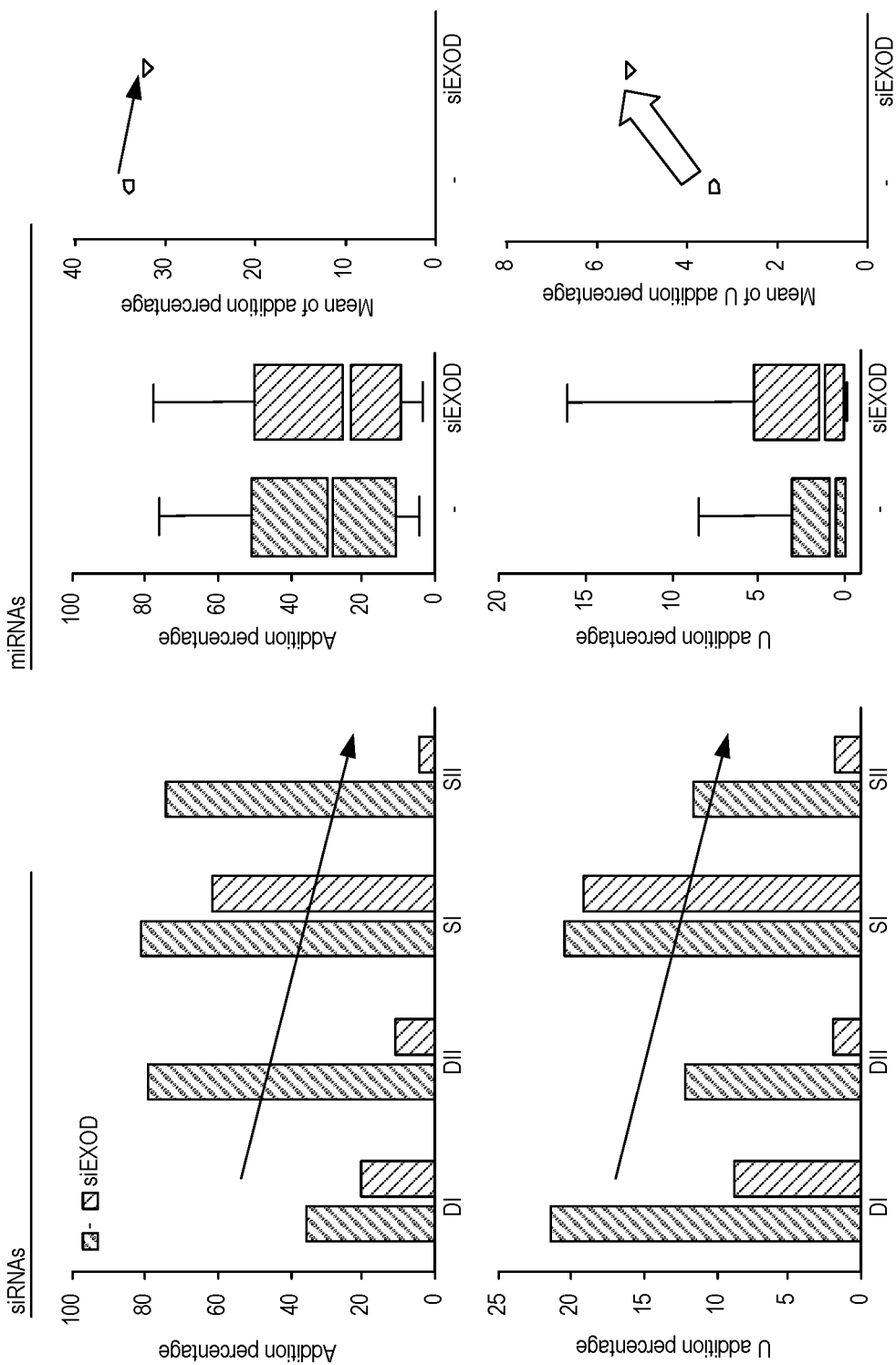
FIG. 21 shows the different uridylation percentage between siRNAs and miRNAs. The graph on the left shows that addition percentage included with A, C, U, and G nucleotide in the 3' end (upper panel) and U addition percentage of siRNA (bottom panel) in HCT116 (bars on the left) and Eri knockdown HCT116 (right bars). The graph on the right shows the percentage of A, C, U and G added miRNA (upper panel) and the percentage of U added miRNA (bottom panel) in HCT116 (black) and Eri1 deficient cells (grey). Dots show the mean value. Uridylated siRNA reduced in Eri1 knockdown HCT116, but uridylated miRNA increased in same condition.
Figure 22:
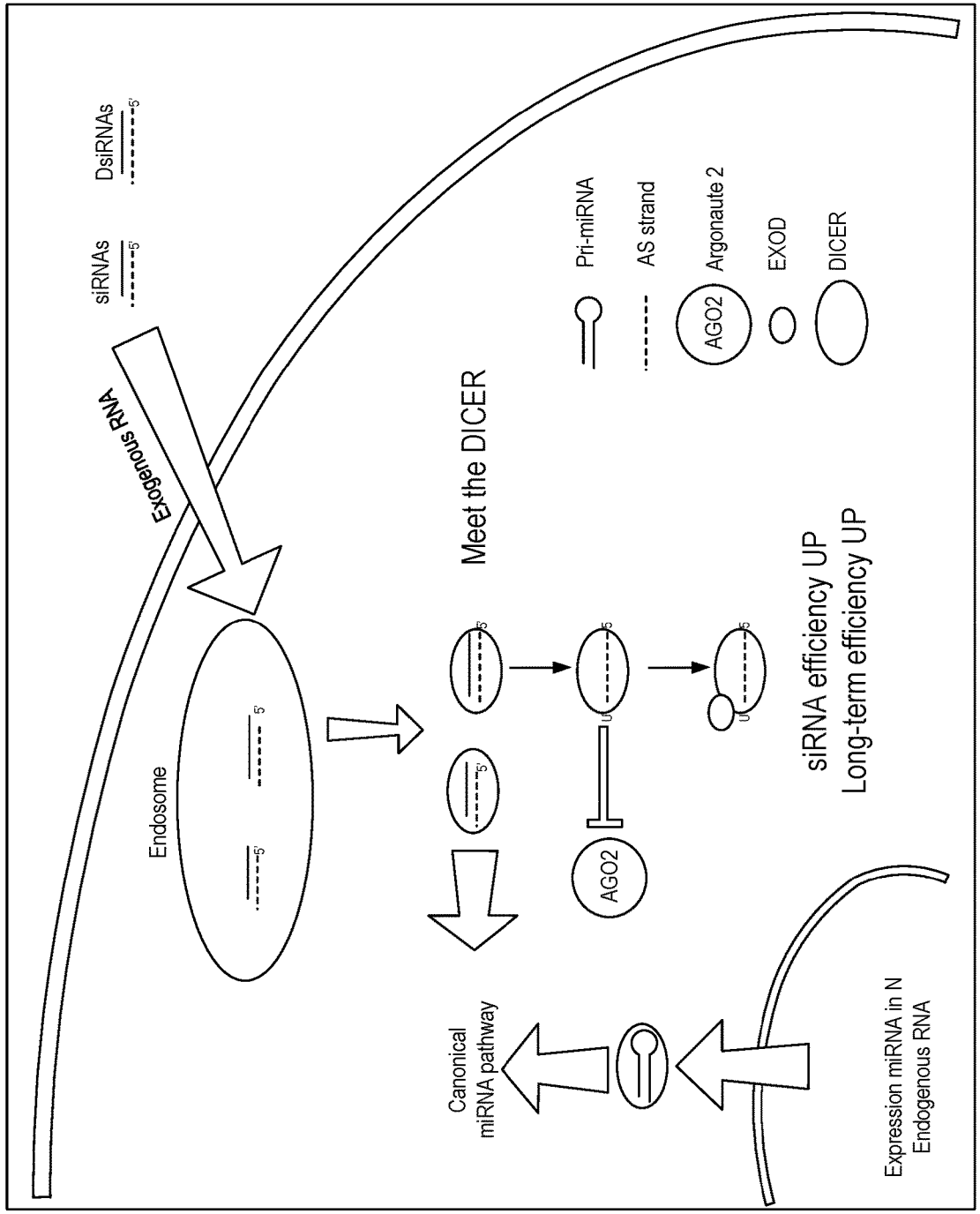
FIG. 22 shows the mechanism of mono-uridylated siRNA.
Figure 23:
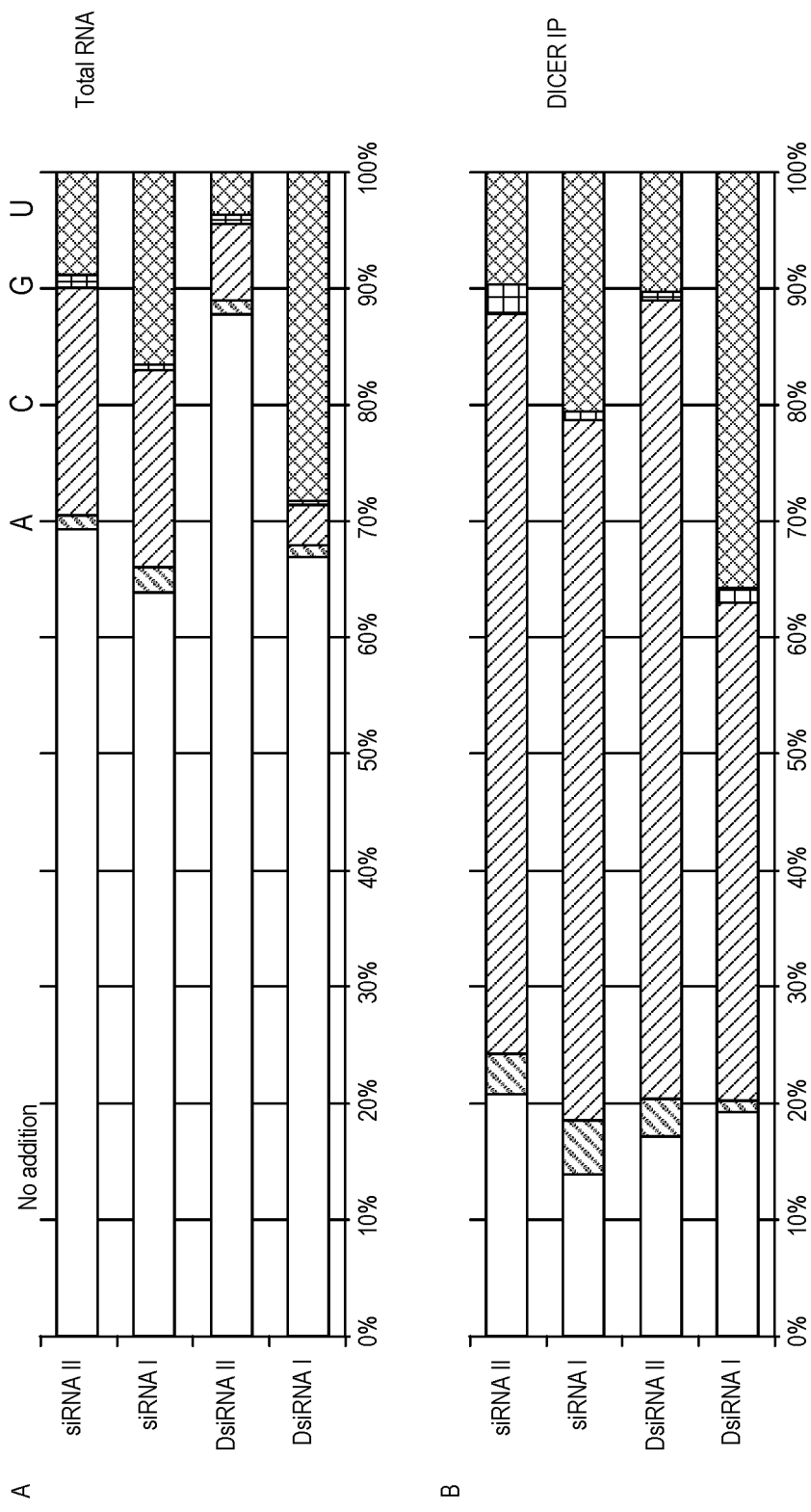
FIGS. 23A-23B show non-templated addition at the 3' end of transfected small RNA (FIG. 23A) and small RNAs bound to Dicer (FIG. 23B). The non-templates C addition dramatically increased in cohort of Dicer immunoprecipitation.
Figure 25:
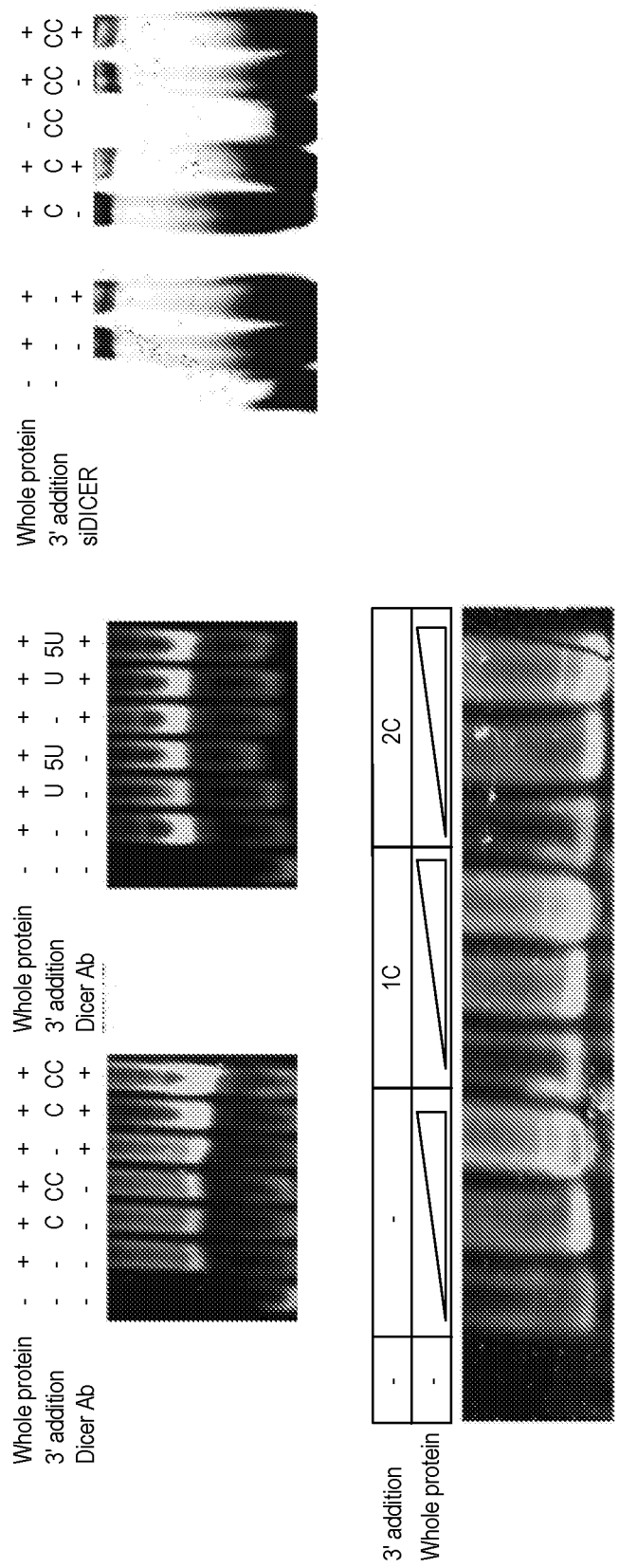
FIG. 25 shows the binding efficiency of small RNAs. EMSA was performed with or without extract of HCT116 cells and a FAM-labelled oligonucleotide. C: single C addition, CC or 2C: double C addition, U: single U addition, 5U: five U addition.
Figure 26:
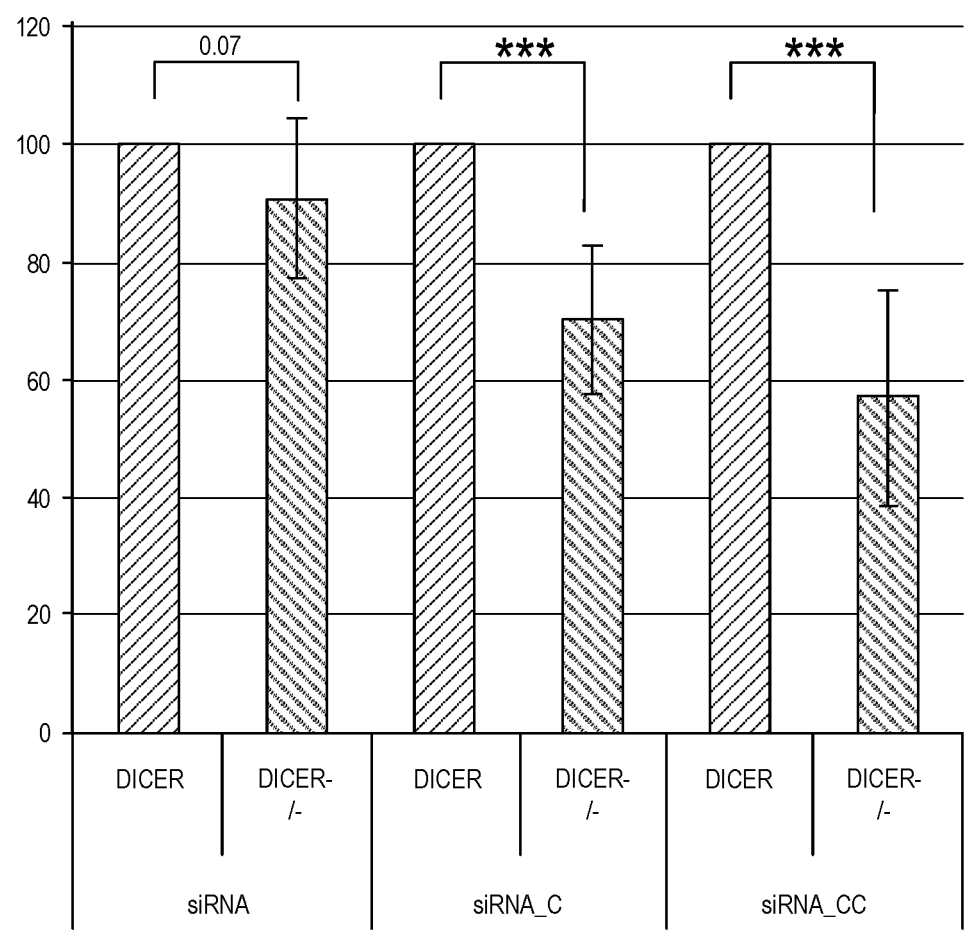
FIG. 26 shows the EMSA results of siRNA, siRNA with single C addition and siRNA with double C addition in protein with immunoprecipitated Dicer from Lysates of dicer overexpressed or knockdown HCT116 cells. The binding efficiency did not change comparing the siRNA with Dicer and without Dicer, but C added and CC added siRNAs reduced the binding efficiency without Dicer. The sequences (5'→3') are as follows: siRNA S: UGAAUCAGAAGAUGAAGUCAA (SEQ ID NO: 1), siRNA AS: GACUUCAUCUUCUGAUUCAAG (SEQ ID NO: 2), siRNA_C S: UGAAUCAGAAGAUGAAGU-CAAC (SEQ ID NO: 3), SiRNA_C AS: GACUUCAUC-UUCUGAUUCAAG (SEQ ID NO: 2), SiRNA_CC S: UGAAUCAGAAGAUGAAGUCAACC (SEQ ID NO: 4), and siRNA_CC AS: GACUUCAUCUUCUGAUUCAAG (SEQ ID NO: 2).
Figure 27:
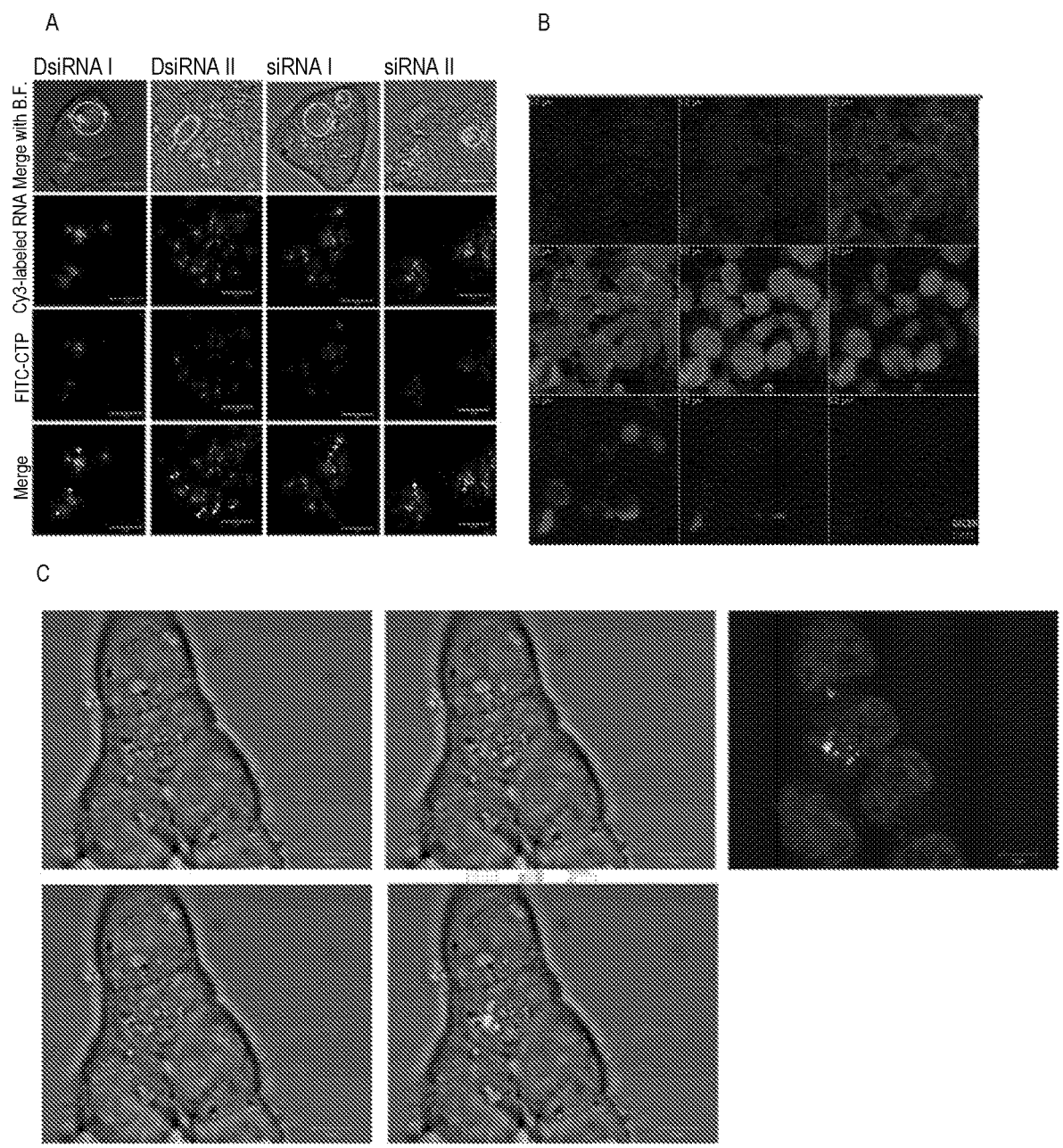
FIG. 27A shows co-localization of siRNAs and CTP.
FIG. 27B shows the localization of Dicer by Z-stack and Dicer existed in nucleus. Purple stain is Dicer antibody, blue stain is DAPI.
FIG. 27C shows the localization of C added small RNA. The labeled siRNA and CTP locate in nucleus and cytoplasm. The figures show that C added siRNA with dicer can move between nucleus and cytoplasm.
Figure 28:
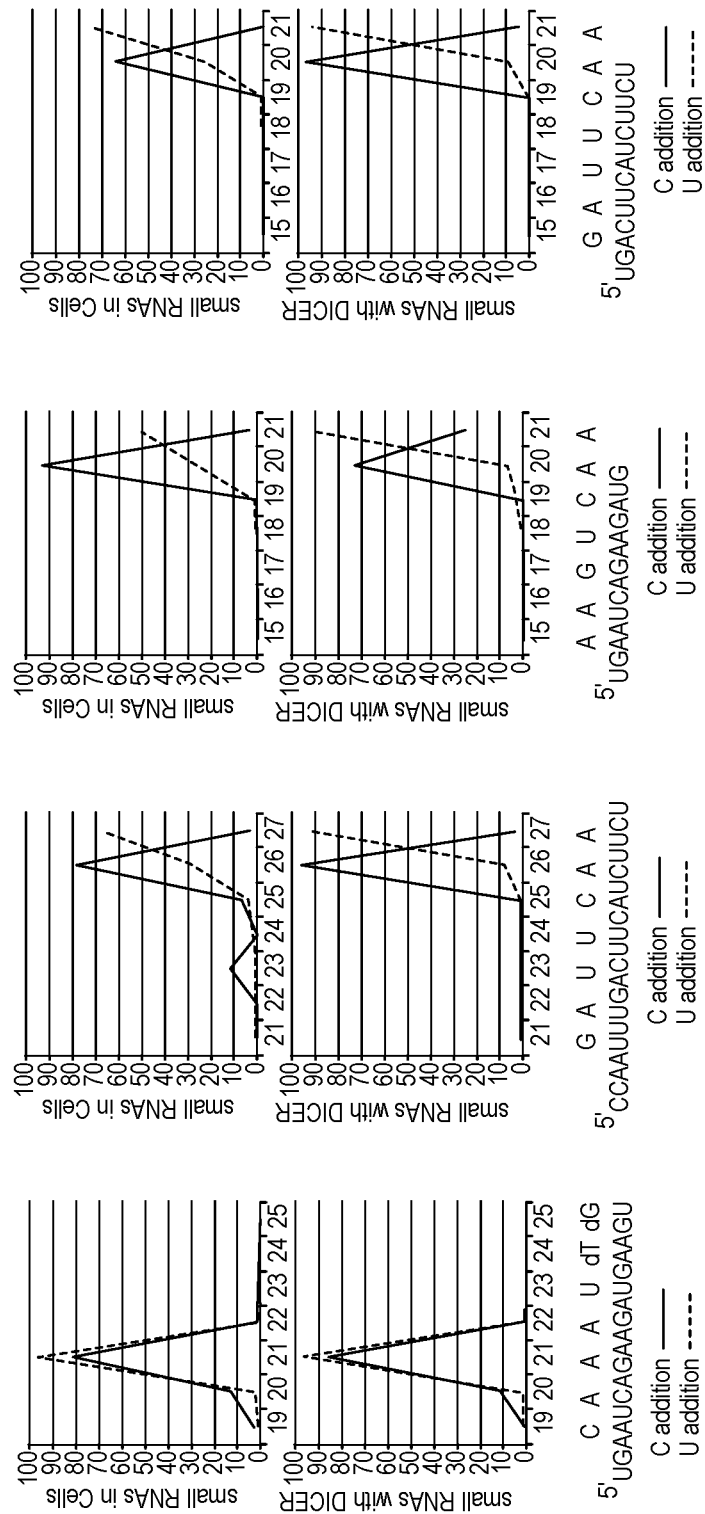
FIG. 28 shows the various locations of non-template addition in the 3' end of siRNAs. The dotted line peak is the position of U addition in siRNA 3' end, solid line peak is the C addition. The upper panel is the position of U or C addition from total cell Lysates, the bottom panel is from Dicer immunoprecipitation. There is one nucleotide difference in the position of U and C addition.
Figure 29:
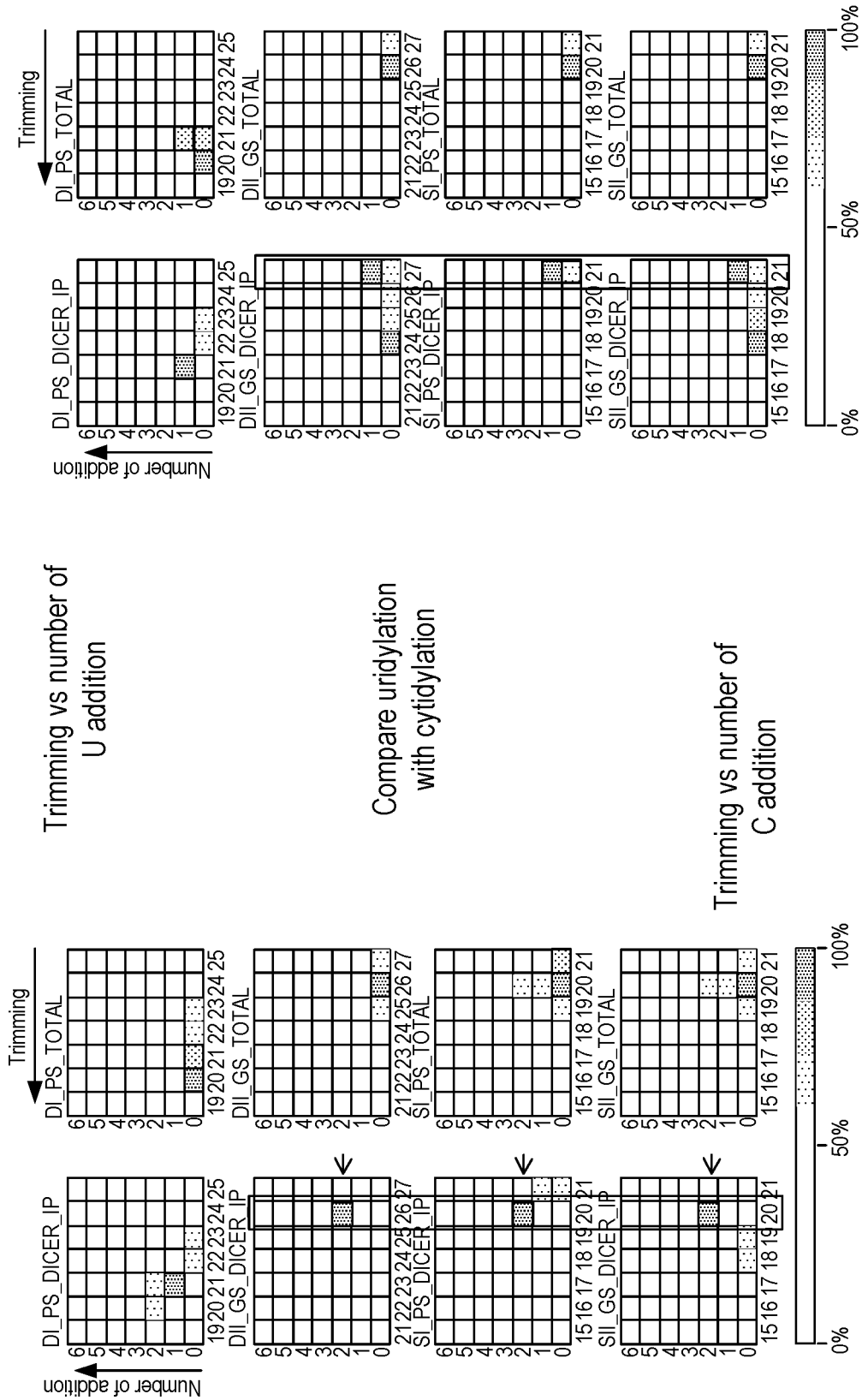
FIG. 29 compares the effects of trimming vs. of the number of addition of C or U.
Figure 30:
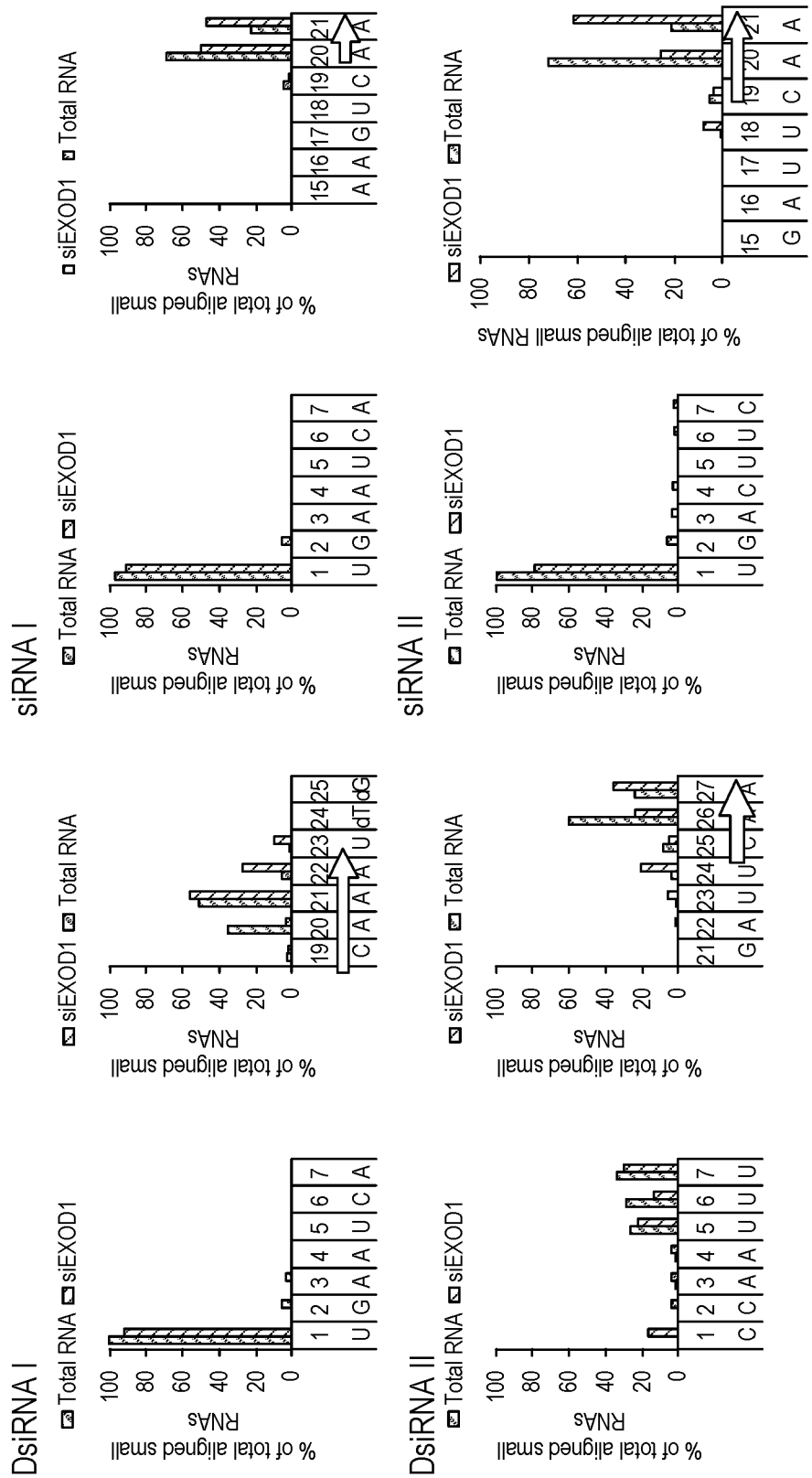
FIG. 30 compares the 3' end nucleotides of transfected small RNAs from total RNA lysate and siEri1 treated cell. The position of siRNA 3' end goes to higher number of nucleotide in Eri1 deficient cells (shown by arrows). Eri1 is a 3' to 5' exonuclease.
Figure 31:
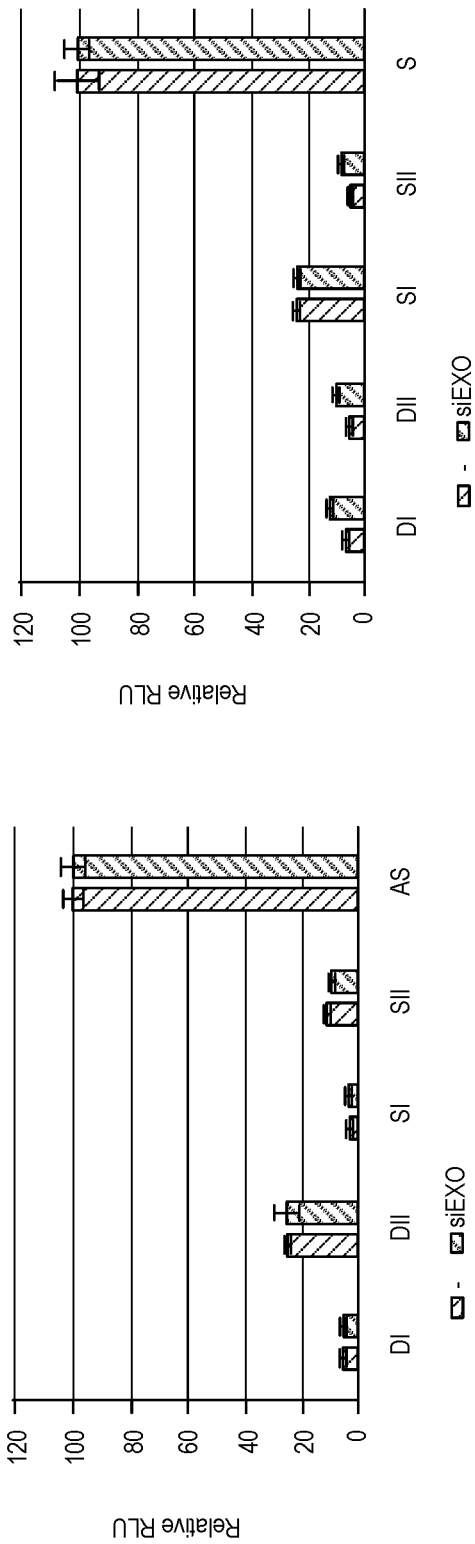
FIG. 31 shows the effects of sense and antisense strands of the smRNAs in-control (HCT116) and Eri1 knockdown HCT116. Eri1 did not affect siRNA efficiency.
Figure 32:
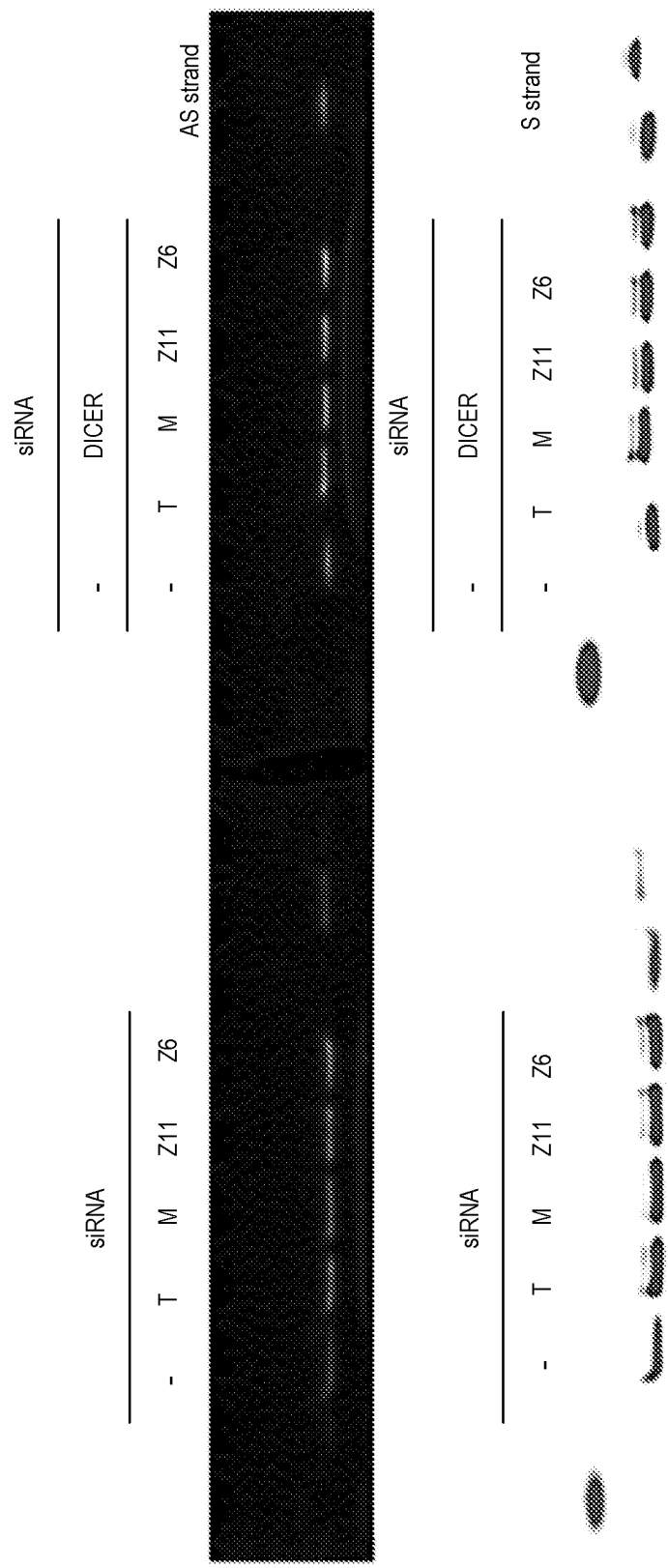
FIG. 32 shows in vitro cytidylation of siRNA in Dicer with nucleotidyltransferase. Immunopurified TRNT1, MTPAP, ZCCH11 (TUT4) and ZCCH6 (TUT4) was incubated with the labeled siRNA (AS: cy3, S: cy5) and CTP. These proteins can add C nucleotide in siRNA with assistance of Dicer.
Figure 33:
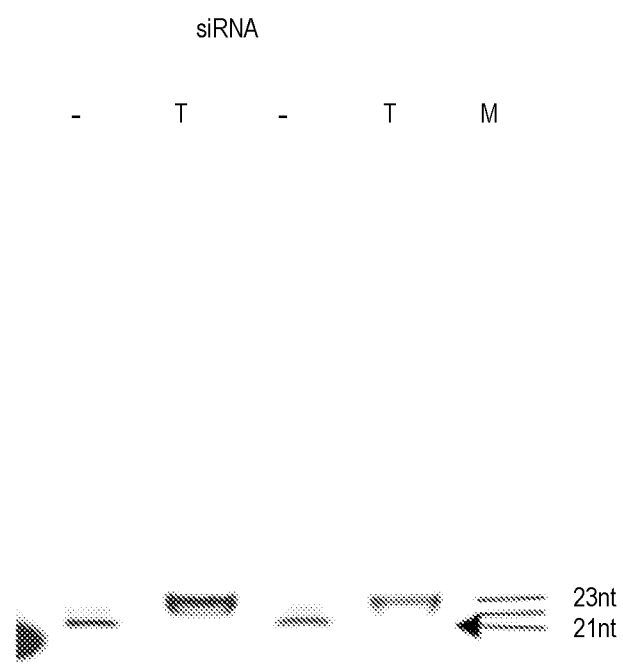
FIG. 33 shows the results of in vitro C addition assay. siRNA: Cy5.5 labeled SI_S of 5' end; −: without protein; T: with TRNT1 protein from IP; Marker (M): 21 nt: Cy5.5 labeled SI_S of 5' end, 22 nt: Cy5.5 labeled SI_S_C of 5' end, 23 nt: Cy5.5 labeled SI_S_CC of 5' end. SiRNA added the CC addition with TRNT1 protein.
Figure 34:
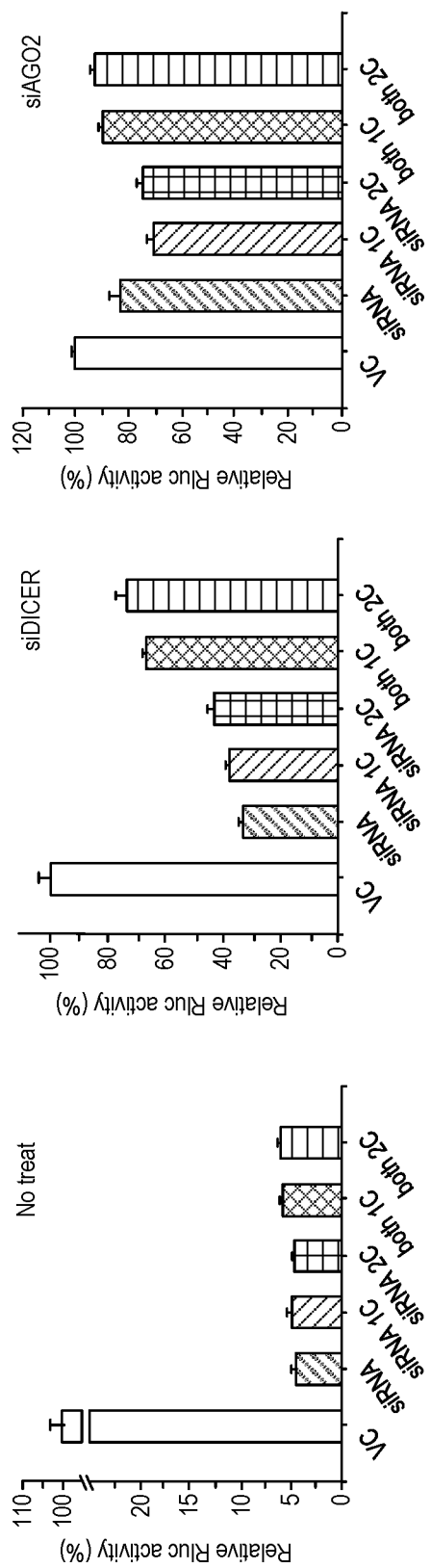
FIG. 34 shows the efficiency of small RNAs with non-template addition of C. Single cytidylated and double cytidylated siRNAs did not affect siRNA efficiency. The siRNAs were inhibited more by the siDicer than siAGO2. Left: no treatment, middle: siDicer, and right: siAgo2.
Figure 35:
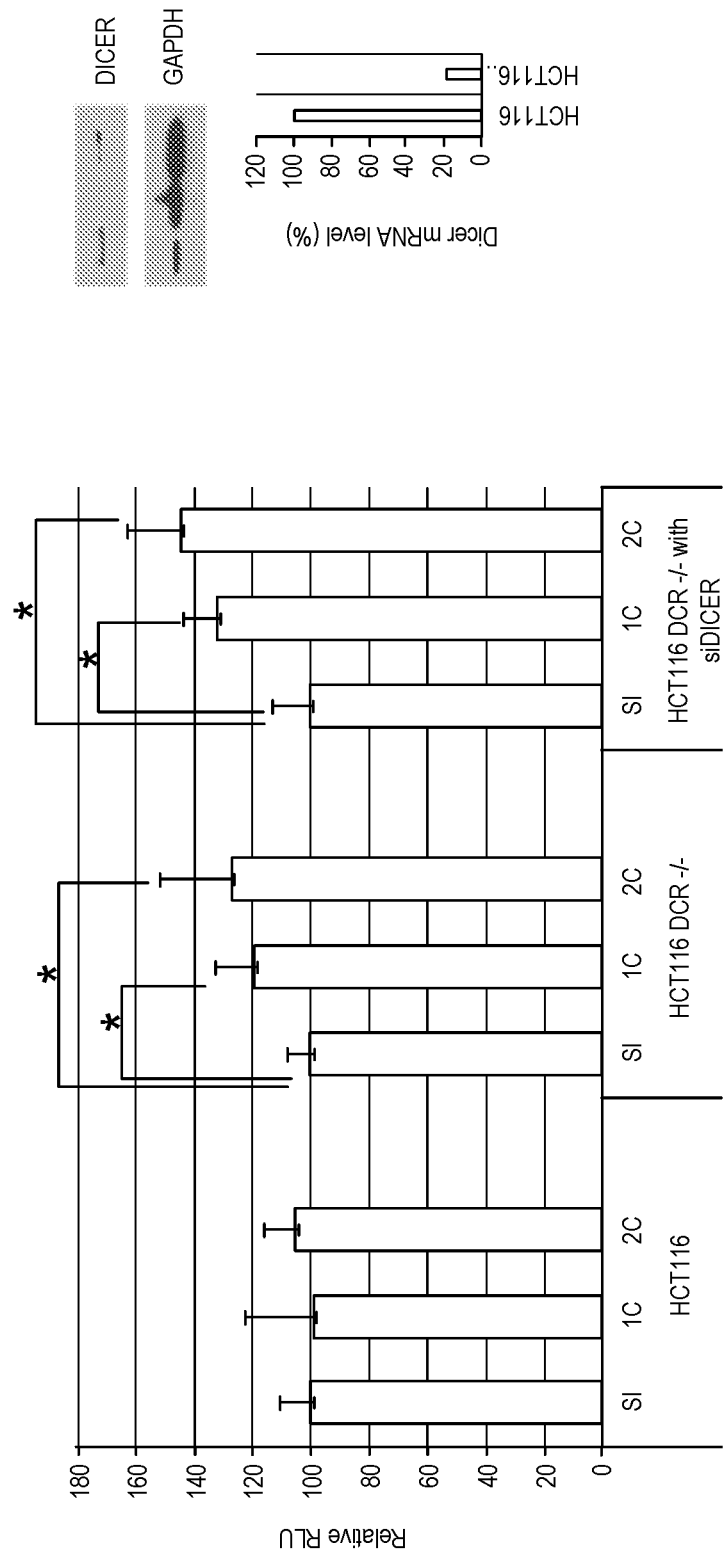
FIG. 35 shows the efficiency of small RNAs with non-template addition of C in HCT116 cells. The siRNA efficiency of CC added siRNA reduced in Dicer deficient HCT116 (HCT116 DCR−/−: the exon 5 of Dicer gene was deleted) and in double knockdown HCT116 which transfected siDicer in HCT116 DCR−/−. The graph on the right shows western blot results of Dicer and GAPDH. Dicer knockdown in HCT116 DCR−/−.
Figure 36:
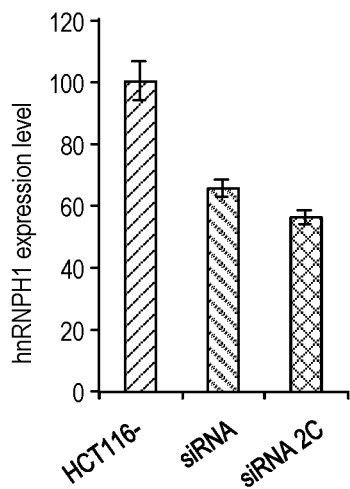
FIG. 36 shows the efficiency of small RNAs with non-template addition of C by the hnRNPH1 expression level. CC added siRNA can inhibit endogenous gene of hnRNPH1 and shows better efficiency than siRNA.
Figure 37:
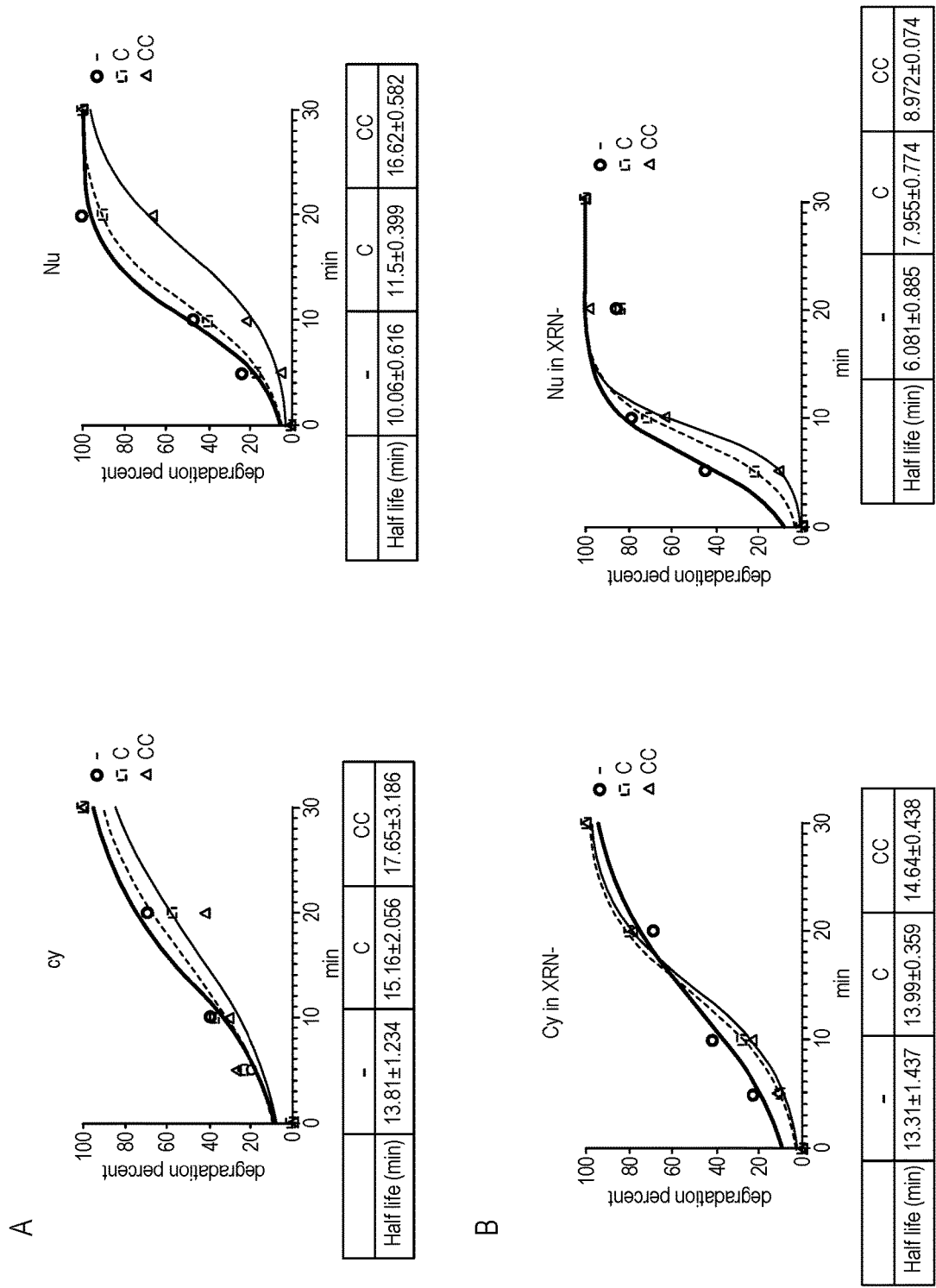
FIGS. 37A and 37B show the results of small RNA degradation assay in cytoplasm and nucleus. The 5'-3' sequences of SiRNA: UGAAUCAGAAGAUGAAGUCAA (SEQ ID NO: 1), siRNA_C: UGAAUCAGAAGAUGAA-GUCAAC (SEQ ID NO: 3), and SiRNA_CC: UGAAUCAGAAGAUGAAGUCAACC (SEQ ID NO: 4). XRN is a 5' to 3' exonuclease. The siRNA (circle), C-added siRNA (green square), and CC-added siRNA (triangle) reacted with cell lysate from fraction of cytoplasm or nucleus (upper panel), degraded siRNA in SDS-PAGE gel was detected by typhoon scanner. The degradation percentage calculated the band intensity of degraded siRNAs. CC-added siRNA delays degradation in nucleus lysate. This result disappears in nucleus lysate with sixRN which knockdown XRN protein [down graph].
Figure 38:
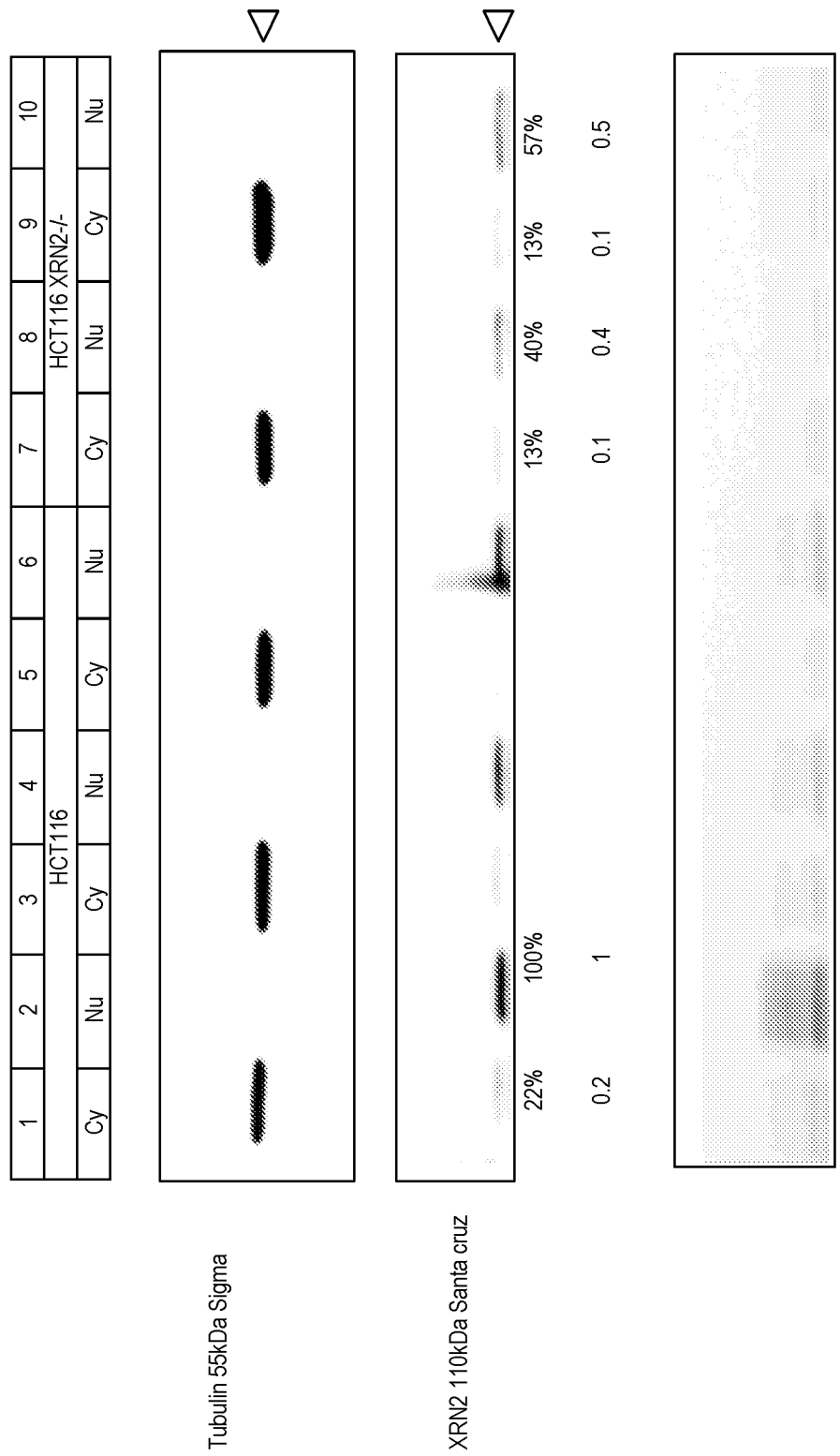
FIG. 38 shows protein knockdown of XRN2 by Western blot. XRN2 was expressed in nucleus. The expression level of XRN2 reduced 60% or 43% in HCT116 XRN2−/− with transfected siXRN2. Tubulin was the marker of cytoplasmic Lysates.
Figure 39:
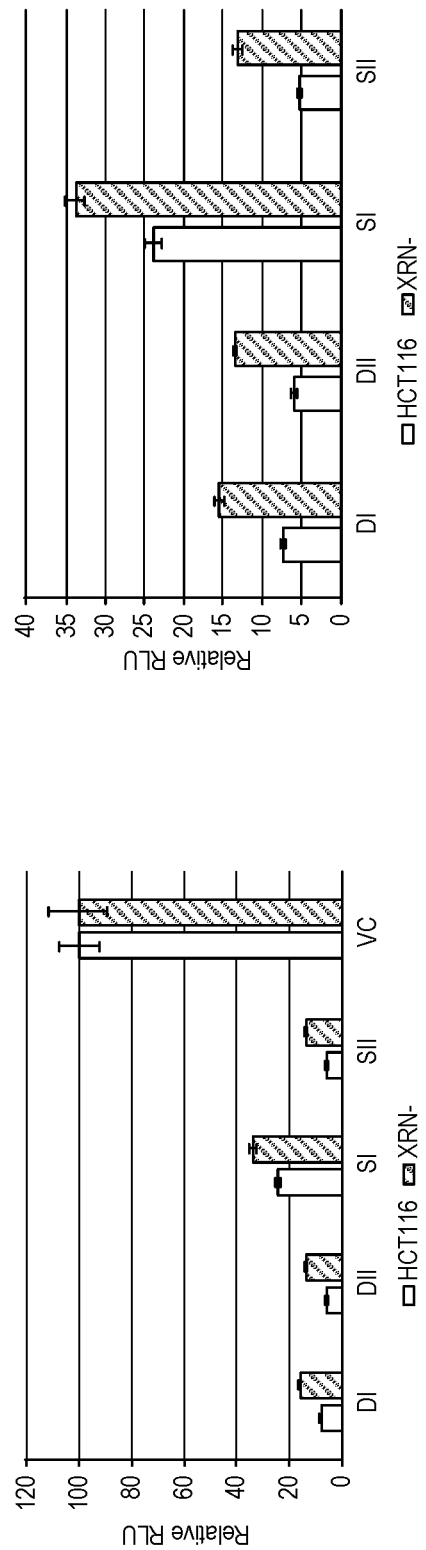
FIG. 39 shows the efficiency of siRNAs by luciferase assay. The efficiency of siRNA reduced in XRN2 knockdown HCT116 (XRN−). Left bars: HCT116; right bars: XRN−.
Figure 40:
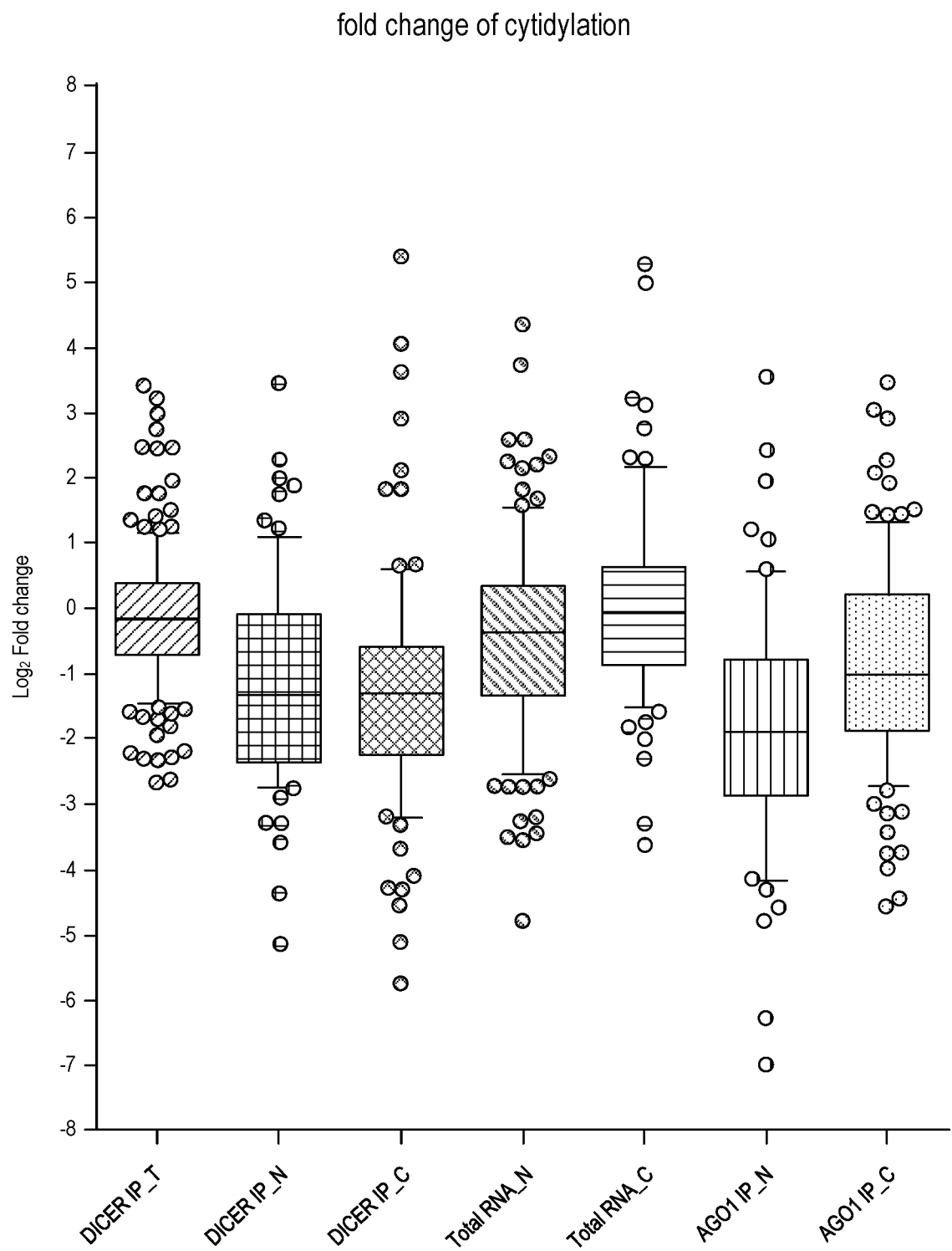
FIG. 40 shows the miRNA expression level from Dicer immunoprecipitation, total RNA or Ago1 immunoprecipitation. T: total lysate; N: the fraction of nucleus lysate; C: the fraction of cytoplasm lysate.
Figure 41:
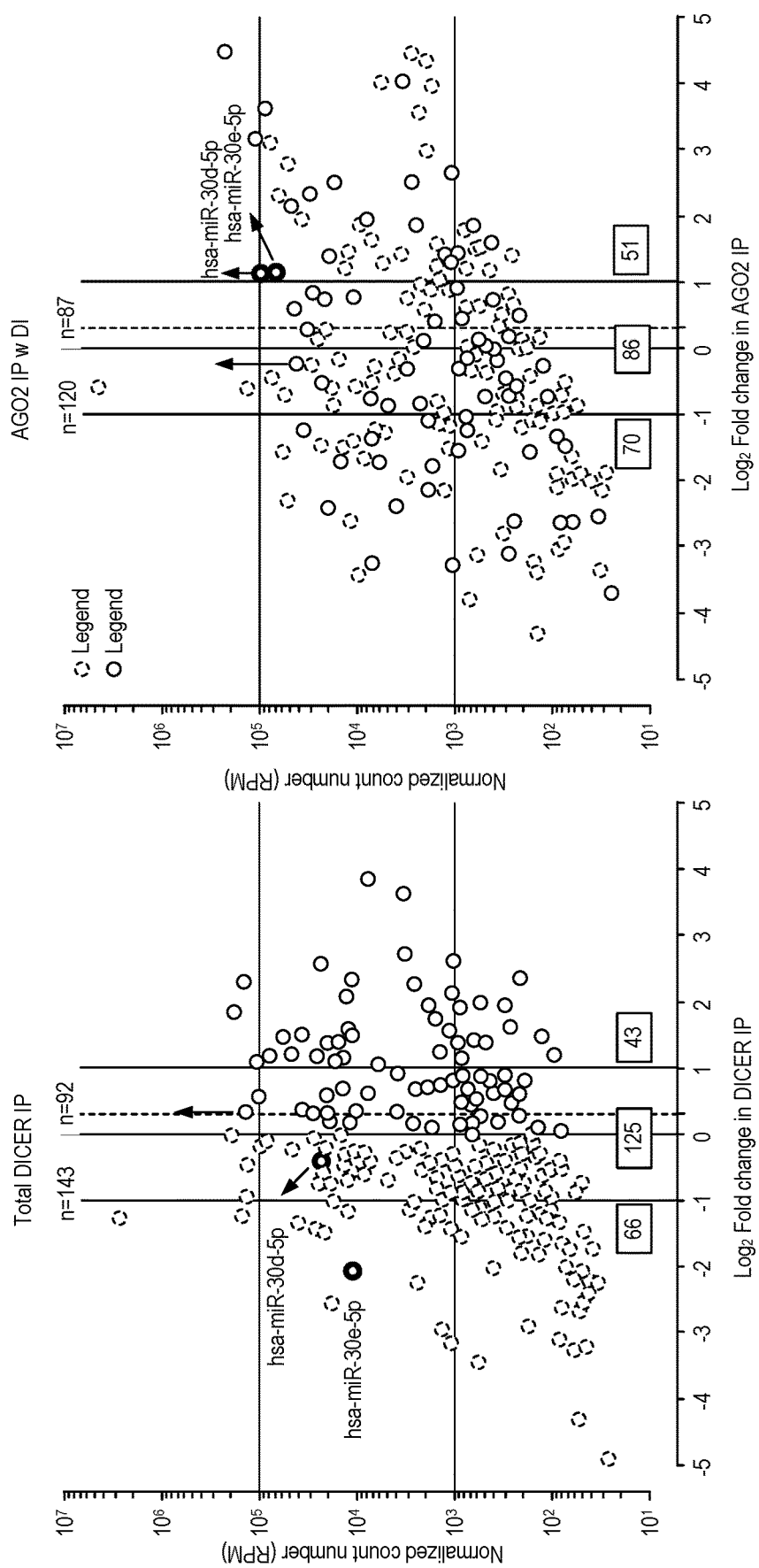
FIG. 41 shows the expression levels of individual miRNAs in Dicer IP (left) and Ago2 IP (right). Dicer favored miRNAs bound with Dicer in Dicer immunoprecipitation were collected (marked by red dots), which distributed mostly on the right in Dicer IP but more evenly distributed in Ago2 IP. The patterns of individual miRNA expression were different in Dicer IP and Ago2 IP.
Figure 42:
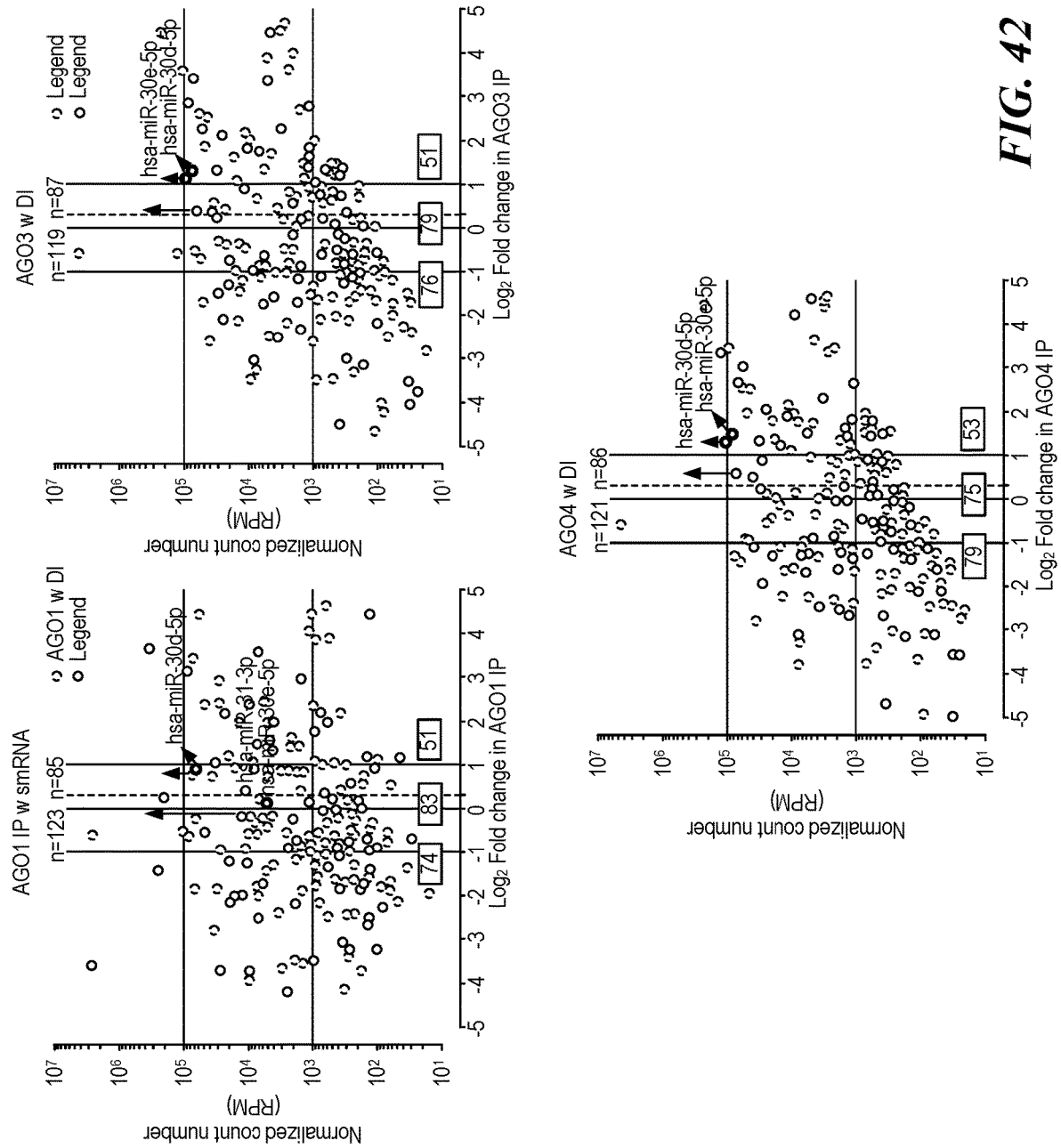
FIG. 42 shows the expression levels of individual miRNAs in Ago1, Ago3, and Ago4 IP.
Figure 44:
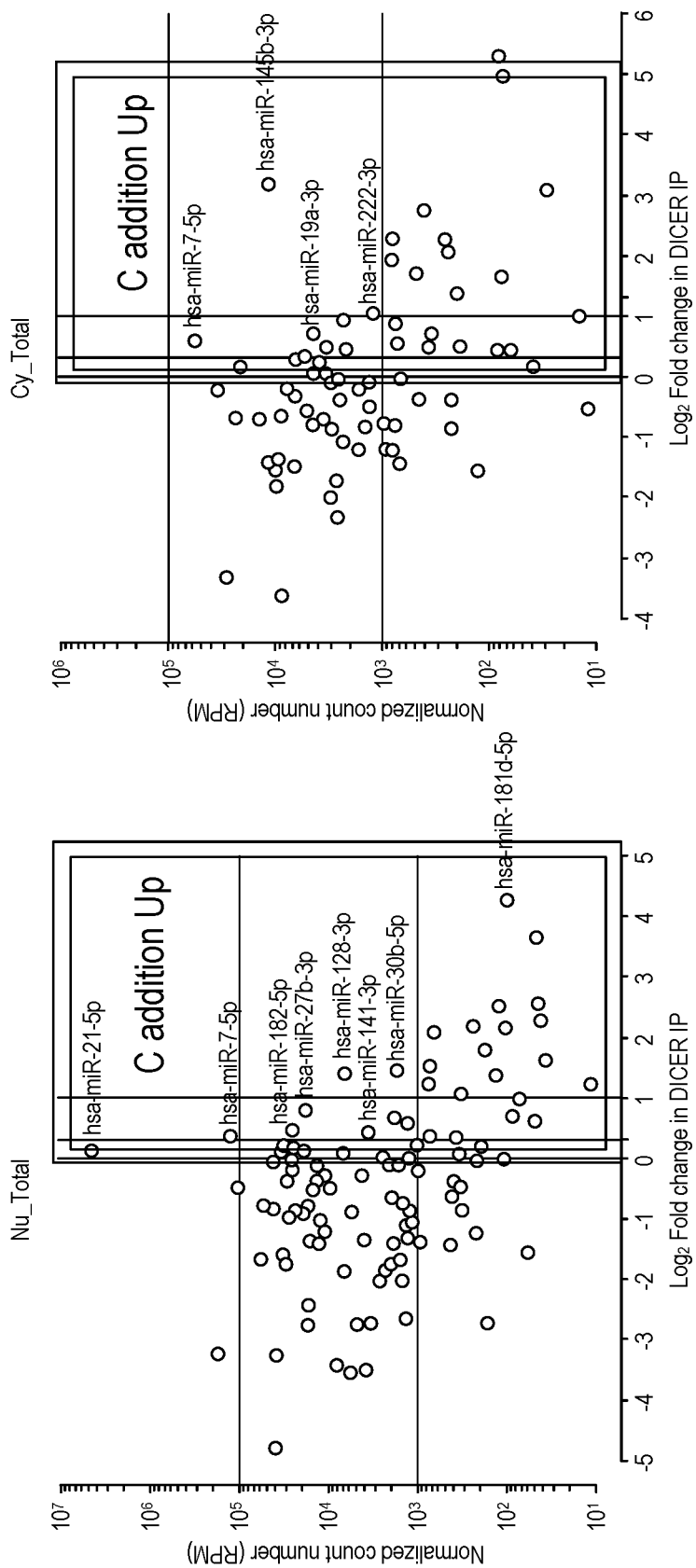
FIG. 44 shows cytidylated miRNA in fraction of nucleus and cytoplasm bound with Dicer. The results show that cytidylated miRNA bound with Dicer.
Figure 45:
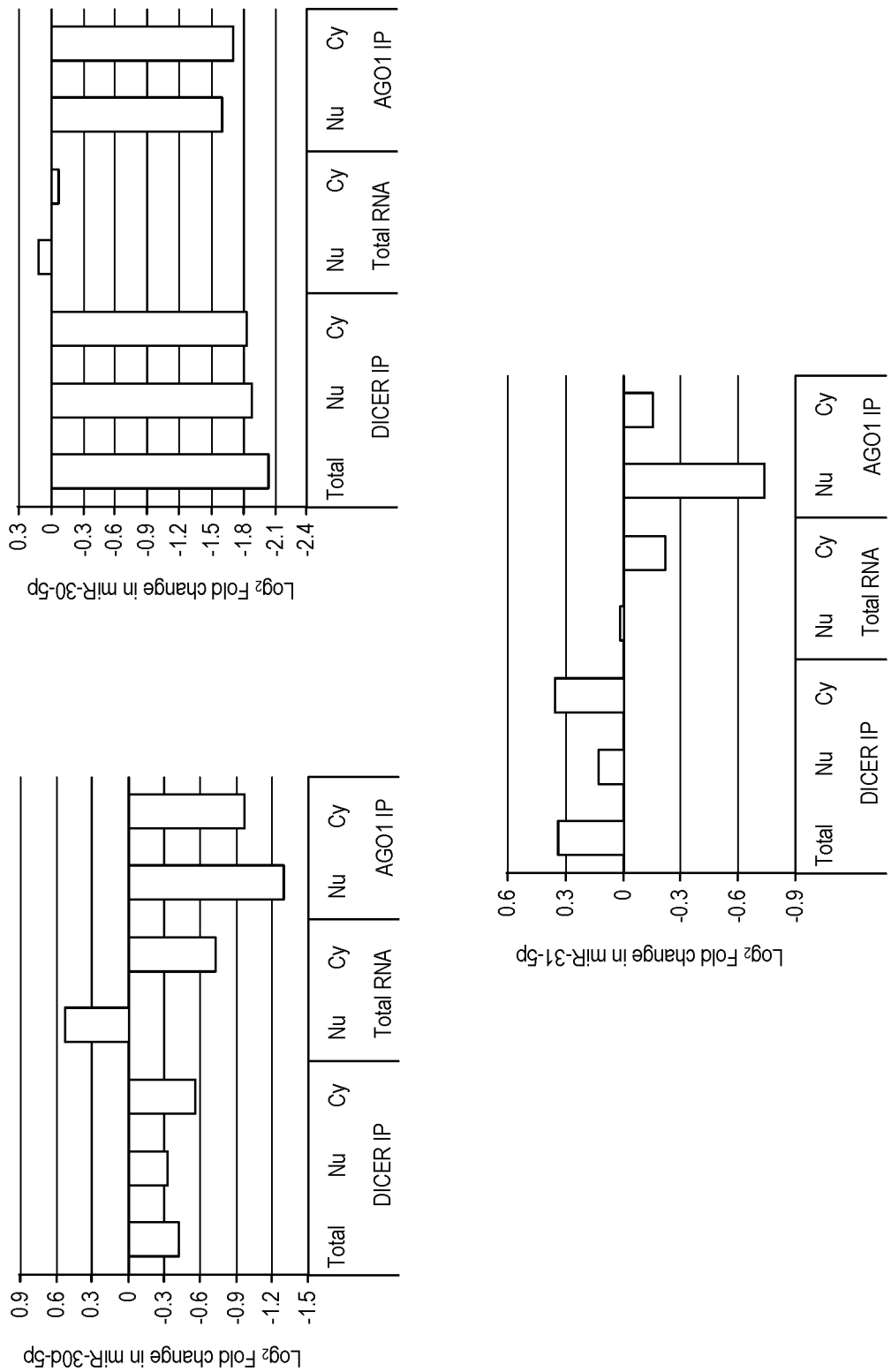
FIG. 45 shows the expression levels of miR-30d, miR-30e and miR31. The miR30d and miR30e were down-regulated in Dicer immunoprecipitation from total RNA (Total), fraction RNA of nucleus (Nu) and cytoplasm (Cy). However, miR31 expression levels in all Dicer immunoprecipitation were increased.
Figure 46:
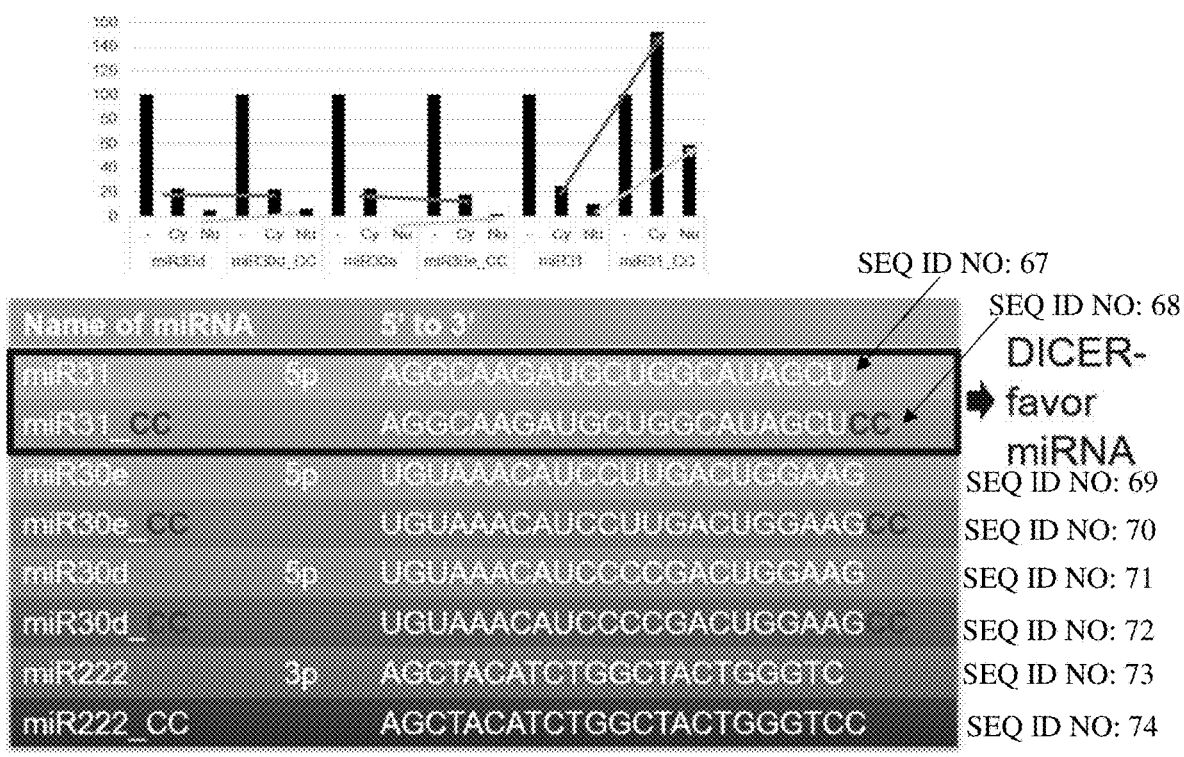
FIG. 46 shows degradation rate of miRNAs and cytidylated miRNAs in fraction of cytoplasm (Cy), nucleus (Nu), and − control (−). miRNAs and cytidylated miRNAs with buffer (−), lysates from cytoplasm (Cy) and nucleus (Nu) were reacted and remaining miRNAs after reaction were detected in SDS-PAGE gel. The has-miR30d and has-miR-30e samples which did not bind with Dicer showed same degradation ratio. However, has-miR31 bound with Dicer (dicer favor miRNA) increased the band intensity in reaction with cytidylated miR31.
Figure 47:
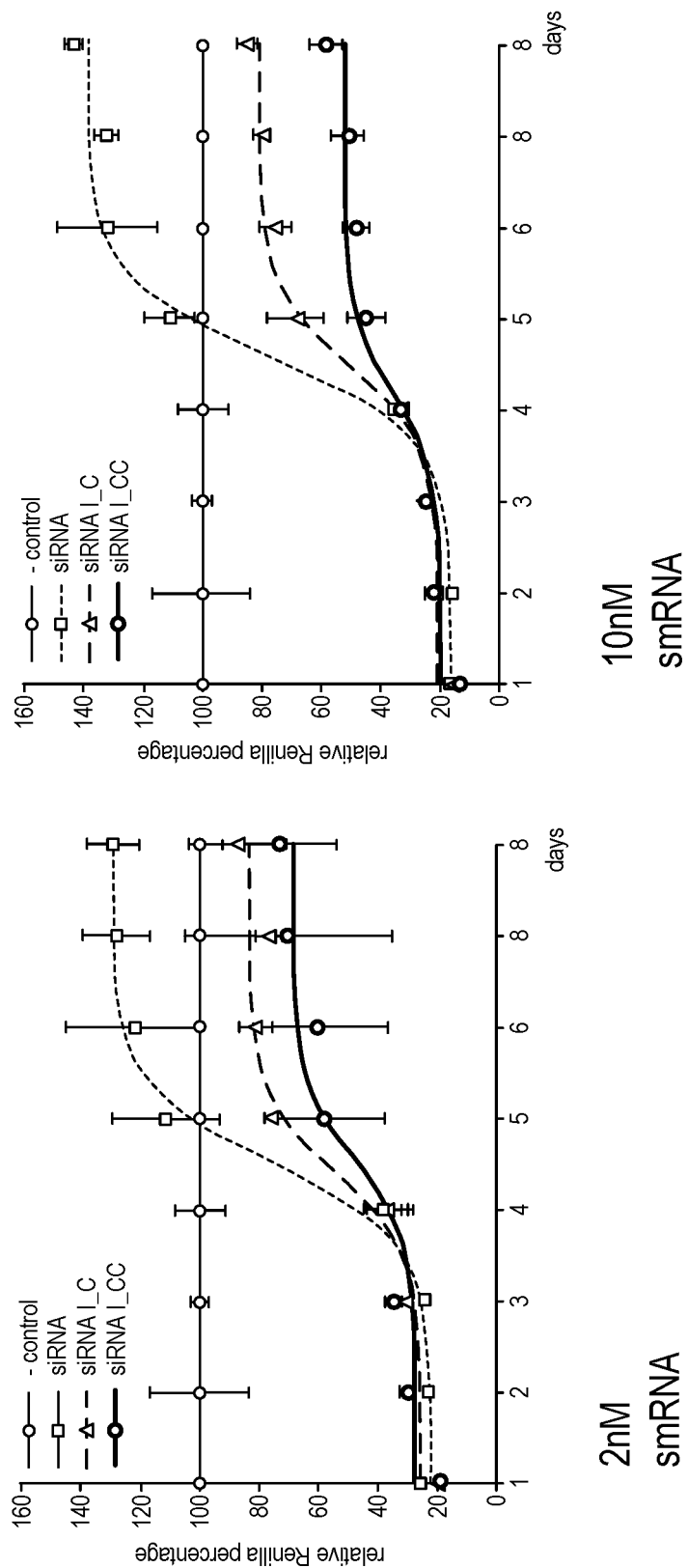
FIG. 47 shows the long-term stability of 3' C added siRNAs.
Figure 48:
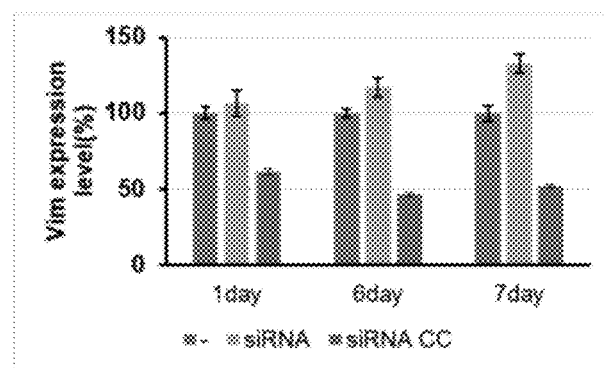
FIG. 48 shows the long-term stability of 3' C added siRNAs. This data shows that cytidylated siRNA targeted cancer related gene of Vim in controlling the stability of siRNA.
Figure 49:
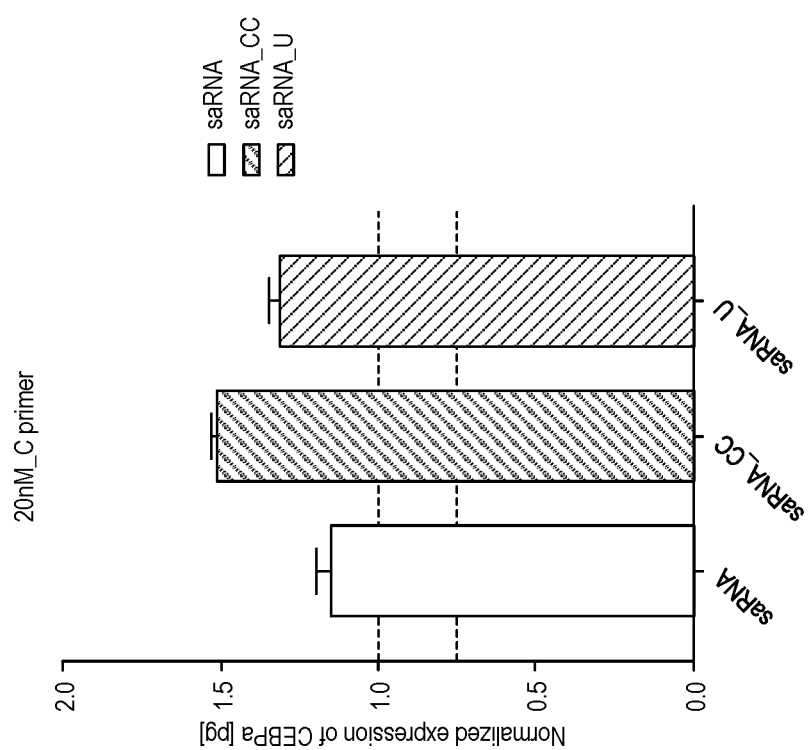
FIG. 49 shows the efficiency of small activate RNA (saRNA) by RT-qPCR. CEBPa targeted saRNA which can activate the expression of CEBPa gene and designed CC-added saRNA (middle bar) and U-added saRNA (right bar). The CC-added saRNA and U-added saRNA improved the efficiency of saRNA.
Figure 50:
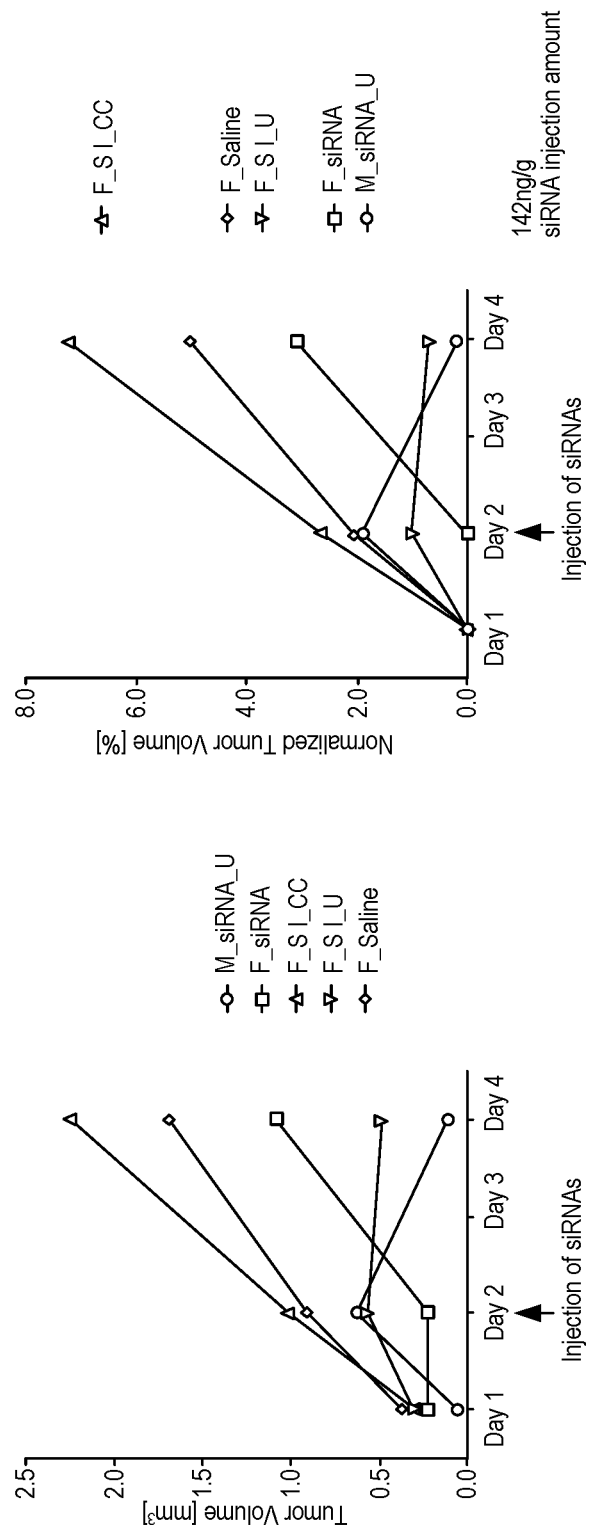
FIG. 50 shows the effects of siRNAs on tumor reduction.

To understand the mechanism uridylated miRNA biogenesis with Dicer, the uridylated miRNAs in Eri1 knockdown cells were reclassified into Dicer favor and disfavor. The expression level of miRNA bound to Dicer was determined by Dicer immunoprecipitation (FIG. 15A). Dicer+ (Dicer favor) means that the expression of miRNA increased among Dicer bound small RNA (FIG. 18F) and the cohort of Dicer favor or disfavor miRNAs from each group of up or down regulated miRNAs by Eri1 was determined (FIG. 18G). The grouping analysis revealed that the major of miRNAs (345 out of 545, 63%) preferred bind with Dicer in up-regulated miRNAs with siEri1, while down-regulated miRNAs (102 out of 147, 70%) in Eri1 knockout cells increased the population in the group of Dicer disfavor (FIG. 18E). Thus, Dicer was necessary to maintain the stability of miRNAs depending on Eri1. To investigate the regulation of the uridylated miRNA depend on Dicer, the slope from comparable expression levels of each miRNA between HCT116 and Eri-depleted cells was carried out (FIGS. 18D and 18F). To correlate the uridylation with Dicer favored miRNAs and Dicer disfavored miRNAs, it was found that uridylation in siEri1 treated cells was highly positively correlated in Dicer positive group (FIGS. 18D and 18E). Also, a correlation between Dicer and Eri1 in group (cohort) of down-regulated miRNA was observed (FIG. 18D). These results suggest that Eri1 and Dicer are related in uridylation mechanism.

Example 7: Cytidylated smRNAs Stability

This example demonstrates that cytidylated smRNAs such as siRNAs have improved stability and can be used as therapeutic agents.

Similar to Example 3, the number of cytidine in the 3' end of siRNAs was analyzed and summarized in Table 6 below.

TABLE 6

C addition in the 3' end of siRNAs

| Number of C addition | Total Count | | | | Percentage | | | |
|---|---|---|---|---|---|---|---|---|
| | DsiRNA I | DsiRNA II | siRNA I | siRNA II | DsiRNA I | DsiRNA II | siRNA I | siRNA II |
| 0 | 37,694 | 203,158 | 90,516 | 30,483 | 19.193 | 17.232 | 13.893 | 20.839 |
| 1 | 58,590 | 55,206 | 129,647 | 7,732 | 29.833 | 4.683 | 19.900 | 5.286 |
| 2 | 24,528 | 751,934 | 260,320 | 85,310 | 12.489 | 63.779 | 39.957 | 58.319 |
| 3 | 983 | 551 | 1,736 | 43 | 0.501 | 0.047 | 0.266 | 0.029 |
| 4 | 4 | 4 | 12 | | 0.002 | 0.000 | 0.002 | |
| 5 | | | 5 | | | | 0.001 | |
| 6 | | | 1 | | | | 0.000 | |

Example 8: Effects of siRNAs on Tumor Model

Xenograft colon cancer model in balb-c mice was generated and treated with siRNA, CC-added siRNA and U added siRNA. The siRNAs were injected on Day 2. FIG. 5O and Table 7 show that the tumor volume decreased in subcutaneous injected U-added siRNA. However, C-added siRNA did not show too much effect, probably due to the spill of liquid after injection.

TABLE 7

Tumor reduction by siRNAs

| | | siRNA | Day 1 | Day 2 | Tumor volume | Day 4 |
|---|---|---|---|---|---|---|
| 1 | Male_No_P | siRNA_U [142 ng/g] | 0.0539 | 0.625 | 0.6*0.6 | 0.108 |
| 2 | Female_1P_L | siRNA | 0.216 | 0.216 | 1.2*1.5 | 1.08 |
| 3 | Female_1P_R | siRNA_CC | 0.294 | 1.008 | 1.5*2 | 2.25 |
| 4 | Female_2P_L | siRNA_U | 0.294 | 0.567 | 1.5*0.8 | 0.48 |
| 5 | Female_2P_R | saline | 0.368 | 0.907 | 2*1.3 | 1.69 |

REFERENCES

1. Sakurai, K., Amarzguioui, M., Kim, D. H., Alluin, J., Heale, B., Song, M. S., Gatignol, A., Behlke, M. A., and Rossi, J. J. (2011). A role for human Dicer in pre-RISC loading of siRNAs. Nucleic acids research 39, 1510-1525.
2. Morgan, M., Anders, S., Lawrence, M., Aboyoun, P., Pages, H., and Gentleman, R. (2009). ShortRead: a bioconductor package for input, quality assessment and exploration of high-throughput sequence data. Bioinformatics 25, 2607-2608.
3. Larkin, M. A., Blackshields, G., Brown, N. P., Chenna, R., McGettigan, P. A., McWilliam, H., Valentin, F., Wallace, I. M., Wilm, A., Lopez, R., et al. (2007). Clustal W and Clustal X version 2.0. Bioinformatics 23, 2947-2948.
4. Waterhouse, A. M., Procter, J. B., Martin, D. M., Clamp, M., and Barton, G. J. (2009). Jalview Version 2—a multiple sequence alignment editor and analysis workbench. Bioinformatics 25, 1189-1191.

5. Rybak-Wolf, A., Jens, M., Murakawa, Y., Herzog, M., Landthaler, M., and Rajewsky, N. (2014). A Variety of Dicer Substrates in Human and *C. elegans*. Cell 159, 1153-1167.
6. Gutierrez-Vazquez, C., Enright, A. J., Rodriguez-Galan, A., Perez-Garcia, A., Collier, P., Jones, M. R., Benes, V., Mizgerd, J. P., Mittelbrunn, M., Ramiro, A. R., et al. (2017). 3' uridylation controls mature miRNA turnover during CD4 T-cell activation. RNA 23, 882-891.
7. Thomas, M. F., Abdul-Wajid, S., Panduro, M., Babiarz, J. E., Rajaram, M., Woodruff, P., Lanier, L. L., Heissmeyer, V., and Ansel, K. M. (2012). Eri1 regulates microRNA homeostasis and mouse lymphocyte development and antiviral function. Blood 120, 130-142.
8. Duchaine, T. F., Wohlschlegel, J. A., Kennedy, S., Bei, Y., Conte, D., Jr., Pang, K., Brownell, D. R., Harding, S., Mitani, S., Ruvkun, G., et al. (2006). Functional proteomics reveals the biochemical niche of *C. elegans* DCR-1 in multiple small-RNA-mediated pathways. Cell 124, 343-354.
9. Lee, R. C., Hammell, C. M., and Ambros, V. (2006). Interacting endogenous and exogenous RNAi pathways in *Caenorhabditis elegans*. RNA 12, 589-597.
10. Scheer, H., Zuber, H., De Almeida, C., and Gagliardi, D. (2016). Uridylation Earmarks mRNAs for Degradation . . . and More. Trends Genet 32, 607-619.
11. Zuber, H., Scheer, H., Ferrier, E., Sement, F. M., Mercier, P., Stupfler, B., and Gagliardi, D. (2016). Uridylation and PABP Cooperate to Repair mRNA Deadenylated Ends in *Arabidopsis*. Cell Rep 14, 2707-2717.

The invention claimed is:

1. A method of improving an in vivo stability level of a Dicer-derived small therapeutic RNA molecule relative to a control, comprising contacting the Dicer-derived small therapeutic RNA molecule with a 3' to 5' exonuclease in vitro to remove a 3' overhang from the Dicer-derived small therapeutic RNA molecule prior to adding a non-templated mono-uridine nucleotide to the 3' end of the Dicer-derived small therapeutic RNA molecule in vitro.

2. The method of claim 1, further comprising one, two, three, four, or five additional non-templated uridine nucleotides are added to the 3' end of the small therapeutic RNA molecule.

3. The method of claim 1, wherein the small therapeutic RNA molecule is an siRNA, an shRNA, or a miRNA.

4. The method of claim 1, wherein the small therapeutic RNA molecule has a size of less than 50 bps, less than 45 bps, less than 40 bps, less than 35 bps, less than 30 bps, less than 35 bps, less than 30 bps, less than 25 bps, less than 20 bps, or less than 15 bps.

5. A method of improving an in vivo stability level of a Dicer-derived small therapeutic RNA molecule relative to a control, comprising contacting the Dicer-derived small therapeutic RNA molecule with a 3' to 5' exonuclease in vitro to remove a 3' overhang from the Dicer-derived small therapeutic RNA molecule prior to adding a non-templated mono-cytidine nucleotide to the 3' end of the Dicer-derived small therapeutic RNA molecule in vitro.

6. The method of claim 5, further comprising one, two, three, four, or five additional non-templated cytidine nucleotides are added to the 3' end of the small therapeutic RNA molecule.

7. The method of claim 5, wherein the small therapeutic RNA molecule is an siRNA, an shRNA, or a miRNA.

8. The method of claim 5, wherein the small therapeutic RNA molecule has a size of less than 50 bps, less than 45 bps, less than 40 bps, less than 35 bps, less than 30 bps, less than 35 bps, less than 30 bps, less than 25 bps, less than 20 bps, or less than 15 bps.

9. The method of claim 5, wherein one additional non-templated cytidine nucleotide is added to the 3' end of the Dicer-derived small therapeutic RNA molecule in vitro to result in a modified small therapeutic RNA molecule comprising two non-templated cytidine nucleotides at its 3' end, the modified small therapeutic RNA molecule having an improved in vivo stability level relative to a stability level of an unmodified small therapeutic RNA molecule.

\* \* \* \* \*